US012462657B1

(12) United States Patent
Fu et al.

(10) Patent No.: US 12,462,657 B1
(45) Date of Patent: Nov. 4, 2025

(54) GROUPING INTRUDER VIDEO EVENTS FROM SMART SECURITY CAMERAS INTO PRIORITY GROUPS FOR EFFICIENT VIDEO MONITORING

(71) Applicant: Kuna Systems Corporation, San Bruno, CA (US)

(72) Inventors: Sai-Wai Fu, Los Altos, CA (US); Murali Sharma, Walnut Creek, CA (US); Harold G. Sampson, Sunnyvale, CA (US)

(73) Assignee: KUNA SYSTEMS CORPORATION, San Mateo, CA (US)

( * ) Notice: Subject to any disclaimer, the term of this patent is extended or adjusted under 35 U.S.C. 154(b) by 310 days.

(21) Appl. No.: 18/197,038

(22) Filed: May 13, 2023

Related U.S. Application Data

(63) Continuation-in-part of application No. 17/164,595, filed on Feb. 1, 2021, now Pat. No. 11,678,011.

(60) Provisional application No. 63/342,067, filed on May 14, 2022.

(51) Int. Cl.
| | |
|---|---|
| *G08B 13/196* | (2006.01) |
| *G06V 20/40* | (2022.01) |
| *G06V 20/52* | (2022.01) |
| *G08B 15/00* | (2006.01) |
| *H04N 7/18* | (2006.01) |

(52) U.S. Cl.
CPC ....... *G08B 13/19645* (2013.01); *G06V 20/41* (2022.01); *G06V 20/44* (2022.01); *G06V 20/52* (2022.01); *G08B 13/19682* (2013.01); *G08B 13/19684* (2013.01); *G08B 13/19693* (2013.01); *G08B 15/00* (2013.01); *H04N 7/181* (2013.01)

(58) Field of Classification Search
CPC ........ G08B 13/19645; G08B 13/19682; G08B 13/19684; G08B 13/19693; G08B 15/00; G06V 20/52; G06V 20/41; G06V 20/44
See application file for complete search history.

(56) References Cited

U.S. PATENT DOCUMENTS

| | | | |
|---|---|---|---|
| 10,713,928 B1* | 7/2020 | Gerstberger | G08B 13/19645 |
| 10,892,984 B1* | 1/2021 | Statton | H04L 41/0668 |
| 11,581,099 B1* | 2/2023 | Rufo | G16H 20/13 |
| 2005/0036659 A1* | 2/2005 | Talmon | G06V 10/95 |
| | | | 382/103 |
| 2017/0064412 A1* | 3/2017 | Taxier | H04L 67/12 |
| 2017/0316679 A1* | 11/2017 | Hess | G08B 25/016 |

(Continued)

*Primary Examiner* — Rowina J Cattungal
(74) *Attorney, Agent, or Firm* — Christopher P. Maiorana, PC

(57) ABSTRACT

A system comprising security devices and a computing device. The security devices may each be configured to detect an event in response to video frames and audio and communicate the video frames, the audio and a notification of the event. The computing device may be configured to execute one or more steps, the steps comprising performing a classification of the notifications of the events into a plurality of event levels and displaying a list of the notifications of the events according to the classification. Each of the plurality of event levels determined to be high priority events are added to a top of the list as the high priority events are detected. Each of the plurality of event levels determined to be a lower priority than the high priority events are added to the list below the high priority events as the events with the lower priority are detected.

20 Claims, 19 Drawing Sheets

(56) References Cited

U.S. PATENT DOCUMENTS

2018/0338120 A1\* 11/2018 Lemberger .............. G06V 20/41
2018/0357870 A1\* 12/2018 Siminoff ........... G08B 13/19608
2019/0392700 A1\* 12/2019 Darling ............. G08B 13/19684
2020/0211358 A1\* 7/2020 Burke ................... G08B 21/043

\* cited by examiner

GROUPING INTRUDER VIDEO EVENTS FROM SMART SECURITY CAMERAS INTO PRIORITY GROUPS FOR EFFICIENT VIDEO MONITORING

This application relates to U.S. Provisional No. 63/342,067, filed on May 14, 2022. This application also relates to U.S. application Ser. No. 17/164,595, filed on Feb. 1, 2021. Each of the mentioned applications are hereby incorporated by reference in its entirety.

FIELD OF THE INVENTION

The invention relates to security video devices generally and, more particularly, to a method and/or apparatus for implementing grouping intruder video events from smart security cameras into priority groups for efficient video monitoring.

BACKGROUND

In professional central live video monitoring, automatic detection of an intruder triggers an alert to personnel to respond to through live video of the intruder. Deterring technology can be automatically performed or manually selected. The monitoring personnel has to review video corresponding to each alert to determine if authorities (i.e., police, fire and rescue, etc.) should be contacted. Over 90% of the time, efforts of security personnel are wasted on false positives or non-criminal activities that should not involve contacting the authorities.

In the residential home and small business market, the owner plays the role of the self monitoring personnel. When the owner receives an alert, the owner has to manually review the video to determine if any action is needed. Manual review is very error-prone and time consuming for the owners to perform as a part time, amateur, self-monitor.

Automatic deterrence technology for outdoor intruders such as burglars, vagrants and dumpster divers has become highly effective. Some automatic deterrence technology has at least a 98% success rate for deterring intruders. However, the remaining intruder scenarios cannot be handled by automatic deterrence detection alone. Manual surveillance of a video stream by security personnel is used to handle scenarios where automatic deterrence is unsuccessful. Manual surveillance using security personnel can be a significant cost, which is particularly a burden for small businesses or homeowners. To reduce the cost of manual surveillance from trained security personnel, security personnel need to be able to easily monitor multiple properties simultaneously without missing security events.

It would be desirable to implement grouping intruder video events from smart security cameras into priority groups for efficient video monitoring.

SUMMARY

The invention concerns a system comprising a plurality of smart security devices and a computing device. The smart security devices may each be configured to capture pixel data of an area, generate video frames from the pixel data, capture audio of the area, store the video frames and the audio, perform an analysis of the video frames and the audio, detect an event in response to the analysis of the video frames and the audio, perform automatic deterrence actions in response to the event and communicate the video frames, the audio and a notification of the event. The computing device may be configured to execute computer readable instructions to perform one or more steps, the steps comprising receiving the video frames, the audio and the notification of the event from each of the smart security devices, performing a classification of the notifications of the events into a plurality of event levels, displaying a list of the notifications of the events according to the classification and receiving input from a user in response to the notifications of the events. Each of the plurality of event levels determined to be high priority events are added to a top of the list as the high priority events are detected. Each of the plurality of event levels determined to be a lower priority than the high priority events are added to the list below the high priority events as the events with the lower priority are detected.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
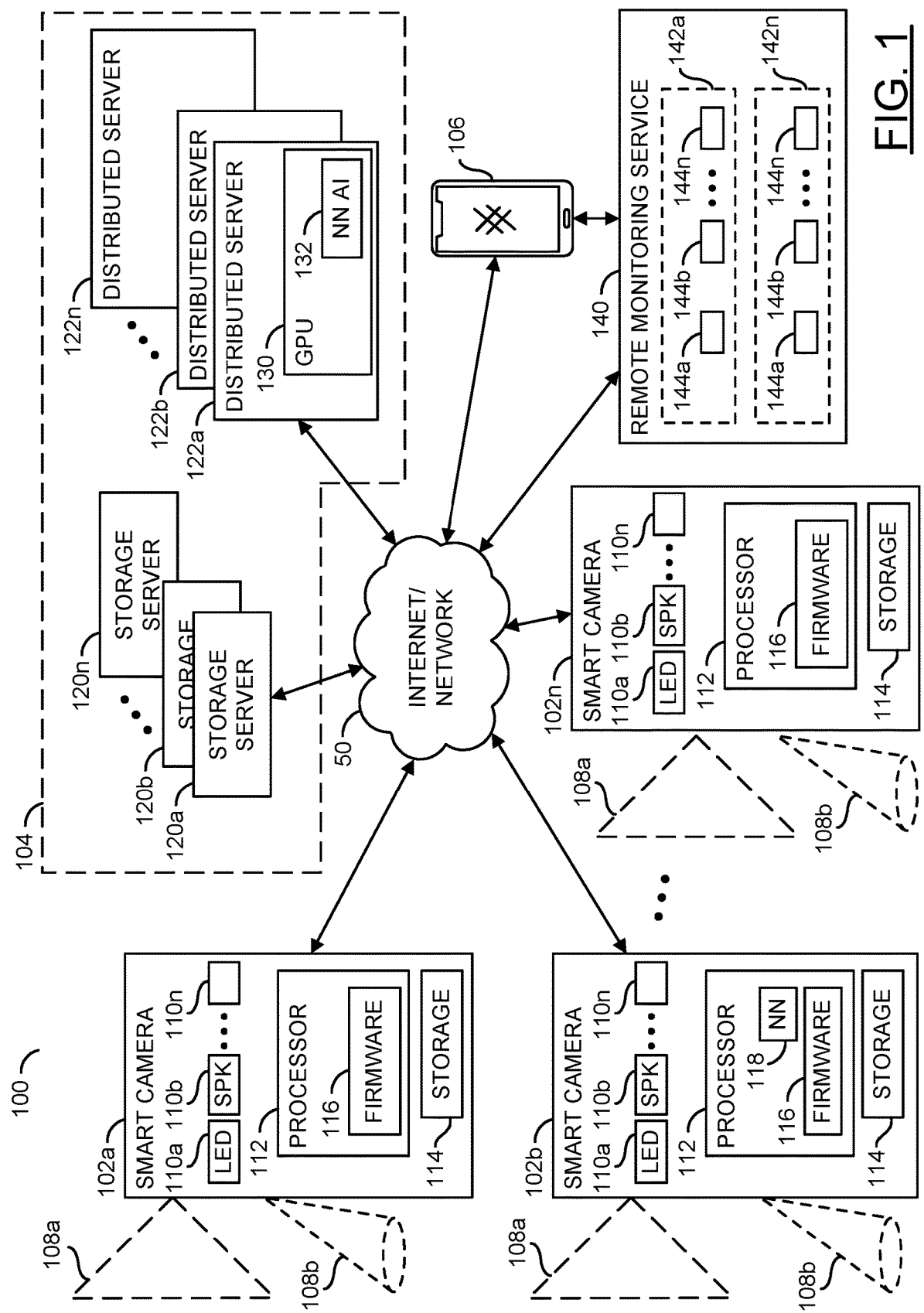
FIG. 1 is a diagram illustrating a system according to an example embodiment of the present invention.

Embodiments of the present invention include providing grouping intruder video events from smart security cameras into priority groups for efficient video monitoring that may (i) enable teams of remote security personnel to monitor thousands of cameras, (ii) enable a small business owner to monitor multiple security feeds, (iii) provide a UX/UI that places higher priority events in prominent locations, (iv) provides a UX/UI that places low priority events in less prominent locations, (v) enables security monitoring to be shared between multiple members of a team, (vi) be implemented with smart security floodlights, (vii) implement automatic video monitoring with automatic deterrence of intruders and/or (viii) be implemented as one or more integrated circuits.

Embodiments of the present invention may be configured to automatically group video events from multiple smart security cameras that detect intruders into separate priority groups for efficient video monitoring. The automatic grouping of the intruder video events into separate priority groups may enable one or two people to monitor many video feeds from many smart security cameras (e.g., thousands) at the same time. Generally, the most efficient priority group of video streams to monitor may be the group that comprises successful deterrence of intruders (e.g., since no action is expected of the monitoring person). By classifying each event detected by a smart security camera, the events may be prioritized into the separate priority groups in order to aid security personnel that may monitor many video streams at the same time. For example, by grouping low priority events together (e.g., successfully deterred intruders), the security personnel may check on the low priority events with a quick glance, which may provide more time to focus on the higher priority events. For example, the higher priority events may be handled first, while the grouping of the low priority events may enable the security personnel to occasionally monitor the low priority events with limited distraction from the higher priority events.

Embodiments of the present invention may comprise computer readable instructions that may be executed by a processor that may categorize the intruder events into priority events (e.g., using computer vision and/or behavioral analysis of intruders) instead of having all intruder video events in one big group, which creates a lot of wasteful monitoring activities. Categorizing the intruder events into priority event levels may extend deterrence technology by determining whether an automatic deterrence performed by a smart security device at a remote location was successful. Embodiments of the present invention may provide a user interface (UI) and/or a user experience (UX) based on the categorization of the events to enable remote video monitoring. Embodiments of the present invention may enable a small number (e.g., one or two) security personnel to monitor a large number (e.g., tens, hundreds, thousands, etc.) of video feeds. For example, enabling a small number of security personnel to review a large number of video feeds may reduce an overall security cost, which may provide a viable solution for small businesses and homeowners (e.g., compared to a high cost of having a large number of security personnel). Enabling a small number of people to monitor a large number of video feeds may enable a homeowner to perform security monitoring themselves (e.g., amateur security monitoring instead of paying for a professional security service) and/or hire a professional security monitoring service at a lower overall cost due to the fewer employees being used for monitoring a large number of video feeds.

Embodiments of the present invention may be configured to receive video feeds, audio and/or notifications of events from multiple smart security devices. The smart security devices may be located at a remote site to provide surveillance and/or automatic deterrence. The smart security devices may be capable of providing automatic and/or autonomous deterrence for detected intruders. In some embodiments, the smart security devices may provide a detection accuracy for intruders of approximately 96%, with a false positive rate of approximately 4%, with none of the false positives resulting in property loss. The smart security devices may provide approximately a 99% success rate for deterring intruders with 1% of intruders not being deterred by automatic deterrence. Generally, for most properties, smart security devices may deal with a few (e.g., two) intruder events per day. However, even with the high success rate, and few intruders per day, automatic deterrence may be supplemented with manual security. At two events per day, for a property (or business) owner with multiple properties, reacting to (or even merely auditing) two events per camera per day may be a significant burden. For an affordable solution for many small business and/or property owners, security costs may be limited to $5/camera/month. To achieve a $5/camera/month security cost, embodiments of the present invention may enable the small number of security personnel (e.g., a team of 2-10 people) to monitor upwards to 1000 security cameras.

Embodiments of the present invention may comprise a system of smart security devices that each implement automatic deterrence. The automatic deterrence may be performed in response to detected events (e.g., a detection of an intruder). The automatic deterrence responses performed by the security devices may be generated based on computer vision and/or audio analysis. In some embodiments, the computer vision and/or audio analysis may be performed locally by the smart security devices. In some embodiments, the computer vision and/or audio analysis may be performed using distributed (e.g., cloud-based) processing. The smart security devices may analyze video frames to detect objects (e.g., the intruder) and/or the behavior of the intruder (e.g., a passerby, a loiterer, a burglar, a customer arriving/departing, an employee arriving/departing, a property owner arriving/departing, etc.). In order to deter unwanted visitors (e.g., intruders), the smart security devices may emit bright lights (e.g., 10k lumen white light for commercial properties, 2k+ lumen white light for homes), strobing lights, flashing colored lights (e.g., red and blue lights similar to police lights), communicate with intruders (e.g., talk down, provide warning messages, inform that law enforcement has been contacted, etc.), etc. Voice down messages may be unpredictable, procedurally generated and/or generated by artificial intelligence (AI). Voice down messages may be customized voices (e.g., recordings of the property owner, recordings of professional voice actors, recordings of law enforcement, etc.) that may be selected randomly from a playlist and/or scheduled (e.g., based on calendar data) per camera. Video recorded by the cameras may be streamed to a person (e.g., viewable using a phone app) and/or to a centralized location (e.g., a surveillance center).

Embodiments of the present invention may comprise detection technology available on a mobile application and/or an application used by a central monitoring service. The detection technology may comprise a display interface configured to provide a preview of events detected by the smart security devices. The smart security devices may stream video data, audio data and/or a notification of a detected event. In some embodiments, the stream may be uploaded to a central server and a user device (e.g., a mobile phone, a desktop computer, a tablet computing device, etc.) may retrieve the stream from the central server. In some embodiments, the stream may be provided directly the user device (e.g., peer to peer communication). In one example, the smart security devices may start a video recording with a few seconds (e.g., approximately 12 seconds) of pre-roll (e.g., to provide context of the event before an intruder is detected). The stream of the video data may be presented to a display interface. The display interface may present many video streams simultaneously (e.g., many video stream thumbnails). Providing the display interface with many (e.g., tens, hundreds, thousands, etc.) video stream thumbnails may enable the user (e.g., the property owner, a trusted neighbor, the security personnel, etc.) to simultaneously monitor events that correspond to multiple smart security devices.

The detection technology may be configured to periodically check for the intruder. In one example, the detection technology may query the smart security device for an update about the event after a pre-determined amount of time. The detection technology may comprise an application programming interface (API). An API signal may be communicated to the smart security devices for the update about the event. In response to the API signal, the smart security devices may provide the update about the event. The display interface may be refreshed with the update about the event.

The detection technology may be configured to classify and/or prioritize the events. The display interface may arrange the video streams (e.g., as motion video thumbnails) based on the classification of the events. The display interface may provide a decoration for each of the streams that indicate the classification. The decoration (e.g., a highlight, a colored border, an animation, etc.) may be configured to draw the attention of the user to some of the video streams and/or draw the attention of the user away from some of the video streams. In one example, the video streams that do not correspond to an event may have a low priority (or no priority) classification. Low priority video streams may be output on the display interface with a green border. In another example, after an intruder has been detected, the video stream that corresponds to the event may have a medium priority. Medium priority video streams may be output on the display interface with a yellow border. The detection technology may check whether the intruder is still present periodically. For example, if the intruder is still detected after 15 seconds, the border may remain yellow, and if the intruder is no longer detected after 30 seconds (e.g., two time period intervals), the border may be changed to green. In another example, if the intruder is still detected after approximately one minute (e.g., four time period intervals), the border may be changed to red to indicate a high priority event.

Events determined to be high priority events may be events that should have immediate action. Different criteria may be used determine the high priority events. For example, criteria for high priority events may comprise one intruder that remains for a predetermined amount of time (e.g., persistent detection), one intruder that appears on multiple cameras located at the same site within a predetermined amount of time (e.g., orchestrated detection), an intruder detected having burglar behavior (e.g., smash and grab detection), etc. Generally, for the user, 99% of detections may be resolved without any action in response (e.g., lower priority events and/or medium priority events that may be reclassified as low priority events and/or no action events), while less than 1% of events may be high priority events.

Implementing the display interface with deterrence technology may enable one user to perform self-monitoring for a small business and/or one homeowner to perform self-monitoring. The display interface may be configured with responsive design configured to be adapted to a viewport (e.g., a viewable area and/or viewable size) of a particular user device. In an example, implementing the display interface for a smartphone user device may provide a desirable user experience with approximately thirty video streams (e.g., one user may monitor 30 of the smart security devices using a smartphone app). In another example, implementing the display interface with a multi-monitor desktop device (e.g., hardware used by a professional security guard) may provide a desirable user experience with approximately 1000 video streams per user.

The user may respond to the various events detected. In an example, in response to a high priority event detection, an action may be performed. For example, the action may be a phone call to the property owner, a phone call to the appropriate authority, connecting directly to the audio system of the smart security device for live interaction with the intruder, etc. In another example, in response to a medium priority event detection, a notification may be generated. For example, the notification may be a push alert to a phone app, a text message, an email, etc. In yet another example, in response to a low priority event detection, a passive action that may not involve the user may be performed. For example, the passive action may be recording the event for a later audit.

The display interface may enable the user to interact with each of the video feeds. The type of interaction may depend on the hardware used for the display interface. In an example, the user may interact with one of the video feeds by clicking on the video feed thumbnail (e.g., with a mouse-driven interface). In another example, the user may interact with one of the video feeds by using keyboard shortcuts (e.g., with a keyboard interface). In yet another example, the user may interact with one of the video by tapping and/or long-pressing on the video feed thumbnail (e.g., with a touchscreen interface). In some embodiments, the user may interact with a group of the video streams (e.g., select a group of video streams and perform the same action on all of the video streams in the selected group). In response to interacting with the video streams, the display interface may provide an actions interface. The actions interface may enable a user to select one or more actions to perform (e.g., on-demand backup of the video, call the authorities, connect to two-way voice communication, activate a security measure, etc.).

The smart security devices may be configured to perform a response to an automatic on-demand trigger when an event is detected. The automatic on-demand trigger may comprise permissions to automatically respond to an event based on particular circumstances. In one example, the circumstances may be defined by a calendar schedule. For example, a property owner may configure the calendar schedule such that the automatic on-demand triggers provide a notification when an event is detected during work hours, and to provide a phone call when the event is detected outside of work hours. Details of scheduling automatic on-demand triggers based on calendar data may be described in association with U.S. application Ser. No. 16/720,379, filed on Dec. 19, 2019, appropriate portions of which are incorporated by reference. The user may set up a permission to allow automatic phone calls (e.g., to ensure undesired phone calls are not provided). Generally, achieving a low false positive rate may be desired to avoid end-user frustration (e.g., avoid alert spamming). In an example, instead of the smart security device performing the response to the automatic on-demand trigger, the smart security device may send a notification to the security personnel, the security personnel may confirm the event and then select an automatic response. The security personnel may have no knowledge of what the automatic response is when selected (e.g., the property owner may define the automatic response(s)). The property owner may also provide permission to accept a service fee for the automatic on-demand triggers (e.g., permission to charge a credit card on a per-use basis, a subscription plan, a one-time fee, etc.). In another example, the automatic on-demand trigger may comprise performing a response when the property owner does not respond in a timely manner. For example, the automatic on-demand trigger may wait a predetermined amount of time (e.g., one minute) after the property owner receives a notification, and then perform the response automatically (the automatic response may be canceled if the property owner does respond).

Embodiments of the present invention may be configured to provide the display interface that arranges the video streams based on the prioritization of the events. In some embodiments, the user device that outputs the display interface may comprise a processor and memory configured to execute computer readable instructions that perform the classification and generate the display interface. In some embodiments, a remote computing device may be configured to execute the computer readable instructions that perform the classification and the user device may generate the display interface in response to receiving the classification from the remote device. The display interface may be configured to arrange the video streams based on the classified priority level of each of the video streams received. In an example, video streams with high priority events (e.g., red alerts) may be displayed in a prominent position for immediate action. Similarly, medium priority events (e.g., yellow alerts) may be displayed in a noticeable, but less prominent position on the display interface. The low priority events (e.g., green alerts/non-events) may be displayed in a position with no particular prominence. The classification of the alerts/events may be determined based on intruders detected (e.g., medium priority events correspond to an intruder detection without context, high priority events correspond to the intruder detection after particular contexts have been determined and low priority events may correspond to an either no event detected and/or a successful deterrence of the intruder). The display interface may be updated in real-time (e.g., as new information is determined about the events detected, as context information is determined, as responses to a deterrence action is detected, etc.). Updating the display interface in real-time may enable a user to ignore all or audit some of the medium and low alerts and focus on the high priority events. For example, the real-time updating of the display interface may enable the user to have access to deterrence technology that may eliminate over 80% of the monitoring effort.

Generally, the automatic deterrence performed by the smart security devices may be 98%-99.9% effective (e.g., at preventing break-ins, deterring undesired intruders, protecting property, etc.). The classification and display interface may enable a user to cover the remaining events that may not be handled by the automatic deterrence with low manual effort. For self monitoring (e.g., by an amateur such as the property owner) of a small number of cameras (e.g., less than 20), the amateur may be capable of using the display interface to provide part-time manual security monitoring. However, a single amateur user may not always be available to perform the manual monitoring. Embodiments of the present invention may be configured to automatically perform a response if the user does not perform a manual response. The security system may be configured to automatically cover gaps in the manual security monitoring.

The user may respond to the events. For example, the user may select a manual deterrence response to persistent intruders. The display interface may provide an option of generating an action interface. The action interface may be displayed in response to a high priority alert to enable the user (professional or amateur) to manually select a number of one-click responses. For example, the manually selected reactions may comprise playing an audio deterrence message, strobing the lights of the smart security device, applying a spotlight on the intruder, etc. The deterrence reactions may be orchestrated to deliver deterrence messages. For example, all ten devices operating in a parking lot may strobe the 10k lumen light at the same time to provide 100k lumen deterrence. In some embodiments, if the manual deterrence reactions do not deter the intruders (generally a rare scenario), verified video messages may be sent to the authorities and/or saved for forensic analysis.

The classification may provide at least three priority levels. For example, low priority level alerts (green events) may be ignored. For efficient and/or cost-effective security monitoring, two employees may handle the medium priority level alerts (yellow events) and the high priority level alerts (red events). In an example, there may be more yellow events, but most may not involve any particular action other than further monitoring (handled by one employee) and there may be fewer red events that may involve manual action (handled by another employee). If additional employees are available for monitoring, one person may monitor the low priority events for auditing purposes and/or to provide training data (e.g., false positive or false negative tagging) to train the classification.

The classification may detect additional priority levels (e.g., more than three levels). For example, the priority levels may be grouped based on the behavior of the intruder (e.g., a burglar priority level, a loiterer priority level, an intake guest level priority level, a delivery person priority level, etc.). By grouping different behaviors of intruders (or guests), each classification may be handled by a different user. For example, some users may be specialized in particular scenarios (e.g., a secretary may handle deliveries and/or a guest intake, while a security guard may handle loiterers). In some embodiments, events may be handed off to different security personnel (e.g., similar to an assembly line) as the event classification changes (e.g., a secretary may first handle a guest, but if the guest does not leave (reclassified as a loiterer), a security guard may step in to handle the loiterer). In a successful deterrence group, there may be sufficient confidence to have no events to check or audit. Some monitoring centers may assign two levels to save cost (e.g., ignore break in cases, which may be handed off to the authorities). The number of priority levels may be varied according to the design criteria of a particular implementation.

Embodiments of the present invention may enable a small team (e.g., 2+) to work together on monitoring a large pool of camera feeds. The classification of the events may enable even a single person to monitor the large pool of cameras (e.g., or allowing breaks, such as bathroom breaks without adding a significant burden). In an example, one person may monitor approximately 1000 camera feeds. For example, a two person team may monitor 2000 camera feeds. The placements of the video feeds based on the classification priority may be distributed to 2 or more people. Embodiments of the invention may comprise multiple employees working as a team for a large pool of cameras or each person monitoring a designated group of cameras. One example may be a small team of 2 or 3 for each pool of cameras (1000-2000 cameras), and there may be multiple teams in a central monitoring center to handle 100k or more cameras.

Referring to FIG. 1, a diagram illustrating a system according to an embodiment of the present invention is shown. The system 100 is shown. The system 100 may implement security light cameras with cloud-based video management. The system 100 may be configured to implement a video monitoring system with automatic deterrence of intruders with automatic event classification for manual self-monitoring. The automatic event classification may enhance automatic intruder deterrence with manual monitoring of video streamed by the system 100. Manual self-monitoring may supplement the automatic deterrence. The automatic event classification may enable the manual self-monitoring to be performed either by a property owner and/or by professional security personnel. The automatic event classification may reduce an amount of manual labor for monitoring multiple video streams. For example, the automatic event classification may enable a single amateur (e.g., such a homeowner or a small business owner) monitoring multiple video streams to be feasible. In another example, the automatic event classification may enable a small team of professionals (e.g., security personnel) to monitor a large number of video feeds at a feasible a fee structure.

The system 100 may comprise a network 50, blocks (or circuits) 102a-102n, a block (or circuit) 104 and/or a block (or circuit) 106. The network 50 may be a local network and/or a wide area network. For example, the network 50 may be the internet. The circuits 102a-102n may implement smart security devices. In an example, the smart security devices may comprise smart security devices and/or smart camera doorbells. The circuit 104 may implement a cloud computing service (e.g., a cluster of server computers and/or a remote device). The circuit 106 may implement a user device (e.g., a communication device). The number, type and/or arrangement of the components of the system 100 may be varied according to the design criteria of a particular implementation.

The smart security devices 102a-102n may be configured to capture video data, capture audio data, perform video/audio analysis, detect events, provide deterrence security measures and/or generate light. A dotted shape 108a and a dotted shape 108b are shown extending from each of the smart security devices 102a-102n. The dotted shape 108a may represent a field of view of the smart security devices 102a-102n. The light 108b may comprise a light and/or spotlight (e.g., light directed and/or focused at a particular location and/or object), general illumination (e.g., lighting for visibility and/or decorative effect) and/or colored lighting (e.g., flashing red and blue lights that provide a deterrent effect). The light 108b may be emitted, turned on/off, dimmed/brightened and/or strobed. In an example, the light 108b may comprise a combination of three lights (e.g., a white light at 10,000 Lumen, a red light at 1,000 Lumen and a blue light at 1,000 Lumen).

The dotted shape 108a may represent one field of view (e.g., a boundary, a range, etc.) captured by a capture device (e.g., a camera) implemented by each of the smart security devices 102a-102n. The video data may comprise pixel data, video frames arranged from the pixel data and/or images of the field of view 108a. In the example shown, each of the smart security devices 102a-102n may have one field of view 108a. However, one or more of the smart security devices 102a-102n may capture more than one field of view (e.g., implement dual cameras, implement a multi-camera system, etc.).

Each of the smart security devices 102a-102n are shown comprising blocks (or circuits) 110a-110n, a block (or circuit) 112 and/or a block (or circuit) 114. The circuits 110a-110n may implement various components of the smart security devices 102a-102n that enable functionality and/or features of the smart security devices 102a-102n. In one example, one or more of the components 110a-110n of the smart security devices 102a-102n may comprise a lighting element. The circuit 112 may implement a processor. The smart security devices 102a-102n may comprise other components (not shown). In some embodiments each of the smart security devices 102a-102n may have differing capabilities and/or features. The circuit 114 may implement storage. The number, type and/or arrangement of the components of the smart security devices 102a-102n. Details of the smart security devices 102a-102n may be described in association with FIGS. 4-5.

The components 110a-110n may be configured to monitor and/or sense the environment (e.g., an area) near the smart security devices 102a-102n. In an example, the components 110a-110n may comprise a loud speaker and a bright LED integrated inside the smart security devices 102a-102n. For example, one or more of the components 110a-110n may be sensors. In an example, one of the components 110a-110n may be an image sensor configured to capture video frames. One or more of the components 110a-110n may be configured to store and/or communicate data. In one example, one or more of the components 110a-110n may be a memory. In another example, one or more of the components 110a-110n may be a communication device configured to upload information to the internet 50.

The processor 112 may be configured to read information from the components 110a-110n, write information to the components 110a-110n, store and/or retrieve data to/from the storage 114 and/or execute computer readable instructions. In one example, the processor 112 may be a video processor (e.g., a processor configured to execute computer readable instructions and comprising dedicated hardware for processing video data). The processor 112 may be configured to perform video processing operations to generate video frames. The processor 112 may be configured to select still images from the video frames to upload to the distributed servers 122a-122n. The processing capability of processor 112 may be limited due to size constraints, power constraints, cost constraints, etc.

The storage 114 may comprise a removable storage. In an example, the removable storage 114 may be implemented as an SD card. The removable storage 114 may be configured to store video frames locally on the smart security devices 102a-102n. For example, the removable storage 114 may implement a 1 TB capacity storage medium that may store approximately ninety days of HD video 24×7. The format and/or capacity of the removable storage 114 may be varied according to the design criteria of a particular implementation.

The processor 112 may comprise a block (or circuit) 116. The block 116 may be a firmware for the processor 112. The firmware 116 may configure how the processor 112 interacts with the components 110a-110n and/or the input/output generated by the processor 112. The smart security devices 102a-102n may operate based on the firmware 116. Updating the firmware 116 may alter functionality and/or features performed by the smart security devices 102a-102n. In some embodiments, the smart security devices 102a-102n may be updated to operate with the system 100 by updating the firmware 116.

One or more of the smart security devices 102a-102n may comprise a block (or circuit) 118. In the example shown, only the smart security device 102b is shown comprising the block 118. The block 118 may be a module of the processor 112. The module 118 may be a neural network. For example, the processor 112 may implement a neural network artificial intelligence. The may be configured to detect objects in the video frames generated by the processor 112.

The processor 112 may be configured to detect one or more triggering events. The triggering events may occur when a particular input is determined to be above some predetermined threshold value. The processor 112 may analyze input detected by one or more of the components 110a-110n to determine whether the detected input is above the predetermined threshold. In one example, if one of the components 110a-110n is a passive infrared (PIR) sensor configured to detect motion, then the triggering event may be when the processor 112 determines that the input from the PIR sensor is above a threshold for motion. In another example, if one of the components 110a-110n is a microphone, then the triggering event may be when the processor 112 determines that the incoming audio is above a particular audio level and/or matches a particular frequency pattern.

In some embodiments, the triggering event may occur in response to an output of the processor 112. For example, the processor 112 may be configured to analyze video frames generated by the processor 112. In one example, the processor 112 may be configured to analyze the video frames for a particular amount of motion and/or a change in the amount of light to detect a triggering event (e.g., an amount of motion above a threshold amount of motion). In another example, the processor 112 may use the neural network artificial intelligence module 118 to determine whether the video frame has captured a particular type of object (e.g., a person, an animal, a vehicle, a package, etc.) to detect the triggering event. The type of input and/or the threshold for the triggering event may be varied according to the design criteria of a particular implementation.

In some embodiments, the neural network artificial intelligence 118 may be configured to determine when a triggering event is an emergency event. The emergency event may be a detection that may be determined to warrant immediate attention. In an example, the emergency event may comprise the detection of an intruder (e.g., a burglar), property damage (e.g., a broken pipe, a fire, a fallen tree, etc.), a loiterer (e.g., a suspicious person, a package thief, etc.), etc. The emergency events may be used to trigger the alerts for the automatic on demand backups. The type of triggering event determined to be an emergency event may be customized by the user and/or varied according to the design criteria of a particular implementation.

The cloud computing service 104 may comprise a number of blocks (or circuits) 120a-120n and/or a number of blocks (or circuits) 122a-122n. The circuits 120a-120n may each implement a storage server. The circuits 122a-122n may each implement a distributed server. The cloud computing service 104 may comprise other components (not shown). The number, type and/or arrangement of the components of the cloud computing service 104 may be varied according to the design criteria of a particular implementation.

The storage servers 120a-120n may be configured to provide storage resources. The storage servers 120a-120n may be implemented as a remote server computer. The storage servers 120a-120n may be provided as a service. The storage servers 120a-120n may not be dedicated to the system 100 (e.g., multiple end-users may access the storage resources of the storage servers 120a-120n). For example, the storage servers 120a-120n may comprise multiple, redundant storage media (e.g., hard disk drives, solid state drives, etc.) to enable multiple end-users to access data stored across the storage servers 120a-120n. Access to the storage resources of the storage servers 120a-120n may be fee-based (e.g., based on an amount of total storage resources used). For example, the removable storage 114 may store recent video data locally, while the storage servers 120a-120n may be configured to store large amounts of data long-term.

The storage servers 120a-120n may comprise a hierarchy of data storage. One tier of storage may be archival storage (e.g., glacial storage). Archival storage may be suited to data that may be accessed infrequently and/or data that may not be needed urgently. The storage servers 120a-120n may enable data to be retrieved from archival storage but may implement a waiting period (e.g., content may be available after waiting a day). Another tier of storage may be on-demand retrieval. On-demand storage may enable fast access to data (e.g., content may be available instantly or after a shorter amount of time than archival storage, such as a one hour wait). On-demand storage may have greater costs associated in terms of bandwidth costs and storage costs. In an example, archival storage may be on the order of 1000 times less expensive than on-demand storage. However, archival storage may not be suitable for real-time video access by end-users and/or providing notifications of events detected.

The distributed servers 122a-122n may be configured to provide computational resources. The distributed servers 122a-122n may be provided as a service. The distributed servers 122a-122n may not be dedicated to the system 100 (e.g., multiple end-users may access the computational resources of the distributed servers 122a-122n). The distributed servers 122a-122n may provide tiered services to enable access to the computational resources. Access to the computational resources of the distributed servers 122a-122n may be fee-based (e.g., based on an amount of computational resources used at one time, based on how long the computational resources are used, based on a percentage usage of the computational resources, etc.). For example, when an end-user accesses more of the computational resources of the distributed servers 122a-122n, then more fees may be charged. Generally, the system 100 may keep fees lower by restraining usage of the computational resources of the distributed servers 122a-122n (e.g., providing selected video frames and/or providing a low bitrate version of video frames instead of a full high bitrate video stream). For example, the computational resources of the distributed servers 122a-122n may use less computational resources and/or time when operating on low bitrate video streams compared to high bitrate video streams (e.g., less video data to operate on results in less computational resources used).

The distributed servers 122a-122n may each comprise a block (or circuit) 130. The circuit 130 may be a graphics processing unit (e.g., a video card). The graphics processing unit 130 may comprise a block (or circuit or module) 132. The module 132 may be a neural network artificial intelligence module. For example, the graphics processing unit

130 may be customized to perform neural network operations of the neural network artificial intelligence module (e.g., a dedicated neural network card). The distributed servers 122a-122n may comprise other components (such as a CPU, RAM, storage, etc., not shown). The number, type and/or arrangement of the components of the distributed servers 122a-122n may be varied according to the design criteria of a particular implementation.

The neural network artificial intelligence module 132 may be configured to perform a detection. In an example, the smart security devices 102a-102n may perform an initial detection to detect the triggering event. The neural network artificial intelligence module 132 may perform a second (e.g., additional) detection. The neural network artificial intelligence module 132 may be configured to perform advanced image analysis (e.g., object detection, object classification, facial recognition, computer vision, etc.) corresponding to the triggering event. In an example, the advanced image analysis may be configured to not only detect that a person is in the video frame but also that the person is a mail carrier (e.g., wearing a uniform, carrying a package, etc.). In another example, the advanced image analysis may be configured to not only detect that a vehicle is in the video frame but also detect the make and model of the vehicle. The advanced image analysis performed by the neural network artificial intelligence module 132 may use more computing resources than the computing resources used by the smart security devices 102a-102n to detect the triggering event. In an example, the advanced image analysis may use more computing resources than the processor 112 for analyzing the video frames for a particular amount of motion and/or a change in the amount of light to detect the triggering event (e.g., an amount of motion above a threshold amount of motion) and/or reading the input detected by the sensors 110a-110n.

The neural network artificial intelligence module 132 may be more effective (e.g., accurate) at detecting objects and/or recognizing characteristics of objects in video frames than the simple neural network artificial intelligence module 118 that may be implemented by one or more of the smart security devices 102a-102n. For example, the smart security devices 102a-102n may not implement the dedicated GPU 130. The neural network artificial intelligence module 132 may consume more power and/or more processing resources than the simple neural network module 118 of the smart security devices 102a-102n. For example, the simple neural network module 118 may be a modified and/or compressed version of the neural network module 132. The compressed simple neural network module 118 may have a reduced size and/or complexity to enable execution on the processor 112. The compressed simple neural network module 118 may use less computing resources than the neural network module 132. However, the reduced size and/or complexity of the simple neural network module 118 may result in less predictive power and/or accuracy than using the neural network module 118. In some embodiments, the simple neural network 118 and the neural network artificial intelligence module 132 may comprise overlapping (or redundant capabilities). For example, the smart security devices 102a-102n may be capable of performing some (or all) of the functionality of the distributed servers 122a-122n locally (e.g., as an edge device, without uploading video data to the cloud computing service 104).

The distributed servers 122a-122n may be configured to provide packages of tools that may be suitable for internet-of-things (IoT) devices such as the smart security devices 102a-102n. The tools offered by the distributed servers 122a-122n may be useful to end-users of the smart security devices 102a-102n, but may comprise a cost to the vendors of the smart security devices 102a-102n. Access to the GPU 130 of the distributed servers 122a-122n may be more expensive for high bitrate video (e.g., more of the distributed servers 122a-122n may be needed to process high bitrate video and/or more time may be reserved from the distributed servers 122a-122n in order to process the high bitrate video).

Generally, storage resources provided by the storage servers 120a-120n are less expensive than the computing resources provided by the distributed servers 122a-122n. For example, the video data generated by the smart security devices 102a-102n may be stored by the storage servers 120a-120n at a less expensive fee than using the neural network artificial intelligence module 132 to analyze the same amount of video data with the distributed servers 122a-122n. The system 100 may be less restrictive with storing video data in the storage servers 120a-120n than with processing the video data in the distributed servers 122a-122n.

The distributed servers 122a-122n and/or the storage servers 120a-120n may be configured to store data, retrieve and transmit stored data, process data and/or communicate with other devices (e.g., the user device 106). The distributed servers 122a-122n and/or the storage servers 120a-120n may be implemented as part of a cloud computing platform (e.g., distributed computing). In an example, the distributed servers 122a-122n and/or the storage servers 120a-120n may be implemented as a group of cloud-based, scalable server computers. By implementing a number of scalable servers, additional resources (e.g., power, processing capability, memory, etc.) may be available to process and/or store variable amounts of data. For example, the distributed servers 122a-122n and/or the storage servers 120a-120n may be configured to scale (e.g., provision resources) based on demand. The distributed servers 122a-122n and/or the storage servers 120a-120n may implement scalable computing (e.g., cloud computing). The scalable computing may be available as a service to allow access to processing and/or storage resources without having to build infrastructure (e.g., the provider of the system 100 may not have to build the infrastructure of the distributed servers 122a-122n and/or the storage servers 120a-120n). In some embodiments, a same cloud-services provider may provide both the distributed servers 122a-122n and/or the storage servers 120a-120n.

The user device 106 may be configured to enable a user (e.g., a homeowner, a property owner, an employee, security personnel, etc.) to interact with the system 100. For example, the circuit 106 may have a wired and/or wireless connection to the network 50 and/or the smart security devices 102a-102n. In some embodiments, the user device 106 may be separated from the smart security devices 102a-102n by long distances (e.g., miles). In the example shown, the user device 106 may be a smartphone (e.g., a handheld or portable user device). In some embodiments, the user device 106 may be implemented as a desktop computer, a laptop computer, a smart watch, a tablet computing device, etc. Generally, the user device 106 may be a device configured to communicate wirelessly, display video content and/or receive/transmit audio. The type of device implemented as the user device 106 may be varied according to the design criteria of a particular implementation.

The smart security devices 102a-102n and/or the cloud computing service 104 may be configured to wirelessly communicate the video data (e.g., one or more video streams) to the user device 106. In an example, the processor 112 and/or the distributed servers 122a-122n may be configured to format the video streams to be communicated and/or establish a wireless communication link between the smart security devices 102a-102n, the cloud computing service 104 and the user device 106 (e.g., using Wi-Fi, cellular communication such as 3G/4G/LTE/5G, Bluetooth, etc.). Video streams and/or other data may be transmitted between the smart security devices 102a-102n, the cloud computing service 104 and the user device 106 (e.g., instructions and/or commands may be sent from the smartphone 106 to one or more of the smart security devices 102a-102n and/or the cloud computing service 104, audio for implementing a two-way intercom may be transmitted, information about objects detected by video analysis performed by the distributed servers 122a-122n may be transmitted to the smartphone 106, etc.). The type of information communicated, and/or the wireless communication protocol(s) implemented may be varied according to the design criteria of a particular implementation.

The smart security devices 102a-102n may be configured to detect triggering events in real-time. In some embodiments, the triggering events may be detected based on thresholds that are less computationally intensive than the object detection performed by the neural network artificial intelligence module 132. When the processor 112 detects one or more triggering events, the processor 112 may generate a control signal. The control signal may be configured to control the various components 110a-110n. In one example, the light 108b may be generated in response to the triggering events.

In some embodiments, the processor 112 may generate and/or apply metadata to the video frames that correspond to the triggering events (e.g., objects detected, intruder detected, behavior detected, etc.). For example, in response to detecting a person, metadata may be added to the video frames that indicate a person has been detected. The metadata may further comprise characteristics of objects detected. For example, characteristics of the person detected may comprise a hair color, a height, color of clothing worn, an amount of time that the person loitered in the area, etc. The type of metadata added by the processor 112 to the video frames may be varied according to the design criteria of a particular implementation.

The video frames and/or the metadata generated and/or applied to the video frames by the processor 112 may be uploaded to the cloud computing service 104. The cloud computing service 104 may enable the end users to access the stored video frames using the user device 106. The storage servers 120a-120n may store the video frames and/or metadata. The distributed servers 122a-122n may be configured to perform various operations (e.g., modifications such as encoding, transcoding, cutting, cropping, etc.) on the stored video frames. In some embodiments, the neural network AI 132 may be configured to perform various computer vision operations (e.g., object detection, characteristic detection, facial recognition, etc.). The various operations performed by the cloud computing service 104 may have a monetary cost that may depend on the amount of time spent performing the operations and/or the hardware resources applied to perform the operations.

The distributed servers 122a-122n may be configured to process the still images using the neural network AI modules 132. The distributed servers 122a-122n may generate a response based on the results of analyzing the still images using the neural network AI modules 132. In one example, if the neural network AI modules 132 do not detect an object, the distributed servers 122a-122n may generate a response that notifies the smart security devices 102a-102n to not upload the video data to the storage servers 120a-120n. In another example, if the neural network AI modules 132 do not detect an object, the distributed servers 122a-122n may determine why the triggering event detected by the smart security devices 102a-102n resulted in a false positive and generate a response that provides feedback to the smart security devices 102a-102n to help prevent future false positives. In yet another example, if the neural network AI modules 132 does detect an object, the distributed servers 122a-122n may generate a response that instructs the smart security devices 102a-102n to upload the video data that corresponds to time of the detected object to the storage servers 120a-120n. In still another example, if the neural network AI modules 132 does detect an object, the distributed servers 122a-122n may generate a response that notifies the smart security devices 102a-102n that the object was detected and the smart security devices 102a-102n may send a real-time notification to the user device 106 with information about the detected object. The response of the distributed servers 122a-122n and/or the smart security devices 102a-102n to the detected object may be varied according to the design criteria of a particular implementation.

Various types of input detected by the smart security devices 102a-102n may be determined to be one of the triggering events. For example, the triggering events may be any type of event determined to be relevant (e.g., motion detected, a button pressed, a time schedule, data from an external sensor, etc.). For example, the system 100 may combine multiple modalities of detection on the smart security devices 102a-102n (e.g., using a combination of any, some, or all of vision, passive IR motion, sound, touch sensors, etc. to decide when to trigger) to determine information that may be used for metadata.

The smart security devices 102a-102n may not necessarily implement the simplified neural network AI modules 118. One, or more, or none of the smart security devices 102a-102n may implement the simplified neural network AI modules 118. Generally, the smart security devices 102a-102n may be less capable of detecting objects (e.g., relatively dumb) compared to the distributed servers 122a-122n. However, the smart security devices 102a-102n may be capable (e.g., smart enough) to filter down the set of events for the distributed servers 122a-122n to process.

The smart security devices 102a-102n may be configured to upload data (e.g., the captured video data, still images, audio, etc.) to the distributed servers 122a-122n and/or the storage servers 120a-120n. For example, the data uploaded to the storage servers 120a-120n may be streamed to the user device 106. The user device 106 may connect to the storage servers 120a-120n to allow the user to request the stored video data. For example, the video data may be sent to the user device 106 as a live (or nearly live) video stream. The data traffic to/from the smart security devices 102a-102n, the distributed servers 122a-122n, the user device 106 and/or the storage servers 120a-120n may be encrypted (e.g., AES 128-bit encryption, AES 256-bit encryption, etc.). User account passwords may be salted and hashed with a cryptographic hash function.

The functionality of the system 100 may be configured to leverage the hardware of the smart security devices 102a-102n and the processing capabilities of the distributed servers 122a-122n. For example, the hardware of the smart security devices 102a-102n may be capable of implementing the functionality for detecting the triggering event (e.g., detecting motion, recording video data, analyzing audio, etc.). In some embodiments, the system 100 may be enabled by performing a firmware update of the smart security devices 102a-102n. The firmware update may provide updated computer readable instructions for the processor 112 to enable selecting images from the video data and communicating the selected images to the distributed servers 122a-122n (e.g., instead of uploading the full video stream). Details of the system 100 may be described in association with U.S. application Ser. No. 16/540,309, filed on Aug. 14, 2019, U.S. application Ser. No. 17/241,410, filed on Apr. 27, 2021 and/or U.S. application Ser. No. 17/531,752, filed on Nov. 21, 2021, appropriate portions of which are incorporated by reference.

In some embodiments, the smart security devices 102a-102n may appear similar to a standard outdoor light (e.g., a porch light, a flood light, etc.). The smart security devices 102a-102n may be configured as edge devices for the system 100. In an example, the smart security devices 102a-102n may be configured to perform edge processing and/or provide edge (e.g., local) storage using the removable storage 114. The edge storage 114 may enable storage of high bitrate video, without communicating a large amount of video data to the cloud computing service 104. For example, the edge storage 114 may provide 24/7 storage for the highest quality video. Storing high bitrate video locally may enable forensic analysis of the video by the end users. In an example, the local storage 114 may be implemented as a SD card, a portable solid state drive a portable hard drive, a flash drive, etc. The local storage 114 may enable video data to be stored locally on the smart security devices 102a-102n. Storing data locally may enable 24/7 video recordings to be stored without incurring costs (e.g., bandwidth costs and/or storage costs associated with the storage servers 120a-120n). The smart security devices 102a-102n may be configured to upload low bitrate video to the cloud computing service 104 instead of the high bitrate video. The indexing and/or metadata generated by the processor 112 may enable the common video content between the high bitrate video and the low bitrate video to be synchronized.

The system 100 may further comprise a block 140. The block 140 may comprise a remote monitoring service. The video frames, the audio and/or notifications about events generated by the smart security devices 102a-102n may be communicated to the remote monitoring service 140. The remote monitoring service 140 may be a centralized location and/or a decentralized service that enables security personnel to monitor the video streams and/or notifications (e.g., events) generated by the smart security devices 102a-102n. In some embodiments (e.g., for a homeowner and/or a small business owner) the user may perform manual security monitoring (e.g., as an amateur) without hiring the remote monitoring service 140. In some embodiments, (e.g., for a larger business that may have many properties), the owner may hire the remote monitoring service 140 to provide manual security monitoring. The manual security monitoring may supplement automatic security monitoring provided by the smart security devices 102a-102n.

The remote monitoring service 140 may comprise groups/teams 142a-142n. The groups 142a-142n may each comprise a number of employees 144a-144n. The employees 144a-144n may each monitor the video feeds and/or alerts (e.g., notifications of events) generated by the smart security cameras 102a-102n. Each group 142a-142n may monitor a subset of the smart security devices 102a-102n (e.g., each group 142a-142n may be assigned to a subset of 1000-2000 of the smart security cameras 102a-102n). In some embodiments, each of the employees 144a-144n of one of the groups 142a-142n may monitor the same large group of the smart security devices 102a-102n but each of the employees 144a-144n may be assigned to one of the event priority levels. The employees 144a-144n may be professional security personnel. Each of the employees 144a-144n may have access to one implementation of the user device 106.

In the example shown, the groups 142a-142n are all shown at a single location of the remote monitoring service 140. In some embodiments, the groups 142a-142n and/or the employees 144a-144n within each of the groups 142a-142n may be at multiple different locations. For example, the groups 142a-142n and/or the employees 144a-144n may be located in the same building, different buildings, the same city, different cities, the same country, different countries, etc. The location of the remote monitoring service 140 may be different from the location of the cloud computing service 104, the property being monitored, the location of the property owner and/or the smart security devices 102a-102n. In an example, of the groups 142a-142n may be located in North America, while another of the groups 142a-142n may be located in Europe, while another of the groups 142a-142n may be located in Asia. The arrangement and/or location of the groups 142a-142n may be varied according to the design criteria of a particular implementation.

Figure 2:
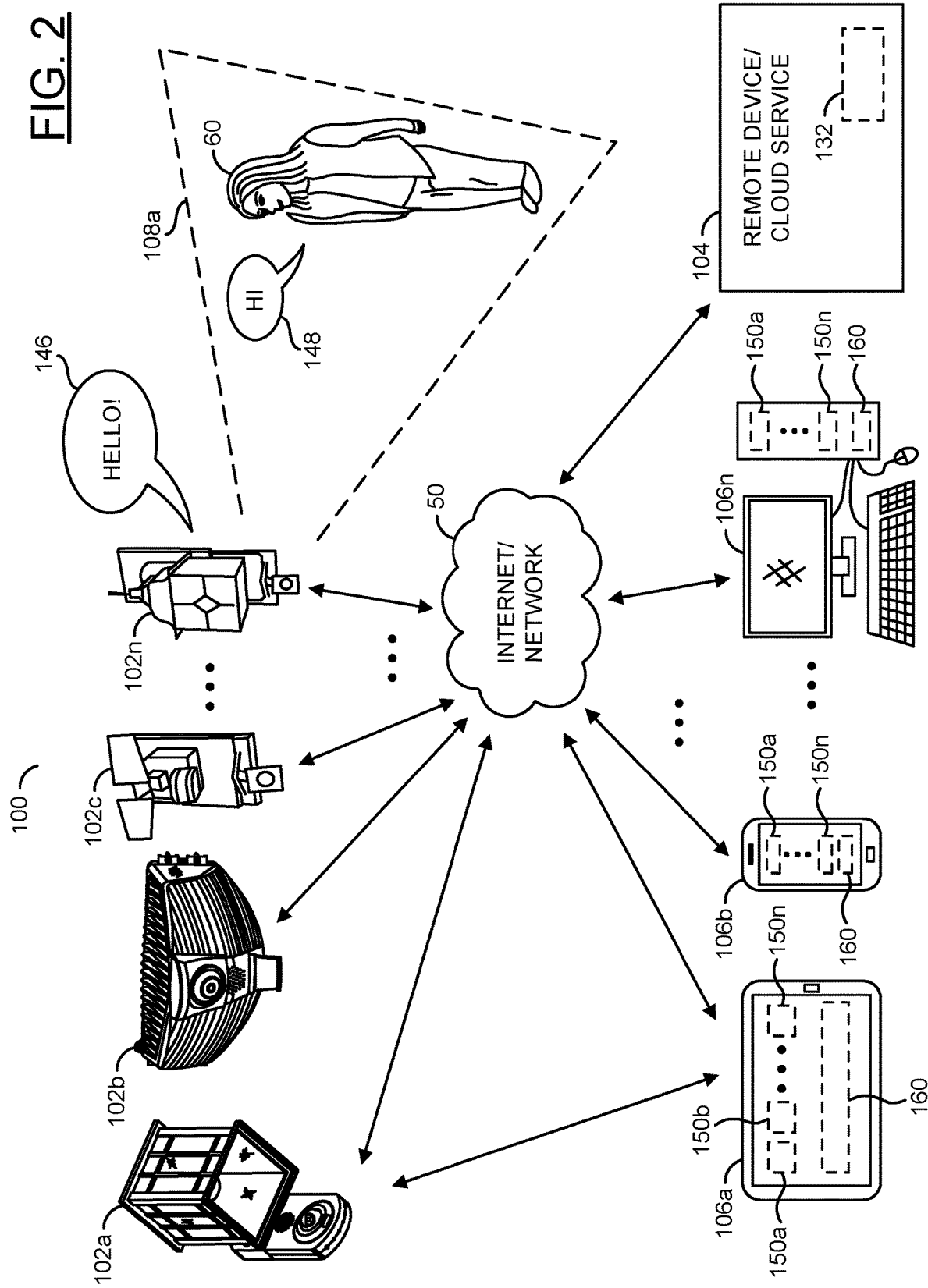
FIG. 2 is a diagram illustrating a system configured to implement mobile distributed security.

Referring to FIG. 2, a diagram illustrating a system configured to implement mobile distributed security is shown. An alternate embodiment of the system 100 is shown. The system 100 may comprise the network 50, a visitor 60, the smart security devices 102a-102n, the cloud computing service 104 and a number of the user devices 106a-106n. In one example, the user devices 106a-106n may be used by the employees 144a-144n of the remote monitoring service 140. The visitor 60 may be a visitor to a premises, a property owner, an employee, a loiterer, a burglar, a delivery person, etc. In the system 100, the smart security devices 102a-102n may implement an outdoor hub for outdoor internet-of-things (IoT) devices. The smart security devices 102a-102n may be implemented at a single property and/or spread across multiple different properties.

In the example shown, the smart security device 102a may be a smart security light implemented as an exterior porch light (e.g., a camera integrated with a light implemented as a single unit as described in association with U.S. application Ser. No. 15/611,975, filed on Jun. 2, 2017, now U.S. Pat. No. 10,117,309, appropriate portions of which are incorporated by reference). In the example shown, the smart security device 102b may be a smart security floodlight (e.g., a camera integrated as a single unit with a floodlight, a high intensity spotlight, flashing colored lights and/or speakers as described in association with U.S. application Ser. No. 16/850,944, filed on Apr. 16, 2020 and U.S. application Ser. No. 17/241,410, filed on Apr. 27, 2021, appropriate portions of which are incorporated by reference). In the example shown, the smart security devices 102c and 102n may implement an exterior light attached to a wall plate (e.g., a standalone outdoor light fixture attached to a wall plate with a camera and the components 110a-110n, the processor 112, etc.). The wall plate embodiment of the smart security devices 102c and 102n may enable an end user to add functionality of the components 110a-110n and the processor 112 to any light fixture. For example, the wall plate embodiment may be compatible with any standard outdoor light fixture available at common hardware stores. Details of the wall plate camera may be described in association with U.S. application Ser. No. 16/585,342, filed on Sep. 27, 2019 and U.S. application Ser. No. 17/026,647, filed on Sep. 21, 2020, appropriate portions of which are incorporated by reference. In some embodiments, the smart security devices 102a-102n may implement a smart security doorbell. The smart security devices 102a-102n may be implemented at a single location (e.g., at one property) and/or at multiple locations (e.g., at multiple properties such as security for a neighborhood). The types and/or styles of smart security devices 102a-102n may be varied according to the design criteria of a particular implementation.

The smart security devices 102a-102n may each comprise the various sensors and/or actuators 110a-110n. The smart security devices 102a-102n may be configured to read sensor data from the sensors 110a-110n to make inferences about the environment. In one example, one of the sensors 110a-110n implemented by the smart security devices 102a-102n may be a camera sensor.

Camera sensors implemented by the smart security devices 102a-102n may be configured to enable video frames to be generated (e.g., convert light input to raw pixel data that may be used by a processor to generate video frames). The processor 112 implemented by each of the smart security devices 102a-102n may be configured to perform video analysis (e.g., object detection, behavior detection, facial recognition, object classification, conduct inferences against a machine learning model, etc.). The smart security devices 102a-102n may each implement a wireless module. The wireless modules may enable the smart security devices 102a-102n to communicate wirelessly (e.g., using Wi-Fi, ZigBee, Bluetooth, LTE, etc.) via the internet 50 and/or a local connection. In the example shown, the smart security device 102a may communicate directly with the user device 106a (e.g., a device-to-device connection, such as Bluetooth). The wireless communication capability may enable the smart security devices 102a-102n to operate as a hub for a variety of network-connected devices. For example, the network-connected devices may communicate directly with the smart security devices 102a-102n on a local network and the smart security devices 102a-102n may communicate information from the network-connected devices to the cloud computing service 104 via the internet 50.

The smart security devices 102a-102n may be configured to communicate the sensor data and/or the inferences made in response to performing sensor fusion operations on the sensor data to the cloud computing service 104 and/or the user devices 106a-106n via the network 50. The smart security devices 102a-102n may operate independently of the network 50 (e.g., without instructions from the cloud computing service 104 and/or the user devices 106a-106n). Communication with the cloud computing service 104 and/or the user devices 106a-106n may enhance the capabilities of the smart security devices 102a-102n. In one example, the processing capabilities of the cloud computing service 104 may enable faster and/or more detailed video analysis of the video frames and/or audio data captured by the smart security devices 102a-102n. In another example, the cloud computing service 104 may enable greater storage capacity than is available on the smart security devices 102a-102n.

The cloud computing service 104 may be configured to provide processing and/or mass storage for the system 100. Generally, the cloud computing service 104 may be located off-site from the smart security devices 102a-102n. The cloud computing service 104 may be configured to store data, retrieve and transmit stored data, process data and/or communicate with other devices.

In some embodiments, the video analysis and/or audio analysis may be performed by the processor 112 implemented by the smart security devices 102a-102n (e.g., local inferencing performed by an edge device). For example, the smart security devices 102a-102n may implement a machine learning model configured to run on a low-powered and/or low-resource device such as the smart security devices 102a-102n. In some embodiments, the smart security devices 102a-102n may be configured to generate the video frames and capture the audio input and upload the video frames and audio input to the cloud computing service 104. The cloud computing service 104 may perform the video analysis and/or the audio analysis (e.g., inferencing performed remotely by a cloud processing service). For example, the cloud computing service 104 may comprise high-powered and/or have access to more computing resources in order to implement the machine learning model. The cloud computing service 104 may generate results based on the video analysis and/or the audio analysis and the results may be transmitted to the smart security devices 102a-102n.

The user devices 106a-106n may enable a user to send and/or receive information to/from the smart security devices 102a-102n. The user devices 106a-106n may provide a graphical user interface to enable a property owner (or another authorized person) to interact with the smart security devices 102a-102n (e.g., a companion app). In an example, the graphical user interface of the user devices 106a-106n may be used to adjust the settings of the various sensors implemented by the smart security devices 102a-102n. In another example, the companion app may provide an interface to provide a schedule to control greetings output by the smart security devices 102a-102n. In yet another example, the companion app may be used to enable 2-way audio between the visitor 60 and the property owner (e.g., without having to be physically near each other).

The user devices 106a-106n may be configured to communicate with the cloud computing service 104. For example, the user devices 106a-106n may be configured to retrieve video data and/or audio data stored by the cloud computing service 104. The user devices 106a-106n may be configured to receive notifications from the smart security devices 102a-102n and/or the cloud computing service 104. In one example, the notification may be a message that indicates that the sensors 110a-110n of the smart security devices 102a-102n have detected an object (e.g., a person, a vehicle, a package, etc.).

The user devices 106a-106n may be implemented as portable devices configured to display graphics (e.g., text, interfaces, video, etc.), communicate audio (e.g., send and receive audio) and/or communicate with a network (wired or wirelessly). In some embodiments, one or more of the user devices 106a-106n may be implemented as a smartphone, a smart watch, a tablet computing device, a phablet, a desktop computer, a laptop computer, a netbook, etc. The user devices 106a-106n may be configured to execute instructions to provide the companion app that enables and/or facilitates communication between the user devices 106a-106n and the smart security devices 102a-102n. In some embodiments, the user devices 106a-106n may be implemented as a voice-controlled device (e.g., implemented without a display, and uses voice input to receive instructions and audio output to provide information to the end user, such as an Amazon Alexa, a Google Home, etc.). The type of devices implemented as the user devices 106a-106n may be varied according to the design criteria of a particular implementation.

A speech bubble 146 is shown. The speech bubble 146 may be an audio message generated by the smart security devices 102*a*-102*n*. In the example shown, the audio message 146 may be a greeting generated in response to the detected visitor 60. The smart security devices 102*a*-102*n* may comprise an audio output device (e.g., an audio processor and/or a speaker) to generate audio and/or the speech 146. In the example shown, the visitor 60 may be an object detected based on the video analysis of the video frames. In one example, the audio message 146 may be intelligently selected by each of the smart security devices 102*a*-102*n* in response to the visitor 60, characteristics of the visitor 60 and/or behavior of the visitor 60. In another example, the audio message 146 may be real-time two-way communication to enable a remote operator to speak from another location using the smart security devices 102*a*-102*n*.

The smart security devices 102*a*-102*n* may be configured to use artificial intelligence to generate context-relevant speech (e.g., select an appropriate greeting when the visitor 60 is detected, a personalized greeting when a resident is detected, delivery instructions when a package is detected, an appropriate audio reaction to sounds made by the visitor 60, etc.). The smart security devices 102*a*-102*n* may be configured to implement sensor fusion to make inferences based on various sensor readings. The sensor fusion may enable inferences to be made by combining sensor readings from disparate sources that would not be able to be determined from reading one of the sensor readings alone. Implementing the sensor fusion may enable the smart security devices 102*a*-102*n* to implement a conversational artificial intelligence.

The field of view 108*a* may represent an area monitored by the smart security devices 102*a*-102*n*. The field of view 108*a* may capture the visitor 60. The smart security devices 102*a*-102*n* may be configured to perform video analysis on video frames to detect the visitor 60 and determine an identity of the visitor 60. The smart security devices 102*a*-102*n* may generate metadata for the video frames captured that indicates that the visitor 60 was detected in the field of view 108*a* at a particular time. For example, one or more features/characteristics (e.g., the face, the height, the gait, etc.) of the visitor 60 may be detected by the smart security devices 102*a*-102*n* and compared with stored features/characteristics. The video analysis may be used to determine a classification and/or identification of the visitor 60 based on the object detected and/or the features/characteristics of the object.

A speech bubble 148 is shown. The speech bubble 148 may be a response from the visitor 60. In the example shown, the speech bubble 148 may be a vocal response to the audio message 146. In some embodiments, the speech bubble 148 may be a noise caused by the visitor 60 (e.g., breaking glass, knocking on a door, etc.). The smart security devices 102*a*-102*n* may comprise an audio capture device (e.g., an audio processor and/or a microphone) configured to receive audio and/or the response 148. In the example shown, the visitor 60 may be an object detected based on the video analysis of the video frames. The audio input 148 may be received by the smart security devices 102*a*-102*n*. The audio input 148 may be analyzed (e.g., audio analysis) in order to determine the content of the audio input 148. The content of the audio input 148 may be used to generate a context-appropriate reaction. Analyzing the audio input 148 may be part of the analysis of the response of the visitor 60 (e.g., the behavior of the visitor 60). The audio message 146, the response 148 and/or the reaction by the smart security devices 102*a*-102*n* may be part of the active engagement implemented by the smart security devices 102*a*-102*n*.

In some embodiments, the smart security devices 102*a*-102*n* may be configured to perform the authentication of the visitor 60. In one example, the identification performed by the audio analysis may implement the authentication. Other sensors implemented by the smart security devices 102*a*-102*n* may be configured to provide evidence and/or confidence for the authentication. For example, video analysis, voice detection, RFID, etc. may be implemented to perform the authentication. In some embodiments, the audio message 146 may be generated in response to the authentication (e.g., the authentication may provide the identity of the visitor 60, and the audio message 146 may be configured to greet the visitor 60 by name based on the identification).

The authentication may be configured to enable the smart security devices 102*a*-102*n* to receive commands from the visitor 60. In one example, if the visitor 60 has been authenticated, the visitor 60 may provide voice-based commands (e.g., the audio input 148 may be the voice-based commands if the visitor 60 is authentication). For example, there may be a list of voice commands that property owners would like to have while outside the home. To enable voice commands outside the home, authentication may be implemented. With authentication, the voice commands may be configured to provide wireless control of various network-connected devices (e.g., door locks, garage door openers, outdoor lighting, keeping the devices quiet, arm/disarm door alarm systems, etc.). The smart security devices 102*a*-102*n* may be configured to receive the commands, and then perform a functionality corresponding to the commands. The functionality corresponding to the received commands may be performed by one or more of the network-connected devices. The smart security devices 102*a*-102*n* may communicate (e.g., wirelessly) the commands to the network-connected devices. The detection of the audio input 148 may be stored as part of the metadata.

A robust and easy outdoor classification process may be implemented by the smart security devices 102*a*-102*n*. The identification and/or classification may rely on two or more data points and/or signals (e.g., sensor fusion). Once visitors are authenticated (e.g., against a whitelist (or allow list) of approved visitors such as family and friends), other detected visitors may be considered 'unfamiliar' and/or 'unwanted' visitors.

The system 100 may be configured to provide a reaction to the visitor 60 detected, the classification detected and/or the behavior of the visitor 60 detected. The smart security devices 102*a*-102*n* may implement a hub that provides a connection to the Internet (e.g., the network 50) and provides control to other network connected devices. For example, one or more of the smart security devices 102*a*-102*n* may perform an authentication and initiate the reaction (e.g., a command) in response to a voice command. The reaction may be initiated by controlling another network connected device such as a door lock. Generally, one or more of the smart security devices 102*a*-102*n* and/or one or more of the internet-connected devices may implement a microphone (e.g., for voice authentication, to analyze the vocal response 148 by the visitor 60 and/or to receive the voice command 148).

A combination of audio (e.g., voice) analysis, video analysis and/or a schedule may enable intelligent selection of the audio message 146 and/or the reaction to the input audio 148. The characteristics detected may be used to adjust a confidence level of the classification and/or identification of the visitor 60. When the confidence level is determined to be above a threshold (e.g., 99% confidence) then the audio message 146 and/or reaction may be selected.

The confidence level may represent a likelihood that the classification and/or identification of the visitor 60 determined is correct. Classification and/or identification factors (e.g., characteristics) may comprise facial recognition, a barcode, hand gestures, height of visitors, etc.

The smart security devices 102a-102n may be configured to generate different audio messages and/or reactions that may be adapted to the situation. In one example, the situation may be the time of day. The audio message 146 and/or the reaction may be selected to correspond to the detected time of day. For example, the audio message 146 may be a greeting that comprises "good morning" may be selected for the morning (e.g., between 6 am and 11 pm) and another greeting that may comprise "good evening" may be selected for the evening (e.g., between 4 μm and midnight). Similarly, the selection of the reaction may be affected by the time of day (e.g., a welcome message during the day, and a warning to leave the premises at night).

The reaction may be selected based on an analysis of the video and/or audio detected after the audio message 146 has been provided. The reaction may be further selected based on other factors. In one example, the reaction may be further selected based on the time of day. In another example, the reaction may be further selected based on using sensors implemented by the smart security devices 102a-102n (e.g., using sensor fusion). In yet another example, the reaction may be further selected based on settings input on the companion app. The selection of the audio message 146 and/or reaction may be triggered by the detection of the visitor 60 at any time of (e.g., available 24/7). For example, the visitor 60 may be an unexpected visitor (e.g., an unrecognized person). In another example, the visitor 60 may be an expected visitor (e.g., a scheduled appointment and/or a face recognized using facial recognition video analysis). In yet another example, the video analysis may detect a package delivery and the visitor 60 may be the delivery person with a delivered package at the door.

Using camera sensor technology, AI technology (performed by the server 104 and/or the smart security devices 102a-102n), and market understanding of user behavior, the smart security devices 102a-102n may be configured to automatically select the audio message 146 and/or the reaction to deliver depending on the detected circumstance. The reaction may comprise a sequence of interactions with the visitor (e.g., continuous, active engagement).

The video analytics may be used to detect and/or classify objects (e.g., the visitor 60). Other sensor data may be captured (e.g., audio, motion, temperature, light levels, etc.). The processor 112 on the smart security devices 102a-102n and/or distributed (e.g., cloud) processing may be configured to perform sensor fusion to make inferences using information from multiple disparate sources (e.g., inferences that may not be performed from a single source of information alone). In one example, using video analytics and conversational AI, a package delivery person may be detected. The reaction may comprise specific instructions provided by the smart security devices 102a-102n when the package delivery person is detected. For example, the conversational AI may provide the reaction having an audio message such as, "please leave packages behind planter".

The smart security devices 102a-102n may be configured to intelligently react to responses (e.g., the audio response 148) by the detected visitor 60. For example, the smart security devices 102a-102n may provide reactions that comprise learning questions to attempt encourage the visitor 60 to provide information that may be used to identify and/or classify the visitor 60. Once the smart security devices 102a-102n learn the type (e.g., classification) of the visitor 60, the smart security devices 102a-102n may generate reactions appropriately (e.g., contextually accurate reactions). For example, if the smart security devices 102a-102n identify the visitor 60 as a burglar, the smart security devices 102a-102n may provide escalating reactions (e.g., first ask the burglar to leave politely, then provide a warning, then perform more aggressive actions such as sounding an alarm, then contacting the police, etc.). In response to detecting and/or classifying the visitor 60, the processor 112 may generate metadata for the captured video frames that indicate that the visitor 60 has been detected in the captured video frames.

After providing an action based on the selected reaction (e.g., asking a question), the smart security devices 102a-102n may observe the response of the visitor 60. The next reaction performed by the smart security devices 102a-102n may be selected based on the response of the visitor 60 (e.g., determined by further performing video analysis and/or audio analysis). For example, if the visitor 60 leaves, then no next reaction may be necessary. If the visitor 60 provides a name in the response 148, then the next reaction may include the name of the visitor (e.g., "Hi, Bob, we were expecting you, please wait while we come to the door").

The user devices 106a-106n are shown comprising a number of blocks (or circuits) 150a-150n. The circuits 150a-150n may implement various hardware components of the user devices. In an example, the circuit 150a may implement a processor, the circuit 150b may implement a memory, the circuit 150c may implement an input/output (I/O) interface, the circuit 150d may implement a communications module, etc. The circuits 150a-150n may enable the user devices 106a-106n to present output and/or receive input. The circuits 150a-150n may be configured to execute computer readable instructions. The number, type and/or functionality of the circuits 150a-150n may be varied according to the design criteria of a particular implementation.

The user devices 106a-106n may comprise a block (or circuit or module) 160. The module 160 may be the companion app. In an example, the companion app 160 may implement a video feed monitoring app configured to provide a mobile distributed security response. The various hardware circuits 150a-150n may be configured to execute the computer readable instructions to display output, receive input and/or determine internal states for the companion app 160. The companion app 160 may be configured to implement the AI-based security monitoring service. The companion app 160 may be configured to intelligently display video feeds in response to the video data generated by the smart security devices 102a-102n and/or events detected. The companion app 160 may be configured to enable the real-time two-way communication (e.g., the generation of the audio output 146 and the reception of the audio response 148). In one example, the companion app 160 may be a mobile app and/or a desktop executable program. In another example, the companion app 160 may be implemented as a web-app. In another example, the companion app 160 may be implemented as a conversational application for a smart home device (e.g., no video feed may be available for a smart home device without a screen). For example, the companion app 160 may be an Amazon Alexa Skill. The companion app 160 may be configured to operate using various computing devices (e.g., mobile phones, desktop computers, laptop computers, netbooks, tablet computing devices, smart home devices, etc.) and/or operate using various operating systems (e.g., Windows, iOS, Linux, Android, etc.). The functionality of the companion app 160 may be varied according to the design criteria of a particular implementation.

The AI model 132 may be configured to intelligently select the video feeds for the companion app 160 to display and/or the arrangement for displaying the video feeds. The AI model 132 may be configured to filter out only events of interest as the events occur. The AI model 132 may be configured to determine the output selected for the smart security devices 102a-102n. In an example, the AI model 132 may determine the order of responses to generate the increasingly severe messages. The AI model 132 may be configured to determine when to generate a request for live engagement (e.g., from a security service) and/or when to request a physical presence (e.g., request an on-scene visit from a security guard (or security personnel) or the police as a last resort). The AI model 132 may be configured to learn in response to feedback. The learning performed by the AI model 132 may be based on feedback received in response to the arrangement of the video feeds displayed, feedback received in response to detecting events, feedback received in response to selecting particular reactions for the smart security devices 102a-102n, feedback received in response to enabling live engagement, feedback received in response to deploying on-site security, etc.

Figure 3:
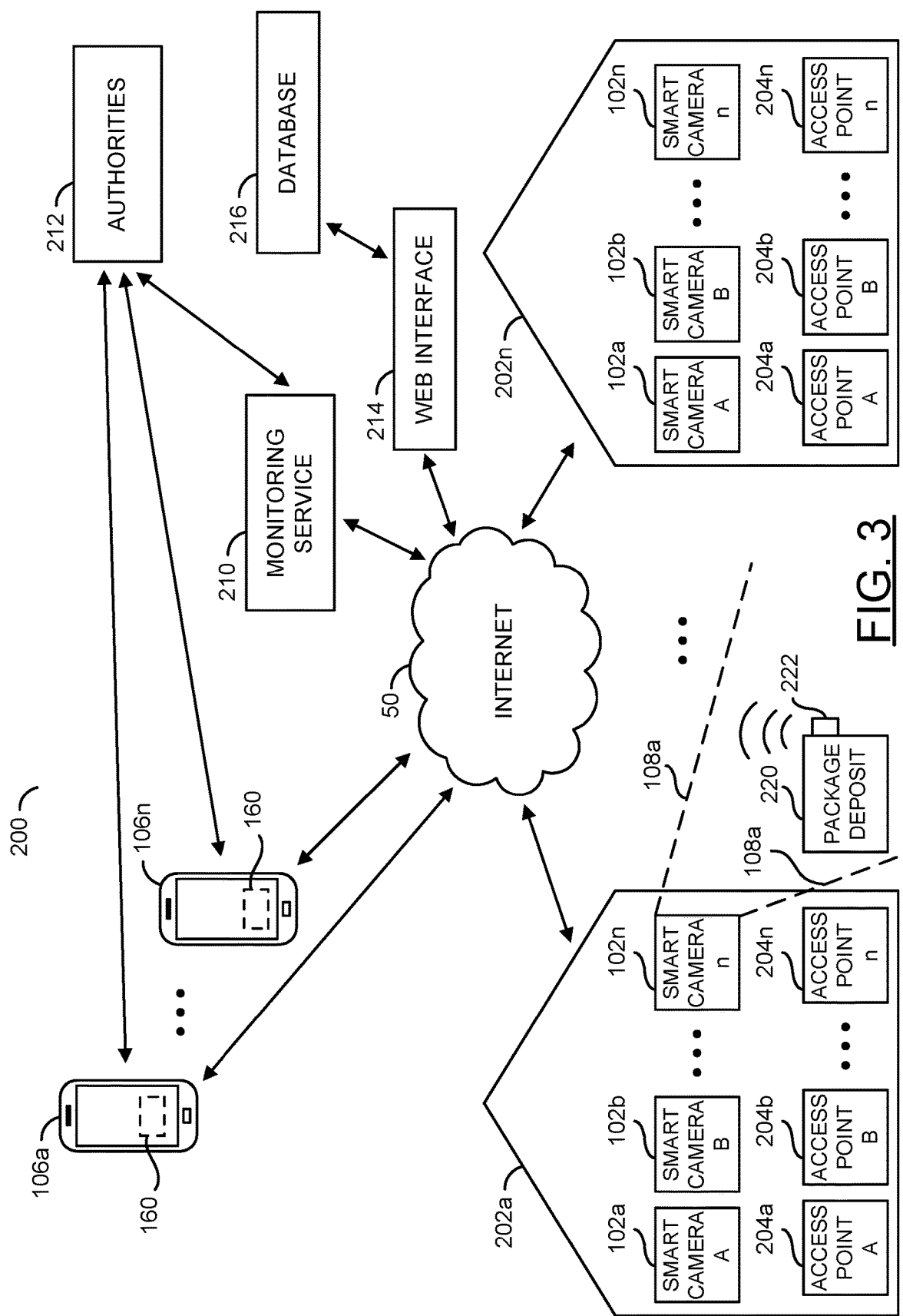
FIG. 3 is a diagram illustrating an example cloud-based security system.

Referring to FIG. 3, a diagram illustrating an example cloud-based security system 200 is shown. The system 200 generally comprises blocks 202a-202n. The blocks 202a-202n may be homes and/or business premises. Each of the homes 202a-202n may comprise blocks 204a-204n. The blocks 204a-204n may be areas of interest (e.g., access points to the homes and/or business premises 202a-202n). The smart security devices (e.g., implemented as doorbells, floodlights, security cameras, etc.) 102a-102n may be set up at each of the areas of interest 204a-204n of the homes and/or business premises 202a-202n. For example, the smart security devices 102a-102n may be configured to monitor the areas of interest 204a-204n.

The system 200 may further comprise the internet 50 and/or the cloud service 104, the mobile devices 106a-106n, a monitoring service 210, authorities 212 (e.g., for in-person response), a web interface 214 and/or a database 216. The companion app 160 is shown implemented by the mobile devices 106a-106n. In one example, the monitoring service 210 may be a virtual monitoring service. In another example, the monitoring service 210 may be a person from a central monitoring service (e.g., a live receptionist working the remote call center 140 that may be located anywhere in the world). In one example, the authorities 212 may be the police department, the fire department, an ambulance, a private security service and/or other emergency services. The web interface 214 may be used to generate the interface for the companion app 160.

In one example, the video feed monitoring app 160 may be used by monitoring personnel (e.g., the employees 144a-144n) and/or patrol guards. The monitoring personnel may be located on-site and/or at an entirely different location (e.g., the remote location of the remote monitoring service 140). The monitoring personnel 144a-144n may work for the central monitoring service 210 and/or a small distributed office. The patrol guard (e.g., one of the monitoring personnel 144a-144n) may be a person located on-site that may provide a live response. The patrol guard may use the video feed monitoring app 160 while on patrol and may receive notifications of events. The patrol guard may respond to the notification of the events by moving to the location of the event to provide a human presence on-site. The video feed monitoring app 160 may route the patrols of the patrol guards geographically near the protected sites 202a-202n. The video feed monitoring app 160 may route the patrol guards to a next site on a designated route (e.g., route the patrol guards from a first location at the property 202a to a second location at the property 202b).

The areas of interest 204a-204n may be doors, windows, garages, other entrances, and/or vantage points. Generally, the smart security devices 102a-102n may be mounted at the areas of interest 204a-204n. Data from the smart security devices 102a-102n at the homes and/or business premises 202a-202n may be sent to the internet and/or cloud service 104.

Data sent to the internet 50 and/or the cloud service 104 may be sent to the user devices 106a-106n. For example, an alert from one of the smart security devices 102a-102n from the home 202a may be sent to the device 106a of the homeowner indicating that another family member has arrived home. In another example, an alert from one of the smart security devices 102a-102n from the home 202n may be sent to the smartphone 106c of an owner of another home (e.g., the owner of the home 202b) that a suspicious person has been identified in the neighborhood. Users may then send a notification to the authorities 212. In yet another example, the device 106a may receive an alert from one of the smart security devices 102a-102n indicating that a package has been delivered. A user of the user devices 106a-106n may send data back to the smart security devices 102a-102n of the homes and/or business premises 202a-202n through the internet and/or cloud service 104. In one example, a homeowner may send a command to arm an alarm (e.g., one of the security responses) at their home.

In one example, the user devices 106a-106n may be in the possession of trusted volunteers. In some embodiments, the trusted volunteers may act as the employees 144a-144n (e.g., amateurs, such as property owners performing monitoring without professional help). The trusted volunteers may be other home owners in the system 200. The trusted volunteers may be the first line of response to a security issue detected by the system 200. Alerts by the system 200 may be sent in parallel to all the trusted volunteers. The trusted volunteers may use available communication channels provided such as cell phones, telephone and/or emails. The homeowner may use the companion application 160 to schedule particular predefined responses (e.g., the audio message 146 and/or reactions) to particular alerts such as calling the authorities 212 (e.g., the police and/or the fire department). The trusted volunteers may be able to activate a set of predefined actions using the user devices 106a-106n. The trusted volunteers may take training sessions to learn how to properly respond to various alerts. The training sessions may be taken on-line. The on-line training sessions may be available on the web interface 214 and/or using the companion application 160. For example, the web interface 214 may be used to access the companion application 160 via a desktop computer and/or smart TV.

If the network of trusted neighbors 202a-202n has the same system (e.g., one or more of the smart security devices 102a-102n), they may exchange images, video, and/or other information of unwelcome visitors. The website and/or web interface 214 may have access to the storage database 216 implemented by the cloud computing service 104 (e.g., stored in the storage servers 120a-120n) to manage the images, video, and/or other information. Unwelcome visitors stored in the database 216 may be shared with other neighbors and/or the authorities 212 using the web interface 214. For example, when the unwelcome visitors learn about the database 216 they may not target the neighborhood 202a-202n. Data in the database 216 may be used to classify types of visitors (e.g., comparisons may be performed between the captured video data and information in the database 216).

In some embodiments, the mobile devices 106a-106n may be used by patrol officers such as the authorities 212 (e.g., police, private security, etc.). The mobile devices 106a-106n may enable the patrol officers 212 to remotely monitor the video feeds generated by the smart security devices 102a-102n. For example, the patrol officers 212 may patrol the neighborhood 202a-202n in a vehicle and the mobile devices 106a-106n may be implemented within the vehicle. The companion app 160 may indicate which access points 204a-204n have events detected and alert the patrol officers 212.

Multiple levels of alerts may be implemented to distinguish unwelcome visitors from welcomed visitors (e.g., household members). Since most visitors may be welcomed, identifying strangers and raising the level of alert for immediate attention may be important. To prevent false alarms the smart security devices 102a-102n may be configured to provide automatic greetings (e.g., the audio message 146). The automated audio message 146 and/or the reactions may be implemented to engage the visitor 60 (e.g., implement a conversational AI). Engaging the visitor 60 may enable the AI model 132 implemented by the processor of the smart security devices 102a-102n and/or the remove device 104 to analyze video of the visitor 60 (e.g., by having them face the lens to talk) and/or determine the behavior of the visitor 60.

The technology to identify and/or classify welcomed visitors may include facial recognition, voice recognition, machine learning of habits and schedules of household members, and/or user inputs when errors occur. Learned behavior may be used to determine which predefined function to perform. For example, the learned behavior may determine that nobody is home at a particular time, and the predefined function may be to automatically arm the security system and/or perform energy saving functions (e.g., adjust the heating and/or cooling of a home). In another example, the daily schedule of inhabitants may be observed and/or recorded. The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. If nobody is home, the system 200 may determine that exterior lighting is needed and/or interior lighting is not needed. In another example, if a family is on vacation the system 200 may turn on interior lighting to make it appear to a potential burglar that the home is occupied. The learned behavior may develop a unified status of the home (e.g., based on occupancy, time of day, weather, security status, etc.). Predefined functions may be performed based on the unified status of the home.

In some embodiments, the smart security devices 102a-102n may initiate storage of the video data (e.g., the video streams/feeds) in response to motion detection in the area of interest. The user device 106a (e.g., a smart phone) may be used to allow a user to set a motion threshold for each of the smart security devices 102a-102n. For example, a lower motion threshold may be more sensitive to motion. In another example, a higher motion threshold may be less sensitive to motion (e.g., reduce a number of false positives). The motion threshold may be adjustable.

In some embodiments, the smart security devices 102a-102n may initiate storage of the video data in response to detecting and/or locating a person (e.g., the visitor 60) and/or other type of object (e.g., a delivery vehicle) in the video data. In one example, the video processor of the smart security devices 102a-102n and/or the AI model 132 may analyze the video data to detect people and/or animals. In some embodiments, facial recognition may be implemented to classify and/or recognize visitors. The activation state may be selected based on the classification. In some embodiments, the video data may be analyzed to determine a behavior of the visitors.

In some embodiments, machine learning techniques may be implemented by the AI model 132 to improve detection and/or classification accuracy of visitors and/or objects. For example, the user may use the companion app 160 to provide a correct and/or incorrect label to a detection performed by the smart security devices 102a-102n. If the detection and/or classification is incorrect, the incorrect label may be used by the smart security devices 102a-102n to incorporate an incorrect result of the detection into the machine learning techniques of the AI model 132. In some embodiments, the machine learning techniques may be implemented in the cloud service 104 (e.g., the analysis is performed using cloud computing resources configured to scale available resources on demand to enable learning for the AI model 132). Similar machine learning techniques may be implemented by the edge AI model 118 implemented by each of the smart security devices 102a-102n. Video data and/or correct/incorrect labels may be uploaded and/or stored anonymously (e.g., without personal identification information) by the cloud service 104. The smart security devices 102a-102n may be configured to ignore (e.g., not respond to, not track and/or not send notifications in response to) small animals and/or shadows.

In some embodiments, the smart security devices 102a-102n may be configured to send notifications to the user devices 106a-106n in response to the detection. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user may create a user account (e.g., comprising at least an email address and a password as credentials) for the cloud service (e.g., using the companion application 160 and/or the web-based interface 214). The user account may allow the user to configure preferences. The preferences may comprise the notification and/or greetings settings. The type of notifications sent by the smart security devices 102a-102n may be based on the notification settings. The smart security devices 102a-102n may implement the activation states and/or arm/disarm the security responses to limit a number of the notifications sent. Intelligently limiting the number of notifications sent may reduce a number of false alarms and/or reduce an amount of data transferred via the network 50 and/or the amount of data processed by the cloud service 104 (e.g., prevent QoS issues and/or dropped data).

The cloud service 104 and/or the database 216 may store portions of the video data from each of the smart security devices 102a-102n. For example, portions of the video data may be saved in response to the particular types of detections. The portions of video data may be video clips. The video clips may be encoded and/or compressed by the video processor of the smart security devices 102a-102n and/or the cloud service 104 to reduce a size of storage capacity of the video clips. The video clips may have a limited video length (e.g., 30 seconds, one minute, 90 seconds, five minutes, etc.). The length of the video clips may be based on the configuration preferences and/or in response to the detections by the smart security devices 102a-102n (e.g., a longer video clip may result in response to continuous detections). In some embodiments, the video clips may be pre-padded and/or post-padded with video data before and/or after the detection. For example, the video clip may store video data from a predetermined time before and/or after the detection (e.g., 30 seconds before the detection and/or 30 seconds after the detection for a video clip approximately one minute long). In some embodiments, the video clips may comprise 24/7 storage of the video captured by the smart security devices 102a-102n.

In some embodiments, a user interface may be provided for the user devices 106a-106n (e.g., the companion application 160, an executable program, the web-based interface 214, etc.). For example, the companion application 160 may be executable by a computing device such as the user devices 106a-106n. The user interface may allow one or more of the user devices 106a-106n to control various components of the smart security devices 102a-102n. For example, one or more user devices 106a-106n may be configured to access the user account. The control signals may be generated in response to the input from the user devices 106a-106n. For example, an icon may be provided on the user interface representing a light bulb. The user may activate and/or deactivate the light bulb by pressing (touching on a touchscreen, clicking, etc.) a control option using the companion app 160.

Other components such as security response components may be turned on and/or off from the user interface of the companion app 160. For example, one of the controls available in the companion app 160 may be provided to allow the user to control the speaker of one or more of the smart security devices 102a-102n. In one example, the speaker of the smart security devices 102a-102n may playback a pre-recorded audio message (e.g., the user may select from one or more pre-recorded audio messages on the user interface). In another example, the speaker of the smart security devices 102a-102n may sound an alarm (e.g., one or more alarm types may be selected from the user interface of the companion app 160).

In some embodiments, the smart security devices 102a-102n may be configured for two-way audio communications (e.g., an intercom). For example, the voice of a visitor may be received using a microphone of the smart security devices 102a-102n. A communication module implemented by the smart security devices 102a-102n may transmit the received audio to one or more of the user devices 106a-106n and/or the remote device 104. The user devices 106a-106n may playback the audio to the user. The user may speak via a microphone on the user devices 106a-106n. The user devices 106a-106n may transmit the audio to one or more of the smart security devices 102a-102n (e.g., the user may select which of the smart security devices 102a-102n to playback the audio using the companion application 160) via the communication module (e.g., a Wi-Fi connection) implemented by the smart security devices 102a-102n. The speaker component of the smart security devices 102a-102n may transmit and/or stream the received audio.

The smart security devices 102a-102n may provide various APIs (application programming interface) to connect with other devices (e.g., other home automation devices). For example, the APIs may allow various other devices to communicate with the smart security devices 102a-102n. In one example, the companion application 160 may be configured to receive/transmit data between the smart security devices 102a-102n and/or other smart security devices (e.g., home heating systems, interior lighting, etc.). For example, the smart security devices 102a-102n and/or other smart security devices may provide a smart home security system. The smart security devices 102a-102n may generate control signals based on the communication with the various devices other devices. The types of APIs available may be varied according to the design criteria of a particular implementation.

A package deposit 220 is shown at the home 202a. The package deposit 220 may be implemented to allow the visitor 60 to deliver packages. The package deposit 220 may be implemented as a container, a bag, a delivery slot, a mailbox, etc. In an example, the package deposit 220 may be implemented as a large net with a zipper and a lock. A delivery person may be instructed by the smart security devices 102a-102n to place a package inside the package deposit 220 and zip up and/or lock the package deposit 220. In some embodiments, the package deposit 220 may implement a hazardous waste storage (e.g., medical waste for a medical facility) and/or other secure information (e.g., confidential data such as attorney documents) and the package deposit 220 may be monitored to ensure proper disposal of materials in the package deposit 220 (e.g., the package deposit 220 may be implemented for package pick-up). The implementation of the package deposit 220 may be varied according to the design criteria of a particular implementation.

A wireless device 222 is shown on the package deposit 220. The wireless device 222 may be configured to transmit wireless signals to indicate a status of the package deposit 220. In an example, the wireless device 222 may send a notification to the smart security devices 102a-102n indicating that the package has been delivered. In another example, the wireless device 222 may be configured to send a notification to the smart security devices 102a-102n indicating that the package deposit 220 has been tampered with. The smart security devices 102a-102n may forward the notification to one or more of the user devices 106a-106n. The type of notifications transmitted by the wireless device 222 may be varied according to the design criteria of a particular implementation.

The smart security devices 102a-102n may be configured to adjust an activation state in response to a package being delivered and/or picked up (e.g., in response to the notification from the wireless device 222). A security zone is shown in the field of view 108a (e.g., the field of view of the lens of the smart security floodlight 102n). The smart security device 102n may monitor the security zone within the field of view 108a near the package deposit 220. In an example, when the security zone 108a is invaded (e.g., by a visitor such as a potential package thief) the smart security device 102n may be configured to perform a security response (e.g., activate an alarm, send an alert to a designated user, play the audio message 146, perform various security reactions, etc.). The security zone 108a may be an area of interest below the smart security floodlight 102n. In some embodiments, the capture device may be configured to capture package information about a delivered package (e.g., a bar code, a tracking number, an identification of the delivery person, etc.).

Figure 4:
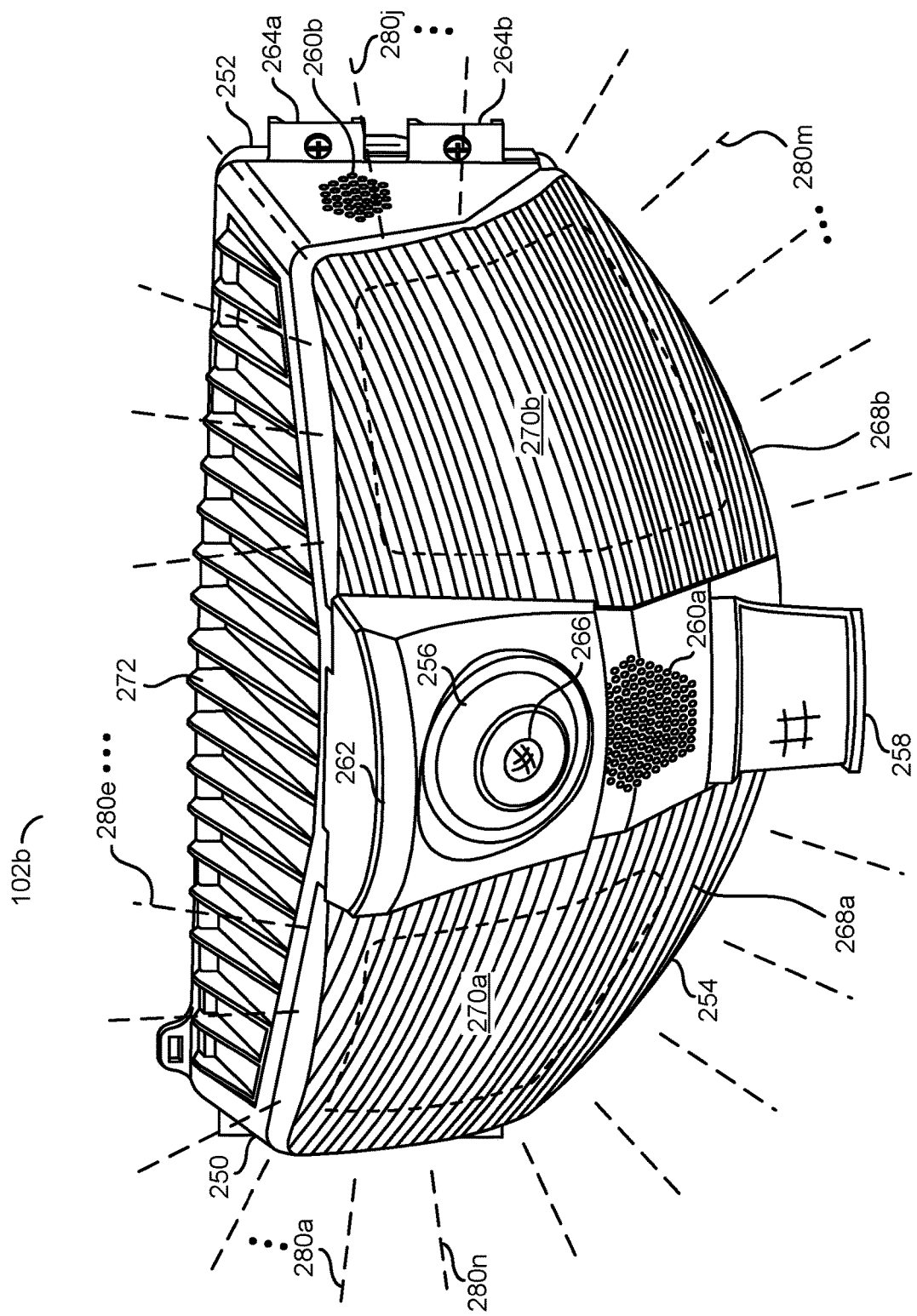
FIG. 4 is a diagram illustrating an example embodiment of a smart security floodlight.

Referring to FIG. 4, a diagram illustrating an example embodiment of a smart security floodlight is shown. The smart security floodlight 102b is shown as a representative example of the various smart security devices 102a-102n described in association with FIG. 2. The smart security floodlight 102b may be configured to capture video and/or provide illumination. The smart security floodlight 102b may be configured to implement a preventative and deterring security measure. The security floodlight 102b may be configured to implement intelligent deterrence. The security floodlight 102b may implement one or more deterrent responses (e.g., reactions). The deterrent responses may prevent crimes before damage is done. In an example, the deterrent responses may comprise sound and/or light. In some embodiments, the deterrent measures may be performed by the smart security floodlight 102b intelligently in response to analyzing video data captured (e.g., by the AI model 118 implemented by the smart security floodlight 102b and/or by the AI model 132 implemented in the cloud computing service 104). In some embodiments, the deterrent measures may be performed by the smart security floodlight 102b in response to communication from the companion app 160. The smart security floodlight 102b may be configured to capture the video data and communicate the video data to the remote device 104.

The smart security floodlight 102b may comprise a housing 250, a back panel 252 and/or a front face panel 254. The housing 250 may be configured to provide an enclosure and/or protection for various components of the smart security floodlight 102b. The components 110a-110n within the housing 250 may be configured to implement the security features of the smart security floodlight 102b. The housing/body 250 may be designed to be vandal proof/resistant. The back panel 252 may be configured to provide an enclosure and/or protection for external wiring and/or a power supply for the smart security floodlight 102b. The back panel 252 may be configured to enable the smart security floodlight 102b to be mounted (e.g., attached to a wall of a premises). The front face panel 254 may be configured to provide protection to lights implemented by the smart security floodlight 102b. The lights may be covered by the front face panel 254. The front face panel 254 may be configured to diffuse the lighting emitted by the smart security floodlight 102b and/or provide a decorative cover for the smart security floodlight 102b. In an example, the front face panel 254 may be replaceable (e.g., swappable) to enable an end user to select various aesthetic designs for the smart security floodlight 102b. The front face panel 254 may be curved LED panel cover that may be clipped on to the smart security floodlight 102b.

In some embodiments, the front face panel 254 may extend from top to bottom and along the sides of the smart security floodlight 102b. The front face panel 254 may be an LED panel. Implementing the front face panel 254 as a frosted LED panel may provide a wide angle of coverage for general illumination. In one example, the LED panel 254 may be a one-piece curved panel to cover the front and sides of the smart security floodlight 102b. In some embodiments, the front face LED panel 254 may extend to the mounting location (e.g., extend along the bottom close to the wall) to provide all-around illumination to limit the amount of dark spots. The front face panel 254 may comprise one or more LED panel covers. For example, the LED panel covers may comprise frosted and/or colored glass/plastic to provide frontal illumination. In some embodiments, one or more of the panels of the front face panel 254 may be an IR window.

The smart security floodlight 102b may comprise a capture device 256, a light (not shown), multiple speakers (not shown), a communication device (not shown), the processor 112 (not shown) and/or passive infrared (PIR) sensor 258. The capture device 256 may be configured as a high resolution camera (e.g., a camera capable of capturing 4K and/or 8K video frames). The light may be configured to provide general illumination and/or a focused spotlight. The speakers may be configured to output audio. The communication device may be configured to communicate with the remote device 104 and/or the user devices 106a-106n. The processor 112 may be configured to generate the video data and/or perform video analysis of the video frames captured by the capture device 256 and/or generate control signals for the speakers and/or lights. The PIR sensor 258 may be configured to detect motion.

The capture device 256 is shown attached to the front of the smart security floodlight 102b. The capture device 256 may be configured to capture video data of an area below a level of the smart security floodlight 102b. In an example, the smart security floodlight 102b may be mounted to a wall from at a high location (e.g., higher than six feet to be above people), and the capture device 256 may be directed to capture the ground below the smart security floodlight 102b. In the example shown, the capture device 256 may be implemented as a spherical shape that partially protrudes from the front of the smart security floodlight 102b. The partial protrusion of the capture device 256 may enable some electronics of the capture device 256 to be within the housing 250 (e.g., for protection and/or to enable connection to other internal components of the smart security floodlight 102b, such as the processor 112). The partial protrusion of the capture device 256 may enable the capture device 256 to move (e.g., pan and tilt) to monitor the wide field of view 108a of the area below the smart security floodlight 102b.

The PIR sensor 258 is shown extending down from the bottom of the front of the smart security floodlight 102b. The PIR sensor 258 is shown attached to the bottom of the smart security floodlight 102b without having a neck connector (e.g., a connection that may provide a hook for a rope that could be used to pull off the PIR sensor 258). Implementing the PIR sensor 258 without a neck may enable the PIR sensor 258 to resist vandalism (e.g., no anchor point for a rope). The PIR sensor 258 may extend from the bottom of the smart security floodlight 102b to capture a wide area (e.g., greater than 180 degree field of view). In some embodiments, the PIR sensor 258 may enable IR for night vision.

The PIR sensor 258 may be implemented in a permanently fixed location. The PIR sensor 258 may comprise four separate sensors arranged to capture multiple angles to eliminate blind spots. The PIR sensor 258 may be configured to capture an area of interest without adjustment (e.g., the angle of the PIR sensor 258 may not be moved).

Speaker grilles 260a-260b are shown on the housing 250. The speaker grilles 260a-260b may provide openings to enable the speakers within the housing 250 to emit audio output. The smart security floodlight 102b may further comprise a microphone (not shown). The speaker grilles 260a-260b may enable the microphone implemented within the housing 250 to receive the audio input 144. A combination of the speaker and microphone may enable the smart security floodlight 102b to generate the output audio 142 to playback messages and accept the input audio 144. The security floodlight may further comprise a microphone and/or a speaker (e.g., enable two-way communication).

The housing 250 may comprise a lens hood (or duck visor) 262. The lens hood 262 may provide glare protection for the capture device 256. For example, stray light and/or incidental light may result in glare and/or washed out areas in video frames captured using the capture device 256. The lens hood 262 may prevent and/or partially block stray light and/or incidental light, which may prevent undesired effects in the captured video data. In one example, the lens hood 262 may have a length (e.g., extending from the housing 250) of approximately 67 mm, a base width (e.g., connected along the housing 250) of approximately 100 mm and/or a front width (e.g., over the capture device 256) of approximately 54 mm.

The lens hood 262 may enable sun glare protection for the capture device 256. In some embodiments, the lens hood 262 may provide housing for antennae. For example, antennae for Wi-Fi and/or Bluetooth may be implemented within the lens hood 262. Implementing antennae within the lens hood 262 may enable the housing 250 to implement heat dissipating materials that may interfere with wireless communication.

Hinges 264a-264b are shown on a side of the smart security floodlight 102b. The hinges 264a-264b may connect the back panel 252 to the housing 250. In some embodiments, the hinges 264a-264b may provide support for mounting the smart security floodlight 102b to a wall. The hinges 264a-264b may enable the back panel 252 to be opened to enable access to the wiring and/or power supply of the smart security floodlight 102b. For example, even after the smart security floodlight 102b is secured to a wall, the hinges 264a-264b may enable the back panel 252 to be opened.

A lens 266 is shown on the capture device 256. The lens 266 may receive light to enable the capture device 256 to capture images that may be used to generate video data. A position of the lens 266 may be movable to enable the capture device 256 to adjust a location of the field of view 108a captured. The lens hood 262 may prevent the stray light and/or incident light from entering the lens 266 to prevent glare.

The lens 266 may comprise a wide angle lens. The wide angle lens 266 may enable the security floodlight 102b to capture the wide angle field of view 108a (e.g., generate wide angle video frame). In some embodiments, the video frames generated from the light captured may have a barrel effect (e.g., a bulge distortion) caused by the wide angle lens 266. The processor 112 implemented by the smart security floodlight 102b may be configured to correct (e.g., dewarp) the barrel distortion effect.

The front of the housing 250 may have an LED cover 268a-268b. The LED cover 268a-268b may comprise a left portion 268a and right portion 268b. The LED cover 268a-268b may have an upper portion and a lower portion. The capture device 256 may be at the middle of the upper portion of the LED cover 268a-268b. Generally, the upper portion of the LED cover 268a-268b may be slightly angled downwards (e.g., to provide the downwards field of view for the capture device 256). On the left side LED cover 268a, the upper portion may be angled slightly outwards to the left. On the right side LED cover 268b, the upper portion may be angled slightly outwards to the right. The PIR sensor 258 may be at the middle of the lower portion of the LED cover 268a-268b. Generally, the lower portion of the LED cover 268a-268b may be angled downwards at a greater angle than the upper portion of the LED cover 268a-268b. On the left side LED cover 268a, the lower portion may be angled slightly outwards to the left. On the right side LED cover 268b, the lower portion may be angled slightly outwards to the right.

Light panels 270a-270b may be configured to emit the light 108b. The light panels 270a-270b are shown underneath the LED cover 268a-268b. In the example shown, the smart security floodlight 102b may comprise two light panels 270a-270b. In some embodiments, four light panels 270a-270d may be implemented (e.g., two implemented underneath the left LED cover portion 268a and two implemented underneath the right LED cover portion 268b). For example, the light panel 270a may be located adjacent to the capture device 256 on one side. The light panel 270a may be generally directed straight outwards from the smart security floodlight 102b and angled towards one side (e.g., angled to direct light to the right side of the smart security floodlight 102b). The light panel 270b may be located adjacent to the capture device 256 on an opposite side of the light panel 270a. The light panel 270b may be generally directed straight outwards from the smart security floodlight 102b and angled towards one side (e.g., angled to direct light to the left side of the smart security floodlight 102b). For example, the outwards and slightly downwards angle of the sides of the upper portion of the LED cover 268a-268b may direct the light panels 270a-270b to the left and to the right of the smart security floodlight 102b and out in front of the smart security floodlight 102b.

In embodiments with four light panels (e.g., light panels 270a-270d), the light panels 270c-270d may be located on the lower portion underneath the LED covers 268a-268b. The light panel 270c may be located below the light panel 270a and generally directed on a downwards angle. The light panel 270d may be located below the light panel 270b and generally directed on a downwards angle. For example, the outwards and downwards angle of the sides of the lower portion of the LED covers 268a-268b may direct the light panels 270c-270d to the left and to the right of the smart security floodlight 102b and below the smart security floodlight 102b.

A heatsink 272 is shown on the top of the smart security floodlight 102b. The heatsink 272 may comprise metallic fins. The metallic fins of the heatsink 272 may be configured to dissipate heat. For example, the light panels 270a-270b and/or other components of the smart security floodlight 102b may generate heat and the heatsink 272 may ensure a safe operating temperature for the smart security floodlight 102b. In an example, the heatsink 272 may be bare aluminum configured to reflect sunlight during the daytime and dissipate heat from a heatsink internal to the housing 250 when the light panels 270a-270b are powered on. In an example, by implementing the heatsink 272, the smart security floodlight 102b may operate at approximately 28 degrees Celsius above ambient temperature after 30 minutes of continuous operation.

Dotted lines 280a-280n are shown. The dotted lines 280a-280n may represent the light emitted by the light panels 270a-270b. The light 280a-280n generated by the light panels 270a-270b may be configured to illuminate an area below a level of the smart security floodlight 102b. The light 280a-280n generated by the light panels 270a-270b may be configured to illuminate an area in front of the smart security floodlight 102b. The light 280a-280n generated by the light panels 270a-270b may be configured to provide lighting to enable the lens 266 to receive light to enable the capture device 256 to generate pixel data that may be used to generate the video frames.

The light panels 270a-270b may comprise LED lighting elements. The light panels 270a-270b may be configured to generate white light. In an example, the smart security floodlight 102b may be configured to control a brightness of the white light (e.g., perform dimming and/or increasing an intensity of the white light). In another example, the smart security floodlight 102b may be configured to control a temperature of the white light (e.g., softer 'natural' white lighting to 'cool' white lighting). In an example, the white light generated by the light panels 270a-270b may be tunable from 3k to 5k Kelvin color temperature and generate up to 10000 lumens. The light panels 270a-270b may be configured to generate colored lights. In an example, the light panels 270a-270d may be configured to emit blue colored light and red colored light. In an example, the red and blue colored light may be approximately 920 lumens (e.g., brighter than 1000 lumens in red and blue light may be dangerously bright). For example, the flashing red and blue light may be similar to police lights. The intensity, hue, temperature and/or other characteristics of the light emitted by the light panels 270a-270b may be varied according to the design criteria of a particular implementation.

In some embodiments, each of the light panels 270a-270b may be configured to emit the white, red and blue colored lighting. In some embodiments, the tunable white light may be generated by all of the panels 270a-270b. In some embodiments, the red and blue colored lights may be generated by only the two light panels 270a-270b on the upper portion of the smart security floodlight 102b. For example, implementing the bottom light panels 270c-270d as white light may provide illumination while switching the top panels 270a-270b from white light to the red and blue light may provide a warning and/or deterrent effect. The arrangement of the light panels 270a-270d may be varied according to the design criteria of a particular implementation.

The LED panels 270a-270d may be configured to operate in various modes of operation. In one example, one mode of operation of the light panels 270a-270d may illuminate an area near the smart security floodlight 102b. For example, the light panels 270a-270d may each emit white light for illumination. In another example, one mode of operation of the light panels 270a-270d may focus a high intensity light beam on a target (e.g., the light beam 108b as shown in association with FIG. 1). For example, the smart security floodlight 102b may comprise a mechanism for adjusting the direction of the light panels 270a-270d. Video analysis may be implemented to detect an object (e.g., identify a target such as an intruder). The light panels 270a-270d may be directed to follow the movement of the target based on the location of the target detected by analyzing the video frames. In yet another example, one mode of operation of the light panels 270a-270d may strobe colored light. For example, the light panels 270a-270b (e.g., the panels on the upper portion of the LED cover 268a-268b) may generate the red and blue light with a strobe effect. In another example, the white light may provide a strobe effect. For example, the strobe effect of the light 280a-280n along with other deterrent measures (e.g., a siren) may be 99% effective at deterring intruders (e.g., causing potential intruders to leave before damage/theft occurs). The patterns of lighting, the lighting effect and/or the number of modes of operation of the light panels 270a-270d may be varied according to the design criteria of a particular implementation.

Figure 5:
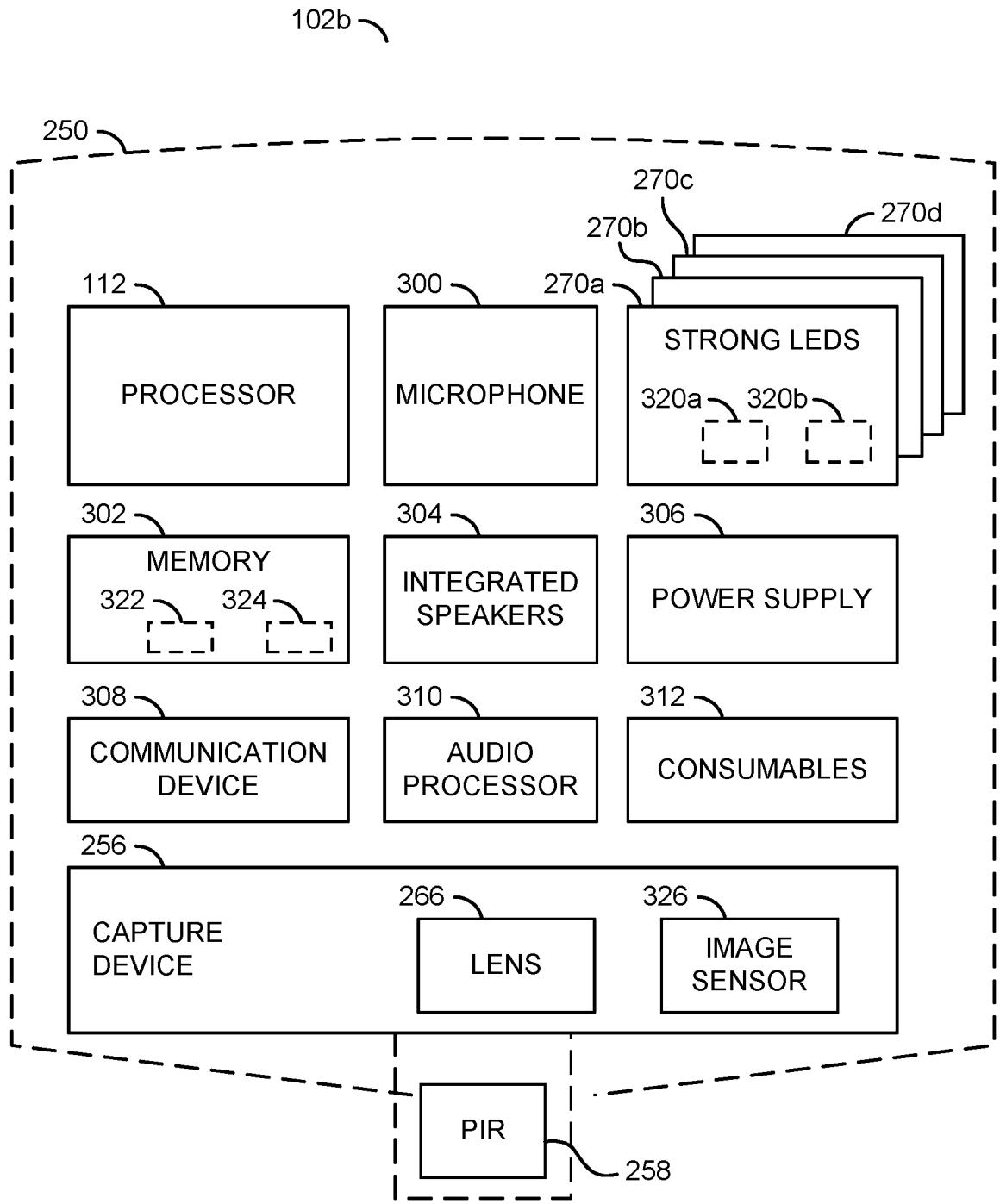
FIG. 5 is a block diagram illustrating components of the security floodlight.

Referring to FIG. 5, a block diagram illustrating components of the security floodlight is shown. The housing 250 of the smart security floodlight 102b is shown. The housing 250 may be hollow to provide a protective and/or decorative enclosure for the components of the smart security floodlight 102b. The components of the smart security floodlight 102b may be contained within or partially contained within the housing 250. The housing 250 may have a limited amount of internal space. To provide functionality, the components of the smart security floodlight 102b may need to fit within the size and/or heat dissipation constraints of the hollow housing 250.

The housing 250 may comprise the capture device 256, the PIR sensor 258, the LED panels 270a-270d, the processor 112, a block (or circuit) 300, a block (or circuit) 302, a block (or circuit) 304, a block (or circuit) 306, a block (or circuit) 308, a block (or circuit) 310 and/or a block (or circuit) 312. In an example, the processor 112 may be a video processor. The circuit 300 may implement the microphone. The circuit 302 may implement a memory. The circuit 304 may implement the integrated speakers. The circuit 306 may implement the power supply. The circuit 308 may implement the communication device. The circuit 310 may implement an audio processor. The circuit 312 may implement a consumable actuator. The smart security floodlight 102b may implement other components (not shown). The number, type and/or arrangement of the components of the smart security floodlight 102b may be varied according to the design criteria of a particular implementation.

The video processor 112 may be configured to generate video data in response to pixel data received from the capture device 256. The video processor 112 may be configured to generate high bitrate video frames (e.g., video frames that have a high resolution and/or a high frame rate). The video processor 112 may be configured to generate low bitrate video frames (e.g., video frames that have a lower resolution and/or a lower frame rate than the high bitrate video frames). In some embodiments, the low bitrate video frames may be generated from the high bitrate video frames. In some embodiments, the low bitrate video frames and the high bitrate video frames may be generated in parallel from the same raw video content (e.g., pixel data) by the processor 112. In one example, the high bitrate video frames may be generated by the processor 112 for long term storage locally on the smart security camera light 102b, for edited footage and/or for sharing. In another example, the low bitrate video frames may be generated by the processor 112 for quick review and editing on the VMS implemented by the cloud computing service 104 and/or for cloud storage in the storage servers 120a-120n.

The video processor 112 may be configured to generate multiple parallel video streams. The parallel video streams may comprise the same video content (e.g., video data comprising a recording of the same area captured at the same time) captured but having different properties (e.g., format, frame rate, resolution, compression, etc.). In one example, three parallel video streams may be generated including the high bitrate video stream, the low bitrate video stream and a medium bitrate for live viewing (e.g., on the user devices 106a-106n) and editing (e.g., short term storage on the storage servers 120a-120n and long term storage on the smart security camera light 120n). The processor 112 may generate any number of parallel video streams (e.g., limited by the hardware capabilities). The number of parallel video streams generated by the video processor 112 may be varied according to the design criteria of a particular implementation.

The video processor 112 may be configured to perform the video operations (e.g., digital panning, zooming and tilting (e.g., PZT), digital cropping, video analysis, object detection, behavior detection, object location tracking over a sequence of video frames, etc.). The video analysis performed by the video processor 112 (e.g., the AI model 118) may be configured to detect and/or recognize objects. The video analysis performed by the processor 112 may track movement of an object temporally over a sequence of video frames.

The video processor 112 may be configured to encode and/or decode video frames into various formats (e.g., video formats and/or still image formats). The video processor 112 may be configured to compress and/or stream video data. The video processor 112 may be configured to re-size images and/or video frames for a fixed resolution (e.g., a fixed resolution used by a neural network).

In some embodiments, the video processor 112 may implement a neural network (e.g., the AI model 118). The neural network 118 may be configured to analyze the video data in real time. The video analysis performed by the neural network 118 may detect, recognize and/or classify objects. For example, the objects may comprise people (e.g., a visitor), animals, inanimate objects (e.g., a delivered package), etc. The video analysis may be configured to learn patterns, recognize objects and/or recognize faces. The processor 112 may be configured to de-warp the video captured (e.g., correct distortions caused by the lens 266).

The processor 112 may be configured to read information from the components of the smart security floodlight 102*b*, write information to the components of the smart security floodlight 102*b* and/or execute computer readable instructions. In one example, the processor 112 may be a video processor. The processor 112 may be configured to perform video processing operations to generate video frames. The processor 112 may be configured to select still images from the video frames to upload to a remote device (e.g., distributed servers). The processing capability of the processor 112 may be limited due to size constraints, power constraints, cost constraints, etc.

The processor 112 may be configured to detect one or more triggering events. The triggering events may occur when a particular input is determined to be above some pre-determined threshold value. The processor 112 may analyze input detected by one or more of the components of the smart security floodlight 102*b* to determine whether the detected input is above the pre-determined threshold. In one example, the triggering event may be when the processor 112 determines that the input from the PIR sensor 258 is above a threshold for motion. In another example, the triggering event may be when the processor 112 determines that the incoming audio detected by the microphone 300 is above a particular audio level and/or matches a particular frequency pattern. In an example, when the processor 112 determines that a triggering event has occurred, the processor 112 may adjust the mode of operation of the light panels 270*a*-270*d* (e.g., strobe the red/blue lights, track a movement of an identified object with a high intensity light beam, increase the brightness of the white light, etc.). The type of input and/or the threshold value for the particular type of input that results in a triggering event may be varied according to the design criteria of a particular implementation.

In one example, the processor 112 may be configured to analyze the video frames for a particular amount of motion and/or a change in the amount of light to detect a triggering event (e.g., an amount of motion above a threshold amount of motion). In another example, the processor 112 may implement the neural network artificial intelligence model 118 to determine whether the video frame has captured a particular type of object (e.g., a person, an animal, a vehicle, a package, etc.) to detect the triggering event. In an example, the processor 112 may implement a relatively simple neural network module that may be a modified and/or compressed version of the neural network module 132 implemented by the cloud computing service 104. The compressed simple neural network module 118 implemented by the processor 112 may have a reduced size and/or complexity to enable execution on the processor 112 and/or within the power and/or heat constraints of the smart security floodlight 102*b*.

The microphone 300 may receive audio signals (e.g., input audio). Audio signals detected by the microphone 300 may be used by the processor 112 to generate various control signals (e.g., a triggering event). In one example, audio signals generated by the visitor may be received by the microphone 300 to generate a control signal for the components of the smart security light 102*b* used to control the light panels 270*a*-270*d*, control a door (e.g., opening, closing, and/or locking a door) and/or generate audio from the integrated speakers 304. Audio signals detected by the microphone 300 may be used as an audio password. For example, voice recognition may be used to generate a password. The audio password may be needed to allow the smart security floodlight 102*b* to generate various control signals. In one example, the microphone 300 may capture the audio input 144 and present the audio input 144 to the communication device 308 for streaming to a smartphone, a remote server and/or a call center. In another example, the microphone 300 may capture the audio input 144 and present the audio input 144 to the audio processing component 310 for encoding (e.g., to be stored by the storage component 302).

The memory (or storage component) 302 may be configured to provide electronic storage for the captured video frames, audio files for playback, computer readable instructions, firmware, etc. The memory 302 may store computer readable data (e.g., images, audio, video, sensor readings and/or other data). In one example, the storage component 302 may be a non-volatile storage medium. In another example, the storage component 302 may be a combination of non-volatile and volatile memory. Data stored in the memory 302 may be compared to various signals from sensor modules implemented by smart security floodlight 102*b*. In one example, the data stored in the memory 302 may be a password. The processor 112 may compare the password with signals from the sensor modules. The comparison may determine whether a triggering event has occurred. The storage component 302 may store audio data (e.g., the pre-recorded audio for playback, the received audio), video data (e.g., the video streams, still images), computer readable instructions and/or other data.

The integrated speakers 304 may generate audio signals. The integrated speakers 304 may be configured to playback audio. The integrated speakers 304 may comprise multiple speakers that may be located near the speaker grilles 260*a*-260*c* shown in association with FIG. 4. The integrated speakers 304 may be implemented as more than one speaker. In one embodiment, the integrated speakers 304 may be configured to generate a loud volume sound (e.g., over 110 dB at approximately 10 feet). However, the particular volume generated may be varied to meet the design criteria of a particular implementation.

The power supply (or power adapter) 306 may receive electrical power from the premises. Electrical power from the premises may be presented via the back panel 252. The power adapter 306 may convert the electrical power (e.g., from AC to DC). The converted electrical power may provide a power supply to the various components within the housing 250. The power adapter 306 may perform voltage regulation. In one example, the power adapter 306 may be implemented as a 5V power adapter.

In one example, the power storage component 306 may be a battery (e.g., rechargeable) configured to supply power to the components of the smart security floodlight 102*b*. In another example, the power storage and/or adapter component 306 may be configured to convert an AC power supply to DC power usable by the components of the smart security floodlight 102b.

The communication device 308 may be configured to implement wireless communication. The communication device 308 may be configured to implement one or more wireless communications protocols (e.g., Wi-Fi, Bluetooth, ZigBee, ZWave, etc.). The communication device 308 may be configured to receive instructions from a remote (Internet) source. The communication device 308 may be configured to connect to a local network and/or a wide area network (e.g., the network 50). In some embodiments, the communication device 308 may be configured to implement one or more types of communications protocols. For example, the communication device 308 may support a Wi-Fi connection and/or a Bluetooth connection. In some embodiments, the communication device 308 may be distributed as multiple circuits (e.g., a processing chip for each communications protocol). Other types of communications protocols may be implemented according to the design criteria of a particular implementation. In some embodiments, the communication device 308 may implement the Bluetooth connection to connect to a remote device (e.g., a smartphone) to provide an interface for configuring the smart security floodlight 102b (e.g., to allow the user to input local network settings).

The communication device 308 may receive and/or transmit data signals. The communication device 308 may register electromagnetic signals, acoustic signals, and/or other signals. The communication device 308 may provide control signals (e.g., to turn on the LED panels 270a-270d, create sound from one or more of the integrated speakers 304, send alerts to users, send other wireless signals, etc.).

In some embodiments, the communication device 308 may implement the Wi-Fi connection to connect to the cloud service 104 via the internet 50. The communication device 308 may enable a stream of the video data and/or images generated by the processor 112 to the cloud service 104. In one example, the communication device 308 may find an available server and upload the video stream and/or images to the available server. In another example, the communication device 308 may implement an upload queue and the available server may pull the data from the upload queue. The communication device 308 may be configured to receive the signals from the remote device 104 as instructions to perform the various security feature reactions selected by the AI model 132.

The communication device 308 may enable the smart security floodlight 102b to communicate with other security floodlights to form a network of security floodlights. The network may provide multi-camera co-ordination (e.g., to cover a large area such as in a car dealer lot, buildings with electrical panels, retail malls, churches, schools, etc.) to create an effective deterrent. In some embodiments, the security floodlight may communicate with UAV drones to track intruders.

In some embodiment, the audio processing component 310 may be a separate processor from the video processor 112. In some embodiments, the audio processing component 310 may be implemented as a component, submodule and/or chiplet of the video processor 112. The audio processor 310 may be configured to encode, decode and/or play back audio. In an example, the audio processing component 310 may be configured to play back pre-recorded audio stored in the storage component 302 (e.g., pre-recorded greetings, alarms, music, etc.). In another example, the audio processing component 310 may be configured to play back audio received from a smartphone and/or from a remote call center in real-time.

In some embodiments, the audio processing component 310 may be configured to stream audio signals from a smartphone, and/or other devices within range of the smart security floodlight 102b. The communication module 308 (e.g., a Wi-Fi antenna) may be configured to communicate with the smartphone, and/or other devices to send and/or receive audio signals. In some embodiments, the communication module 308 may comprise a connection port that may be configured to communicate with various devices to send and/or receive audio signals (e.g., via USB). The audio signals may be stored in the memory 302. In one example, the integrated speakers 304 may generate audio signals to attract outdoor wildlife and/or chase away undesired wildlife. The smart security floodlight 102b may capture images of the wildlife. Images may be stored in the memory 302. An alert may be sent to the user via the companion application 160.

The consumable actuator 312 may be configured to release some type of consumable (e.g., pepper spray, tear gas, a foul smelling substance, etc.). Generally, the consumable may be re-fillable. Releasing the consumable may be one type of deterrent implemented by the smart security floodlight 102b. For example, the foul smelling substance may be released to encourage a loiterer to leave the area. In one example, the consumable actuator 312 may implement a spray for a liquid substance. The type of consumable actuator 312 implemented may be varied according to the design criteria of a particular implementation.

The light panels 270a-270d may comprise respective blocks (or circuits) 320a-320b. The circuits 320a may each implement a LED controller for a respective one of the light panels 270a-270d. The circuits 320b may each implement a pan/tilt (PZ) actuator for a respective one of the light panels 270a-270d. The light panels 270a-270d may comprise other components (not shown). The type and/or arrangement of the components of the light panels 270a-270d may be varied according to the design criteria of a particular implementation.

The LED controllers 320a may each be configured to adjust a timing, color, brightness, etc. of the LEDs 270a-270d. The LED controllers 320a may provide independent control of the LEDs 270a-270d. For example, the LED controllers 320a may adjust the color of the LEDs 270a-270d from a white light to red, white and blue (e.g., to provide a deterrence that is similar to a police light). The LED controllers 320a may adjust the LEDs 270a-270d to operate as a strobe light. In an example, control signals generated by the processor 112 may provide instructions for the LED controllers 320a. The LED controllers 320a may be configured to select the mode of operation of the light panels 270a-270d. The independent control of the LEDs 270a-270d performed by the LED controllers 320a may enable each of the LEDs 270a-270d to be turned on/off, dimmed/brightened and/or strobed independent from each other.

The PT actuators 320b may be configured to provide pan and/or tilt adjustments to the LEDs 270a-270d. The PT actuators 320b may be controlled by the LED controllers 320a-320d. The PT actuators 320b may enable the LEDs 270a-270d to provide general illumination. The PT actuators 320b may enable the LEDs 270a-270d to move in order to provide the focused light beam 108b (e.g., place a spotlight on a target location). In one example, the LED panels 270a-270d may be reflected from a focusing mirror controlled by 2 step motors. In another example, a powerful light beam may be directed on an object of interest. In yet another example, a small group of LED elements may be selected from a large array of LED elements in the light panels 270a-270d to aim and focus on the object of interest. The PT actuators 320b may be configured to enable the light panels 270a-270d to be adjusted based on the mode of operation of the light panels 270a-270d.

The memory 302 may is shown comprising a block (or circuit) 322 and/or a block (or circuit) 324. The circuit 322 may comprise an onboard memory. The circuit 324 may comprise a storage device. The onboard memory 322 may comprise a random access memory (RAM), a cache memory, a firmware, etc. In an example, the onboard memory 322 may store the computer readable instructions that may be executed by the processor 112. The onboard memory 322 and/or the storage device 324 may be implemented as part of the storage 114 shown in association with FIG. 1.

The storage device 324 may be configured for local mass storage. The storage device 324 may be configured to store the video frames generated by the processor 112. The storage device 324 may be configured to store high bitrate and/or low bitrate versions of the video data captured. The storage device 324 may be configured to store metadata associated with the video data generated by the processor 112. The storage device 324 may be configured to provide storage to enable 24/7 video recording for a particular length of time (e.g., a month, a week, a year, etc.). The storage device 324 may be configured to implement mass storage at the edge device.

In one example, the storage device 324 may be a SD card (or microSD card). In an example, an SD card with 1 TB capacity may store 90 days storage of HD video. In another example, the storage device 324 may be a solid state drive. In an example, a solid state drive may offer 1 TB to 4 TB of storage capacity. The housing 250 of the smart floodlight embodiment may comprise enough physical space to fit a solid state drive as the storage device 324. Embodiments of the smart security devices 102a-102n that have size constraints (e.g., the wall plate adapter embodiment) may implement the SD card as the storage device 324. The storage device 324 may enable the high resolution and high frame rate video to be stored with indexing (to enable synchronization) to low resolution and low frame rate video. The type of storage technology and/or form factor for the storage device 324 may be varied according to the design criteria of a particular implementation.

The capture device 256 is shown comprising the lens 266 and/or a block (or circuit) 326. The circuit 326 may implement an image sensor. The capture device 256 may comprise other components (not shown). In an example, the capture device 256 may comprise a frame buffer and/or other logic. The number, type and/or arrangement of the components of the capture device 256 may be varied according to the design criteria of a particular implementation.

The video processor 112 may generate video frames (e.g., one or more video streams) in response to the pixel data received from the image sensor 326. The image sensor 326 may implement video and/or image capture devices. The image sensor 326 may be configured to receive the light that enters the capture device 256 through the lens 266. In an example, the image sensor 326 may be rectangular with a 16:9 aspect ratio.

The image sensor 326 may be configured to receive incoming light within a truncated rectangular pyramid field of view (e.g., truncated as a result of the glare reduction implemented by the lens hood 262). The image sensor 326 may be configured to convert received light into computer readable data (e.g., raw data and/or pixels that may be processed by the processor 112 to generate video frames). The image sensor 326 may be implemented to enable video data to be recorded.

The lens 266 shape and/or location may correspond with the image sensor 326. The lens 266 may be configured to focus incoming light onto the image sensor 326. The lens 266 may be a wide-angle lens. In an example, the lens 266, the image sensor 326 and/or other circuits may implement the capture device 256. The processor 112 may be configured to generate video frames by performing image signal processing in response to captured pixels transmitted from the image sensor 326. In some embodiments, the image sensor 326 may be configured to generate the video frames (e.g., perform image signal processing) from the captured pixels and present the video frames to the processor 112.

The image sensor 326 may enable the capture of video data using the processor 112. For example, the processor 112 may be configured to generate 720p HD, 1420p, 4K and/or 8K video data from the pixel data captured by the image sensor 326. The image data (e.g., pixels) may be used to generate high-resolution video frames along with audio data. The quality of the video frames may be varied according to the design criteria of a particular implementation. Generally, the quality (e.g., resolution, level of detail, color, etc.) of the video frames is enough to support object detection (e.g., facial recognition, motion detection, object identification, tagging, etc.).

In some embodiments, the video processor 112 may be configured to generate time-lapse videos at maximum resolution that may be stored locally in the memory 302 for transmission when there may be more bandwidth available (e.g., night transmission). The video processor 112 may be configured to provide instructions to the LED controllers 320a and/or the PT actuators 320b to focus the spotlight generated by one or more of the modes of operation of the light panels 270a-270d. The video processor 112 may provide artificial intelligent controls to move the LED panels 270a-270d (e.g., instructions to the PT actuators 320b) and/or control the LED panels 270a-270d (e.g., instructions to the LED controllers 320a to adjust brightness, frequency, color, etc.). The video processor 112 may select which audio to output through the speakers 304 (e.g., the 258 dB commercial siren, the conversational AI audio to engage intruders until help arrives, etc.).

In some embodiments, the communication device 308 may be configured to scan for devices in the area of interest. The communication device 308 may detect mobile devices carried by the intruder. For example, mobile devices may transmit a MAC address that may be captured by the communication device 308. Based on the MAC address, the smart security floodlight 102b may be configured to generate a personalized voice down message. The personalized voice down message may comprise information determined based on the MAC address (e.g., the type of device, a network carrier used by the device, a name associated with the device, etc.). For example, the personalized voice message may be "We have detected your smartphone. We know that you are using a Samsung Galaxy S10e and are connected to a Verizon network".

The smart security floodlight 102b may further comprise various sensor modules (e.g., environmental sensors). In an example, the smart security floodlight 102b may comprise an electromagnetic field sensor, an acoustic field sensor, a voice recognition sensor, a facial recognition sensor, a gesture sensor, a weather sensor and/or other sensors. One or more of the sensor modules, or a combination of the sensor modules, may be implemented internally (e.g., within the housing 250) or, alternatively, may be implemented externally (e.g., as a separate sensing device coupled to the smart security floodlight 102b). Input received by the sensor modules may be used to generate control signals and/or detect triggering events.

In some embodiments, the smart security floodlight 102b may store the captured video frames (e.g., in the memory 302). In some embodiments, the video frames may be uploaded to storage servers (e.g., a remote device). Generally, the storage servers 120a-120n and/or the storage device 324 may have a limited storage capacity. In some embodiments, the smart security floodlight 102b may analyze the captured video frames (e.g., using the processor 112) and/or data from the IR sensor 258 to perform a particular type of detection (e.g., based on a triggering event). For example, the smart security floodlight 102b may detect objects, motion and/or visitors within 3 meters (e.g., 10 feet). Still images generated from the captured video frames may be uploaded to distributed servers 122a-122n. The neural network AI model 132 implemented by the distributed servers 122a-122n may determine whether objects are present in the images uploaded. Based on the feedback from the distributed servers 122a-122n, the smart security floodlight 102b may initiate storage of the video data in storage servers 120a-120n in response to the particular type of detection.

The processor 112 and/or the AI model 118 may implement machine learning techniques to improve detection accuracy of visitors and/or objects. For example, the user may be able to provide a correct and/or incorrect label to a detection performed by the processor 112. If the detection is incorrect, the incorrect label may be used by the smart security floodlight 102b to incorporate an incorrect result of the detection into the machine learning techniques. In some embodiments, the machine learning techniques may be implemented in the cloud service 104 (e.g., the analysis is performed using cloud computing resources) based on feedback about whether objects of interest were actually present. Video data and/or correct/incorrect labels may be uploaded and/or stored anonymously (e.g., without personal identification information). The smart security floodlight 102b may be configured to ignore (e.g., not respond to, not track and/or not send notifications in response to) small animals and/or shadows.

The components within and/or partially within the housing 250 may provide the functionality of the smart security floodlight 102b. In some embodiments, the components may implement the functionality for a smart security camera. In one example, the integrated speaker 304 and the audio processing device 310 may be configured to generate audio for communicating to a visitor and the microphone 300 may be configured to receive audio (e.g., to enable 2-way communication).

In some embodiments, the processor 112 and/or the audio processor 310 may be configured to perform audio analytics. The microphone 300 may capture audio input. In an example, the audio input 144 may be a response from a visitor. The processor 112 and/or the audio processor 310 may extract words and/or sounds from the audio input to determine the content of the audio input 144. The audio analytics may be configured to parse the content of the audio input 144 to determine a meaning of and/or understand the audio input 144. In some embodiments, the audio analytics may transcribe the content of the audio input 144 to provide training data for machine learning. Using the audio analytics to understand the audio input 144 may enable the processor 112 to determine the context and/or generate an appropriate reaction.

The smart security floodlight 102b may be configured to deter potential intruders. In some embodiments, the security features of the smart security floodlight 102b selected as a reaction to the detected intruder may be selected by the AI model 132. In an example, an effectiveness measurement of deterrence of intruders may be determined based on a metric of detecting that the potential intruder(s) has left a field-of-view of the capture device 256 within approximately 60 seconds and the intruders are not detected afterwards. One example deterrent method implemented by the smart security floodlight 102b may be the processor 112 providing a control signal to the LED controllers 320a-320d to cause the light panels 270a-270d to provide a very bright red/blue colored strobe effect along with the integrated speaker 304 generating sound of a police siren wailing at 110 dB.

In an example, the image sensor 326 may be configured to provide data for the processor 112 to generate 4k resolution video frames. The processor 112 may be configured to generate 4k resolution video frames at approximately 15 frames per second for recording (e.g., stored in the memory 302). The processor 112 may be also configured to generate lower resolution video frames simultaneously (e.g., video frames at 720P resolution for streaming via the communication device 308 and/or for storage in the memory 302). The processor 112 may be configured to provide digital pan/tilt/zoom features. In an example, the processor 112 may provide a 32× digital zoom to enable generating 480P lower resolution video frames from the high resolution 4k video frames.

The integrated speakers 304 may be implemented as multiple speakers. In an example, the integrated speakers 304 may comprise a center, left and right speaker (e.g., generally corresponding with the location of the speaker grills 260a-260b shown in association with FIG. 4). Each of the integrated speakers 304 may implement a 6 W speaker. The integrated speakers 304 may operate in conjunction with the microphone 300 and the communication device 308 to provide full duplex audio communication. The communication device 308 may provide an Ethernet connection, Wi-Fi communication (e.g., longer range wireless) and/or Bluetooth communication (e.g., shorter range wireless).

The processor 112 may be configured to generate control signals in response to video operations and/or analysis performed on the video data. In some embodiments, the control signals generated may be configured to generate audio from the speakers, control and/or adjust the lights and/or mechanically control the capture device 256 to pan, tilt and/or zoom the lens 266.

Video operations performed by the processor 112 may be configured to enable a digital pan, zoom and/or tilt (PZT) in real-time. The digital PZT may enable particular areas (e.g., areas that may be determined to be troubling areas) to be examined closely. The video operations may further comprise object detection. Objects may be identified in the video frames. For example, one object that may be detected is an intruder. The intruders may be tracked over a sequence of video frames to determine behavior and/or a location of the intruder. The high resolution video frames captured by the camera may be stored locally and/or transmitted wirelessly. To enable transmission of the video data wirelessly (e.g., over a Wi-Fi connection) the smart security floodlight 102b may be configured to perform video operations to crop portions of the high resolution video frames into one or more lower resolution video frames.

In some embodiments, the processor 112 may perform the computer vision analysis to detect events locally and upload the results of the computer vision analysis to the remote device 104 (e.g., as metadata along with the video data). In some embodiments, the processor 112 may generate and/or encode the video data and transmit the video data to the remote device 104 without performing analysis. For example, the AI model 132 may perform the video analysis on the video data generated by the processor 112. In some embodiments, the computer vision analysis performed by the processor 112 may be an initial threshold analysis (e.g., to flag any potential events at a basic level) and the AI model 132 in the remote device 104 may perform a more detailed computer vision analysis only on the video data that has been flagged by the processor 112. For example, the processor 112 may determine whether an object detected is a person and the AI model 132 may perform more detailed facial recognition analysis on the detected person to identify the person. Whether the computer vision operations are performed by the AI model 132 in the remote device 104 or by the AI model 118 of the processor 112 may be varied according to the design criteria of a particular implementation. Details of the components and/or functionality of the smart security floodlight 102b may be described in association with U.S. application Ser. No. 16/850,924, filed on Apr. 16, 2020, appropriate portions of which are hereby incorporated by reference.

The smart security devices 102a-102n may be configured to capture video and record the captured video to the local storage 324. The video captured may comprise 24/7 HD recordings. Storing the video data to the local storage 324 (e.g., on an SD card) may enable forensic analysis.

The smart security devices 102a-102n may be configured to be mounted on a wall and capture video of an area below. In an example, the smart security devices 102a-102n may be mounted with the capture device 256 approximately 7 feet high (e.g., near eye level or higher). The capture device 256 may enable approximately 40 degree rotation (e.g., left, right, and down). The capture device 256 may enable approximately a 30 foot viewing range with night vision.

The integrated speaker 304 may be a large and powerful speaker (e.g., audio range from 150 Hz-10 kHz at 110 dB). The communication device 308 may implement dual-band Wi-Fi. The housing 250 may be implemented with an enclosure rating of IP65 (e.g., water proofing). The local storage device 324 may be located within the housing 250. In some embodiments, the local storage device 324 may be located outside the housing 250 and connected by a physical connection (e.g., a USB connection) or a wireless connection. The processor 112 may be configured to implement AI detection of various objects and/or events. The responses initiated by the processor 112 in response to the objects and/or events detected (e.g., a siren, automatic voice down audio generation, the consumables 312) may provide approximately 98% intruder deterrence.

In the example shown, the smart security floodlight 102b is shown implemented as a smart security floodlight embodiment. The smart security floodlight embodiment 102b may comprise the housing 250 with a large amount of interior space. The large housing 250 of the smart security floodlight embodiment 102b may enable a larger device (e.g., large physical size) to be used for the local storage device 324. Larger devices may provide a larger amounts of storage capacity (e.g., a portable hard drive and/or a portable SSD may offer 2 TB to 4 TB storage or more). Embodiments of the smart security devices 102a-102n that implement the wall plate adapter may have limited physical space within the housing 250. A smaller device (e.g., smaller physical size) may be used for the local storage 324 (e.g., a SD card, a microSD card, etc.) to accommodate the smaller housing 250. While the processor 112, the capture device 256, the lights 270a-270d and/or the components 300-312 are described with respect to the smart security floodlight embodiment 102b, the functionality of the processor 112, the capture device 256, the lights 270a-270d and/or the components 300-312 may be the same or similar for other embodiments of the smart security devices 102a-102n (e.g., the wall plate adapter, an all-in-one exterior light design, etc.).

Figure 6:
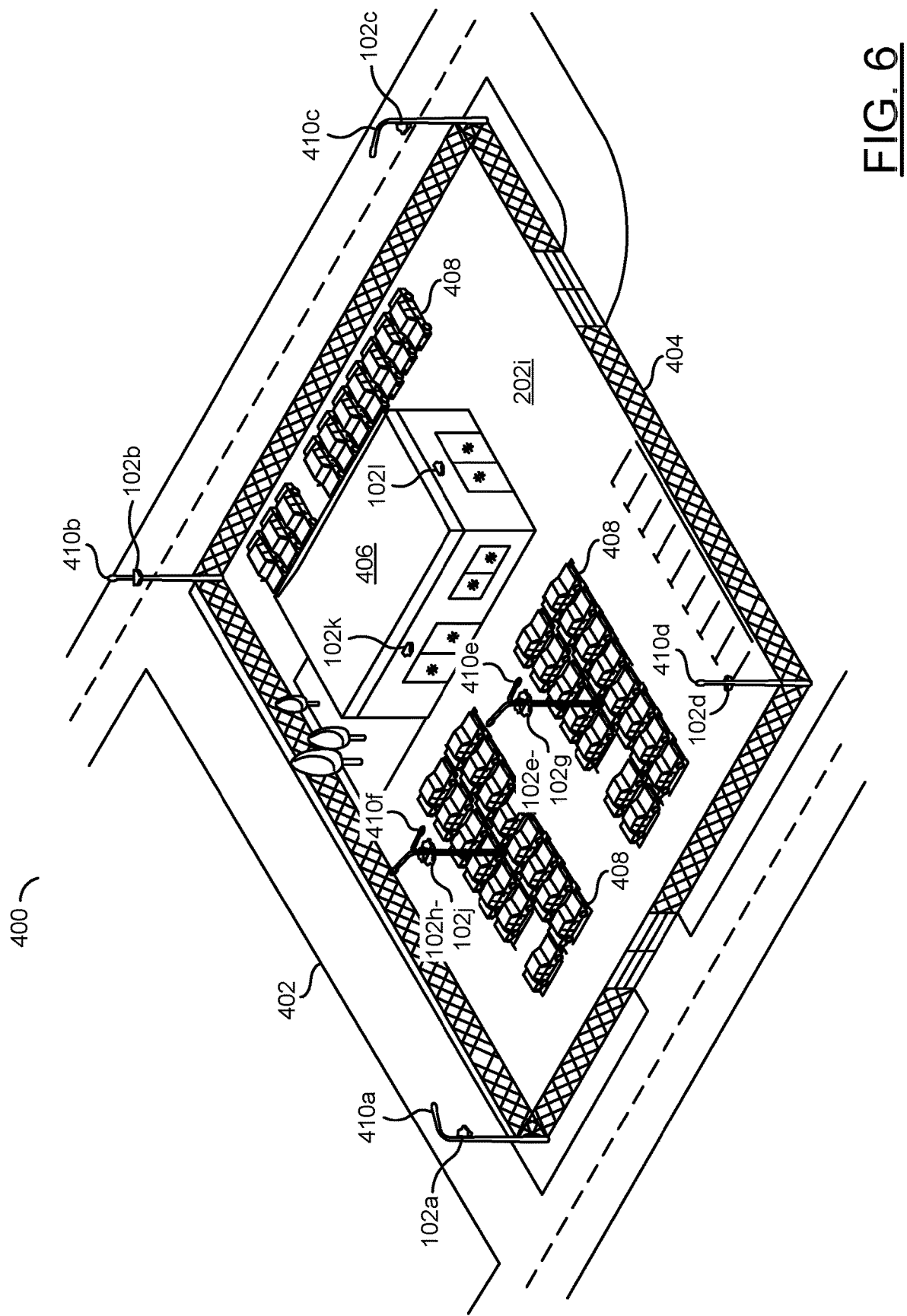
FIG. 6 is a diagram illustrating a network of security floodlights monitoring a parking lot.

Referring to FIG. 6, a diagram illustrating a network of security floodlights monitoring a parking lot is shown. A parking lot surveillance scenario 400 is shown. The parking lot surveillance scenario 400 may comprise the premises 202i and a public area 402 around the premises 202i. A fence 404 may surround and/or enclose the premises 202i. A building 406 is shown within the fence 404. Vehicles 408 are shown parked on the premises 202i. Lamp posts 410a-410l are shown on the premises 202i. The lamp posts 410a-410d may be at the four corners of the premises 202i and the lamp posts 410e-410l are shown inside the fence 404.

The smart security devices 102a-102l are shown monitoring the premises 202i. Each of the smart security devices 102a-102d are shown mounted to the respective lamp posts 410a-410d. A group of three of the smart security devices 102e-102g are shown mounted on the lamp post 410e, a group of three of the smart security devices 102h-102j are shown mounted to the lamp post 410f, and the smart security devices 102k-102l are shown mounted on the building 406. The premises 202i may represent a small business with multiple smart security devices 102a-102l providing surveillance. In the example parking lot surveillance scenario 400, the system 100 may enable a small business owner to remotely monitor the multiple video streams generated by the smart security devices 102a-102n on a single property simultaneously.

The smart security devices 102a-102l may be configured to provide automatic deterrence. In addition to deterring intruders that enter the premises 202i (e.g., outside of business hours, or loiterers during business hours), the smart security devices 102a-102l may provide automatic guest services (e.g., operate as smart service devices for customers during business hours). In one example, during business hours, a customer vehicle may arrive in the parking lot of the property 202i. The parking lot is shown generally full (e.g., only two parking spots are available). For example, finding a parking spot in a mostly full parking lot may be a frustrating user experience. The smart service devices 102a-102l may be configured to perform video analysis on the video frames of the vehicles 408 in the parking lot and/or detect other objects. The detected objects may comprise vehicles and/or parking lines. The object detection may be configured to distinguish between parking spots where a vehicle is present and parking spots that are open (e.g., no vehicle detected). The behavior analysis may detect the customer vehicle. For example, the computer vision operations may detect that the customer vehicle is circling the lot.

The smart security devices 102a-102l may provide video data of multiple different angles of the parking lot. The distributed servers 122a-122n may be configured to stitch the different angles together to provide a stitched image of the entire parking lot. The distributed servers 122a-122n may analyze the stitched image of the parking lot to detect open parking spaces that may be suitable for the customer vehicle (e.g., based on size of the open spot, the number of occupants in the vehicle, how far the spot is from the current location of the customer vehicle, a disability status of the occupants of the vehicle, etc.). Based on the video analysis, the network of smart security devices 102a-102l may provide data to enable an open parking spot for the customer vehicle.

One or more of the smart security devices 102a-102l may be configured to automatically generate the audio message 146. The audio message 146 may be used to provide a notification to the customer vehicle (e.g., to indicate that an open parking spot has been found). In the example shown, the audio message 146 may be 'please park here'. In another example, the high intensity light beam 108b may be directed at the open spot as a visual highlight for the customer. In an example, if the customer vehicle is far away from the open parking spot, the high intensity light beam 108b may be configured to move to provide a visual guide (or path) to the parking spot. In some embodiments, the high intensity light beam 108b may be handed off from one of the smart security devices 102a-102l to another (e.g., as one smart security devices reaches the end of the range of movement of the high intensity light beam 108b, the next smart service floodlight may continue providing the visual guide).

In some embodiments, the smart security devices 102a-102l may be configured to ensure that another customer does not 'steal' the open parking spot for the customer vehicle. For example, once the smart security devices 102a-102l select a parking spot for a particular vehicle, the smart service floodlights may be configured to encourage and/or deter other cars from using the selected parking spot (e.g., the audio message 146 may explain that the spot is reserved, a quick siren may be played, the colored lights may be strobed, etc.).

In some embodiments, during business hours, the smart security device 102l may be used to provide receipt scanning for curbside pickup. For example, the customer vehicle may drive up to the side of the building 406. The smart security device 102l may provide a first audio message (e.g., 'please display your receipt'). In another example, the audio message 146 may request a QR code (e.g., for an order made using a smartphone app). In yet another example, the audio message may request identification documents. When the user provides the requested documentation (e.g., the customer displays the documents within the field of view 108a of the camera 256), the computer vision analysis may scan the documents. In an example, OCR may be implemented to read an online order. In another example, a photograph may be captured of the documentation.

In some embodiments, the service provided by the system 100 may be a receptionist and/or concierge service. For example, the smart security device 102l may provide the scanned documentation to a hotel employee, and the hotel employee may begin a check-in process for the customer while the customer parks the vehicle. In another example, for a curbside pickup, one of the employees 144a-144n may receive the scanned order information and retrieve the ordered product while the customer pulls up to a pick-up location. In another example, one of the employees 144a-144n may receive a food order and prepare the food while the customer pulls up to a food delivery window.

In an example, a second audio message may be generated in response to monitoring the behavior of the customer to the first audio message. In an example, if the behavior detected comprises showing the requested documentation from the first audio message, then the smart security device 102l may provide the audio message 146 informing the customer of a next step to take. In another example, if the behavior detected does not enable the capture device 256 to analyze the requested documentation, the audio message 146 may provide helpful instructions (e.g., please move the documents higher, to the left/right, etc.). In the example shown, the audio message 146 may be 'thank you, drive up to the window'. In some embodiments, a coordinated response of the smart security lights 102a-102l may be performed. For example, another one of the smart security devices 102a-102l may generate the high intensity light beam 108b. The high intensity light beam 108b may be directed at the window that the customer is to drive to next (e.g., to pick-up the order).

In some embodiments, the smart security devices 102a-102l may provide an audio advertisement and/or product information for a customer. The smart security devices 102a-102l may be further configured to determine a relationship (e.g., a spatial relationship and/or a visual relationship) between the customer and another item. In the example shown, the customer may be looking at one of the vehicles 408 for sale. The computer vision operations may be configured to detect where the customer is located. The computer vision operations may be configured to detect which of the vehicles 408 the customer is near. In some embodiments, the computer vision operations may be configured to determine which of the vehicles 408 the customer is currently looking at.

Based on the behavior of the customer and/or the relationship between the customer and the available products for sale, the smart security devices 102a-102l may provide an advertisement service. The smart security devices 102a-102l may determine that the customer is looking at a particular vehicle. The smart service floodlights 102a-102l may access the distributed servers 122a-122n to retrieve up-to-date information about the particular vehicle. If there is specific information about the vehicle, the audio message 146 may be generated. In one example, the audio message 146 may be 'this car is on sale today only'. The message 146 may further provide an incentive to purchase the product and/or a limited time offer (e.g., the car you are looking at has 0% financing).

In some embodiments, if no specific information is available about the product near the customer, the smart security devices 102a-102l may provide a context-appropriate audio message about the product. For example, if the vehicle is a sports car, the audio message 146 automatically selected may be 'you'll impress your friends with that ride'. In another example, if the vehicle is a minivan, the audio message 146 selected may be 'you can fit the whole family in there and still have room for groceries'. In yet another example, if there are other options for a similar vehicle, the audio message 146 may be 'that car is also available in red or black'. The audio message 146 may be selected based on the behavior of the customer. In another example, a deterrence message may be provided. For example, the audio message 146 may be 'please do not touch the vehicle' if the customer is leaning on the vehicle. The types of audio messages and/or automatic deterrence selected may be varied according to the design criteria of a particular implementation.

Figure 7:
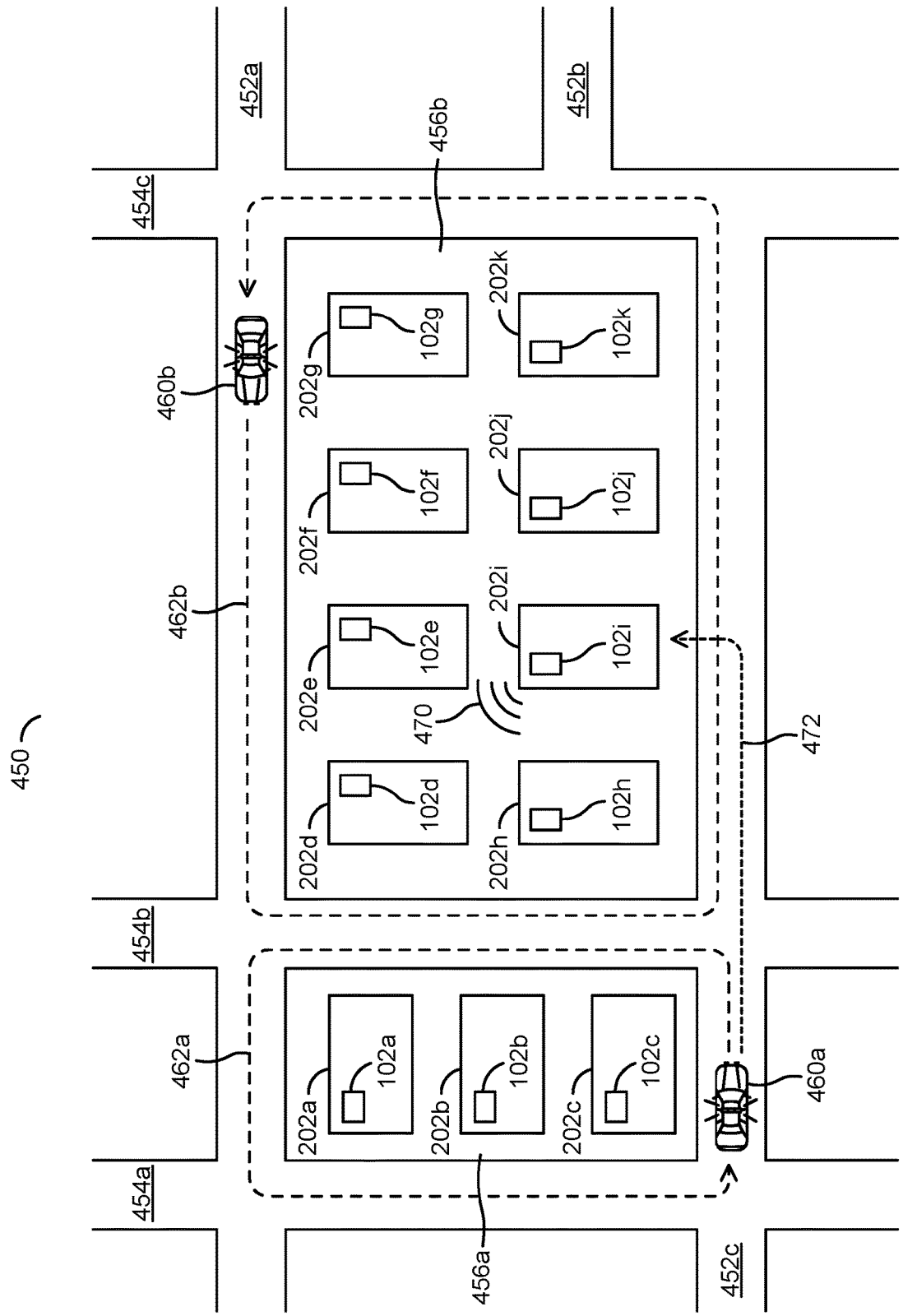
FIG. 7 is a diagram illustrating patrol vehicles responding to an alert generated by a smart security device.

Referring to FIG. 7, a diagram illustrating patrol vehicles responding to an alert generated by a smart security device is shown. A scenario 450 is shown. The scenario 450 may comprise an overhead map view representing a neighborhood.

The scenario 450 may comprise a number of horizontally oriented streets 452a-452c and a number of vertically oriented streets 454a-454c. The streets 452a-452c and the streets 454a-454c may be arranged to form a general grid pattern around blocks 456a-456b. The block 456a may be between the streets 454a-454b and the streets 452a-452c. The block 456b may be between the streets 454b-454c and the streets 452a-452c.

The block 456a may comprise three properties 202a-202c. The block 456b may comprise eight properties 202d-202k. Each of the properties 202a-202k is shown comprising a respective one of the smart security devices 102a-102k. In an example, the blocks 456a-456b may comprise a neighborhood of the houses 202a-202k. In some embodiments, not all of the properties 202a-202k may implement one of the smart devices 102a-102k. In some embodiments, one or more of the properties 202a-202k may implement more than one of the smart devices 102a-102n (e.g., monitoring a front entrance and a back entrance). The arrangement of the smart devices 102a-102k in the neighborhood of houses 202a-202k may be varied according to the design criteria of a particular implementation.

Patrol vehicles 460a-460b are shown. In the example shown, the patrol car 460a may be driving along the street 452c near the block 456a and close to the home 202c. In the example shown, the patrol car 460b may be driving along the street 452a near the block 456b and close to the home 202g. Each of the patrol cars 460a-460b may implement one of the user devices 106a-106n. For example, the user devices 106a-106n may be mounted within the vehicle interior and displaying the companion app 160 as shown in association with FIG. 2.

A patrol path 462a is shown for the patrol vehicle 460a is shown. The patrol path 462a may navigate around the block 456a. For example, the patrol vehicle 460a may generally monitor the properties 202a-202c on the block 456a. A patrol path 462b is shown for the patrol vehicle 460b is shown. The patrol path 462b may navigate around the block 456b. For example, the patrol vehicle 460b may generally monitor the properties 202d-202k on the block 456b.

The patrol vehicles 460a-460b may represent a live presence reaction that may be selected by the AI model 132. When the AI model 132 detects an event in the video data captured and/or streamed to the cloud computer service 104, the AI model 132 may select various reactions. The reactions may comprise controlling functions of the smart security devices 102a-102n (e.g., 2-way communication, talking down an intruder with automated audio playback, sounding an alarm, etc.). One of the reactions may be to deploy a live presence. The AI model 132 may send a notification to the companion app 160 in the patrol vehicles 460a-460b to travel to one of the properties 202a-202k as one of the reactions. Generally, a live presence may be a last resort response (e.g., an intruder has not left in response to being talked down, or an alarm). In some embodiments, the patrol vehicles 460a-460b may already be near the location of a potential event (e.g., doing hourly patrols of a neighborhood). In some embodiments, the patrol vehicles 460a-460b may remain at a base of operations (e.g., a police station) until the AI model 132 sends a notification.

The smart device 102i is shown generating an alarm 470 (e.g., in response to a detected event). For example, the smart security device 102i may have captured video data of an event at the property 202i. The smart security device 102i may automatically perform reactions to the event and/or in response to the signals received from the cloud computer service 104 perform a reaction selected by the AI model 132. The reactions may have escalated (e.g., a detected intruder has not left), and the AI model 132 may have selected the alarm 470 and sent a notification to the live security personnel in the area. For example, the companion app 160 executed by the user devices 106a-106n in the patrol vehicles 460a-460b may each receive a notification of the event and/or a video stream of the event.

The AI model 132 may be configured to calculate the most appropriate one of the patrol vehicles 460a-460b to go to the site and inform of the status of the selected intervention to all other patrol units. In an example, the AI model 132 may determine the nearest available mobile unit to reach the site of the incident in order to reduce response time and/or avoid duplicating responses from multiple mobile units. The AI model 132 may send a priority classification and the video streams to display the event on the companion app 160 to all mobile units, to enable non-responding patrol vehicles to continue their regularly scheduled patrols while tracking the progress of the selected intervening unit. For example, in response to the priority classification the companion app 160 may display suggestions for prioritizing the patrol routes 462a-462b of the patrol vehicles 460a-460b.

In the example shown, a selected patrol path 472 is shown. The selected patrol path 472 may be from the patrol vehicle 460a to the property 202i. For example, the AI model 132 may determine that the patrol vehicle 460a is closer to the event 470 than the patrol vehicle 460b. In the example shown, even though the property 202i is not on the regular patrol path 462a for patrol vehicle 460a, the AI model 132 may determine that the patrol vehicle 460a may be able to respond to the event 470 faster than the patrol vehicle 460b. The selected patrol path 472 may indicate a fastest legal route from a current location of the patrol vehicle 460a to the property 202i with the detected event 470.

In some embodiments, the companion app 160 may be configured to provide a notification to the drivers of the patrol cars 460a-460b to indicate which patrol car should go on-site to the event 470. The priority classification may provide information on whether the driver should go to the event 470 (e.g., go to the event 470 as the first live response, go to the event 470 as a backup response, continue on with a regular patrol while monitoring the event using the video feeds, etc.). Decisions about which patrol car should go on-site to the event 470 may be determined based on, the current location of the patrol car (e.g., the companion app 160 may access geolocation information from the user devices 106a-106n), the location of the event (e.g., the property 202i), the user of the patrol car and/or companion app 160 (e.g., user settings may comprise credentials of the user such as years of experience, types of training the user has taken, etc.). For example, if the computer vision operations performed to detect the event determines than an intruder detected with a firearm is at the property 202i, and one user in the patrol vehicle 460b has firearms training, then the user with firearms training may be selected to attend the event on-site (e.g., even though the patrol vehicle 460b is farther away than the patrol vehicle 460a, because the operator 144i in the patrol vehicle 460a does not have firearms training and the operator 144i in the patrol vehicle 460b does have firearms training, the patrol vehicle 460b may be selected to respond to the event 470). In another example, the patrol vehicle 460a may be selected if the operator 144i in the patrol vehicle 460a has training for dealing with people with mental illness if the intruder is detected (e.g., using facial recognition) as a person that has a history of mental illness. The factors balanced by the AI model 132 for selecting which of the patrol vehicles 460a-

460b to select to respond to the event 470 may be varied according to the design criteria of a particular implementation.

The patrol vehicles 460a-460b are shown as representative examples of a live reaction selected by the AI model 132. Generally, the AI model 132 may be configured to monitor and/or track a location of any type of live, mobile unit equipped with the user devices 106a-106n implementing the video feed monitoring app 160. For example, the video feed monitoring app 160 may be configured to communicate a location of the user devices 106a-106n, which may be used to precisely locate the user devices 106a-106n (e.g., using GPS/GNSS coordinates, using triangulation from cellular towers, etc.). The location of the live unit may be used to determine where the live units are with respect to the smart security devices 102a-102n (e.g., a location on a map).

In one example, the live, mobile units may be the patrol vehicles 460a-460b (e.g., a patrol vehicle with the user device 106i mounted to the vehicle interior). In another example, the live, mobile units may be a person on patrol (e.g., a security guard or security personnel on foot patrol carrying one of the user devices 106a-106n such as a smartphone). In yet another example, the live, mobile units may be a person at the remote monitoring service 140 (e.g., a security guard or the security personnel 144a-144n that is generally stationary at one of the user device 106a-106n such as a desktop computer until receiving the notification to move to the location of the detected event and may carry the smartphone 106b when moving around). In the scenario 450, the patrol vehicles 460a-460b may monitor the streets of a neighborhood. In some embodiments, a patrol guard may monitor a small office, a business, a home, etc. The types of mobile patrol units and/or the environments where the smart security devices 102a-102n are installed may be varied according to the design criteria of a particular implementation.

Figure 8:
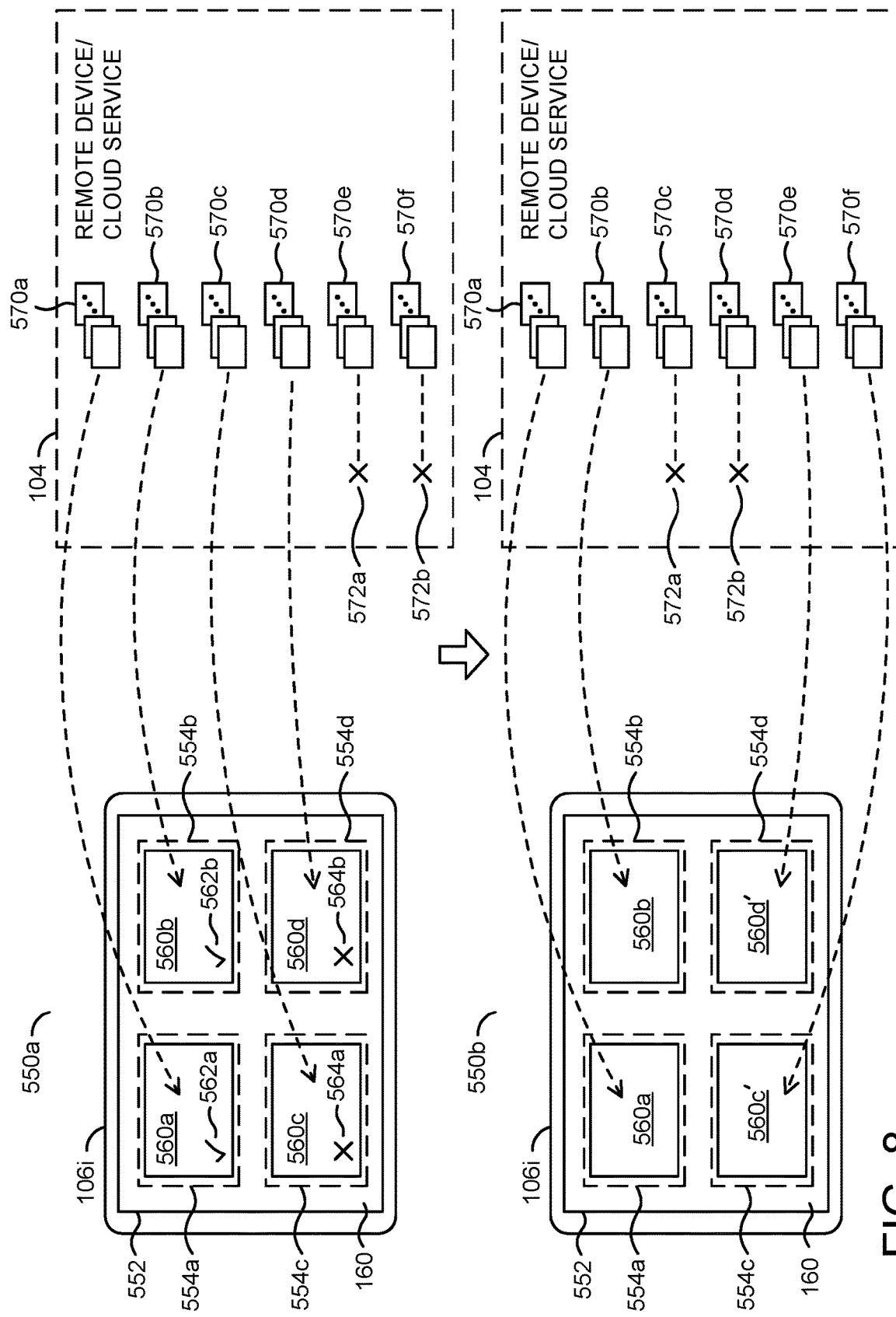
FIG. 8 is a diagram illustrating intelligently swapping video streams in and out of view on a mobile computing device.

Referring to FIG. 8, a diagram illustrating intelligently swapping video streams in and out of view on a mobile computing device is shown. Example scenarios 550a-550b are shown. The example scenarios 550a-550b may each illustrate the cloud computer service (or remote device) 104 and the user devices 106i. The user device 106i may be an illustrative example representative of any of the user devices 106a-106n. The example scenario 550a may illustrate the user device 106i and the remote device 104 at a time earlier than (before) the example scenario 550b. In some embodiments, the remote device 104 may provide the artificial intelligence model 132 for selecting which of the video streams generated by the smart security devices 102a-102n to display via the companion app 160.

In both the example scenarios 550a-550b, a tablet computing device is shown as the mobile device 106i. The mobile device 106i may implement an I/O interface 552. The I/O interface 552 of the mobile device 106i is shown as a touchscreen interface (e.g., video output and touch input provided by the various hardware components 150a-150n of the user devices 106a-106n). The companion app 160 is shown displayed on the touchscreen interface 552 of the mobile device 106i. An arrangement 554a-554d is shown. The arrangement 554a-554d may comprise four video feeds 560a-560d. In the example scenarios 550a-550b the arrangement 554a-554d may comprise two video feeds on the top portion and two feeds on the bottom portion of the companion app 160. The arrangement 554a-554d of the video feeds 560a-560d may be varied according to the design criteria of a particular implementation.

In the example scenario 550a, the video feeds 560a-560b are shown in the arrangement locations 554a-554b (on the top of the companion app 160) and the video feeds 560c-560d are shown in the arrangement locations 554c-554d (on the bottom of the companion app 160). Check marks 562a-562b are shown on the respective video feeds 560a-560b. Xs 564a-564b are shown on the video feeds 560c-560d. The check marks 562a-562b and the Xs 564a-564b may represent the instructions received based on the priority classification performed by the AI model 132 (e.g., from priority signals as described in association with U.S. application Ser. No. 17/164,595, filed on Feb. 1, 2020). The priority classification may be provided by signals generated external to the companion app 160 (e.g., the priority information may be provided in signals generated by the AI model 132 and presented by the cloud computing system 104 to the user device 106i). The check marks 562a-562b may illustrate that the AI model 132 has determined that the corresponding video feeds 560a-560b may be kept on the display of the companion app 160. The Xs 564a-564b may illustrate that the AI model 132 has determined that the corresponding video feeds 560c-560d may be replaced on the display of the companion app 160. In one example, the AI model 132 may determine that the video feeds 560c-560d may be replaced in response to user input and/or requests (e.g., the user tapping on the video feeds 560c-560d to mark the arrangement locations 554c-554d for replacement, or the user tapping on the video feeds 560a-560b to mark the arrangement locations 554a-554b for pinning). In another example, the AI model 132 may determine that the video feeds 560a-560b comprise events and that other video streams comprise more interesting content (e.g., events) than the video feeds 560c-560d.

The cloud computing service 104 is shown comprising six available video streams 570a-570f. The number of available video streams 570a-570f may be varied according to the design criteria of a particular implementation (e.g., how many smart devices 102a-102n are implemented to capture the video data).

At the earlier time 550a, the cloud computing service 104 may provide the four video streams 570a-570d (e.g., a subset of the video streams 570a-570f) to the companion app 160. The two video streams 570e-570f may not be streamed and/or the cloud computing service 104 may provide thumbnails (e.g., not broadcast the full video stream to save bandwidth). In the example shown, the video streams 570e-570f are shown presented to the locations 572a-572b, which may represent the video stream storage 120a-120n. While only the video streams 570e-570f are shown presented to the video stream storage 120a-120n, the video streams 570a-570d that are being communicated may also be stored in the video stream storage 120a-120n.

The video streams 570a-570d may be selected by the AI model 132 for display on the companion app 160 for the arrangement 554a-554d. The subset of video streams 570a-570d may be presented to the mobile device 106i. The companion app 160 may be configured to receive and display the video streams 570a-570d as the video feeds 560a-560d in the arrangement 554a-554d based on the priority classification. In the example shown, the video stream 570a may be presented at the arrangement location 554a as the video feed 560a in the top left corner of the companion app 160, the video stream 570b may be presented at the arrangement location 554b as the video feed 560b in the top right corner of the companion app 160, the video stream 570c may be presented at the arrangement location 554c as the video feed 560c in the bottom left corner of the companion app 160 and the video stream 570*d* may be presented at the arrangement location 554*d* as the video feed 560*d* in the bottom right corner of the companion app 160.

The AI model 132 may intelligently determine that the top portion video feeds 560*a*-560*b* should remain displayed (e.g., an event may be currently taking place in the video data that corresponds to the video streams 570*a*-570*b*). The AI model 132 may intelligently determine that the bottom portion video feeds 560*c*-560*d* should be replaced (e.g., swapped out with other available video streams). The video feeds 560*c*-560*d* may be replaced at the later time 550*b* (e.g., after an event such as an object detection and/or user input has been detected).

At the later time example 550*b*, the remote device 104 may continue to provide the first two video streams 570*a*-570*b* and may swap the video streams 570*c*-570*d* for the video streams 570*c*-570*f* as the subset of video streams. The video streams 570*a*-570*b* are shown displayed on the companion app 160 at the arrangement locations 554*a*-554*b* as the video feeds 560*a*-560*b*. The video streams 570*c*-570*d* are shown in the locations 572*a*-572*b* (e.g., the video stream storage 120*a*-120*n*). The communication of the video streams 570*c*-570*d* may be stopped (e.g., the video streams may be discarded, communication may be terminated, only thumbnails may be communicated, etc.). The video streams 570*c*-570*d* may no longer be displayed on the companion app 160.

The video streams 570*e*-570*f* may be communicated to the user device 106*i* for display on the companion app 160. The video streams 570*e*-570*f* may be replacement video feeds 560*c*'-560*d*'. In the example shown, the video stream 570*e* may be displayed on the companion app 160 at the arrangement location 554*c* in the bottom left corner as the video feed 560*c*' and the video stream 570*f* may be displayed on the companion app 160 at the arrangement location 554*d* in the bottom right corner as the video feed 560*d*'. In one example, the AI model 132 may determine that the two video streams 570*e*-570*f* are currently showing an event that should be brought to the attention of the user (e.g., an event more important than any events that may be detected in the video streams 570*c*-570*d*).

In another example, the AI model 132 may swap out video streams based on an amount of time that has passed (e.g., once every minute). For example, the later example 550*b* may be one minute after the earlier example 550*a*. Continuing the example, after another minute has passed, the video feeds 560*a*-560*b* may be swapped with other video streams stored on the remote device 104 (e.g., the video streams 570*a*-570*b* may be swapped out with the video streams 570*c*-570*d*).

The AI model 132 and/or the video feed monitoring app 160 may intelligently swap in and out a subset of the video streams 570*a*-570*f* as the displayed video feeds 560*a*-560*d*. The video feed monitoring app 160 may display the video data captured by relevant smart security devices 102*a*-102*n*. The relevant cameras may be the smart security devices 102*a*-102*n* that may be currently capturing the video data of the event. The video streams 570*a*-570*f* that comprise the event may be swapped into the displayed video feeds 560*a*-560*d* and the video streams 570*a*-570*f* that do not comprise the event may be swapped out of the displayed video feeds 560*a*-560*d*.

The intelligent selection of the displayed video feeds 560*a*-560*d* may enable one single operator to monitor many of the video streams 570*a*-570*f* simultaneously (e.g., far more than a person would be able to if monitoring all the available video feeds simultaneously). In one example, one person may monitor 600-1000 cameras simultaneously when the AI model 132 intelligently selects the video feeds 560*a*-560*d* to display. Since not all of the video streams 570*a*-570*f* are displayed at one time, the focus of the operator may be on the video feeds 560*a*-560*d* that are displayed. The intelligent selection of the subset of the video streams 570*a*-570*f* to display (e.g., displaying events such as the detection of an intruder), may enable a manageable amount of the video streams 570*a*-570*f* to be brought to the attention of the operator. The video feeds 570*a*-570*f* that do not correspond to events may be temporarily hidden from view and then brought into view as one of the video feeds 560*a*-560*d* when an event is detected (e.g., the operator may not have a need to monitor one of the video feeds 570*a*-570*f* when no event is detected).

Without the intelligent selection of the subset of the video feeds 570*a*-570*f* for the video feeds 560*a*-560*d*, there may need to be as many as 50 displays to show images from 500 cameras (e.g., a high hardware cost). Interlacing groups of cameras may reduce the number of displays (e.g., reduce hardware costs) but may be straining to the eyes of the operator. By intelligently selecting a subset of the video streams 570*a*-570*f* as the video feeds 560*a*-560*d* the number of displays may be reduced (e.g., one operator may use one of the user devices 106*a*-106*n* such as one tablet computing device). The attention of the operator may not be divided across as many video feeds, which may reduce the eye strain of the human operator. By intelligently selecting the subset of the video streams 570*a*-570*f* to display as the video feeds 560*a*-560*d*, the operator may not need to simultaneously view as many video streams at once, but may still be able to monitor the events that occur in a high number of video streams at once.

Figure 9:
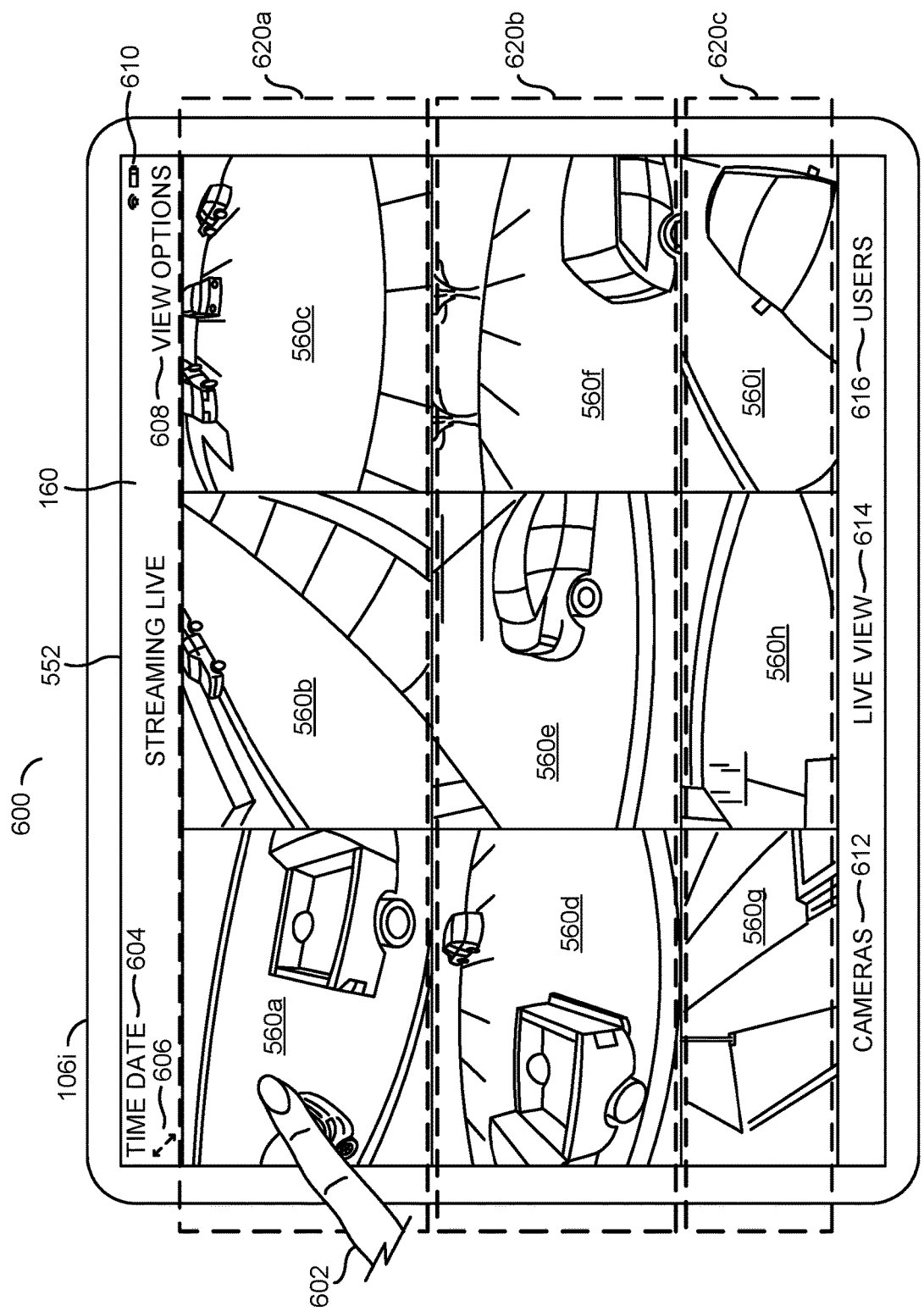
FIG. 9 is a diagram illustrating a companion application displaying intelligently selected video streams on a mobile computing device.

Referring to FIG. 9, a diagram illustrating a companion application displaying intelligently selected video streams on a mobile computing device is shown. An intelligently selected video streaming example 600 is shown. In the example 600, the mobile device 106*i* is shown as a representative example of any of the mobile devices 106*a*-106*n*. The mobile device 106*i* is shown as a tablet computing device. The I/O interface 552 of the mobile device 106*i* is shown as a touchscreen interface. The touchscreen interface 552 is shown displaying output for and receiving input (e.g., requests) for the companion app 160. A finger 602 is shown interacting with the companion app 160. The touchscreen interface 552 may receive the input from the finger 602 that may be interpreted as requests from the user by the companion app 160. The touchscreen interface 552 and/or the companion app 160 may update the display in response to the video streams received and/or the requests of the user 602.

The companion app 160 is shown displaying multiple of the video feeds 560*a*-560*i* simultaneously. The companion app 160 may be configured to enable the user 602 to access the multiple video feeds 560*a*-560*i* simultaneously. The companion app 160 may communicate with the smart security devices 102*a*-102*n* and/or the remote device 104.

The companion app 160 may comprise a time and date 604, a toggle button 606 and a view options button 608. The time and date 604 may display a timestamp of one or more of the video feeds 560*a*-560*i*. In the example 600, the video feeds 560*a*-560*i* may be a live feed and the time and date 604 may be the current time and date. The toggle button 606 may be a fullscreen toggle. The fullscreen toggle 606 may enable one of the video feeds 560*a*-560*i* to be displayed across the entirety of the touchscreen interface 552. The view options 608 may enable a selection menu to enable the operator 602 to select various view options (e.g., select between different arrangements, select previous recordings, select thumbnail views, etc.).

Icons 610 are shown. The icons 610 may be operating system icons. The companion app 160 may integrate with the operating system run by the mobile device 106i.

The companion app 160 may comprise a cameras button 612, a live view button 614 and/or a users button 616. The cameras button 612 may enable the operator 602 to manually select which of the smart security devices 102a-102n to view video feeds from. The camera buttons 612 may enable the operator 602 to select various settings for each of the smart cameras 102a-102n (e.g., framerate, resolution, types of events to detect, responses to perform, enabling 2-way communication, controlling lights, etc.). The live view button 614 may enable the operator 602 to view live video feeds from one or more of the smart cameras 102a-102n. In the example 600, the companion app 160 may be displaying the live view. The live view button 614 may enable the operator 602 to toggle between a live view and watching previously recorded video streams (e.g., the video streams stored in the video stream storage 210). The users button 616 may enable the operator 602 to change user preferences. The user preferences that may be accessed by the users button 616 may enable the operator 602 to update settings that may be stored in the user preferences storage 216.

Arrangement rows 620a-620c are shown. The arrangement rows 620a-620c may be one example implementation of an arrangement of the subset of the video streams that may be configured by the companion app 160. In the example shown, the top arrangement row 620a may comprise the video feeds 560a-560c, the middle arrangement row 620b may comprise the video feeds 560d-560f and the bottom arrangement row 620c may comprise the video feeds 560g-560i. In the example shown, the video feeds 560a-560i may display the video data captured by the smart security devices 102a-102n implemented in a parking lot (e.g., various cars and parking spaces may be shown).

The arrangement rows 620a-620c may display the video feeds 560a-560i as a 3×3 grid arrangement. Which of the video streams are shown as the video feeds 560a-560i may be chosen by the AI model 132 as the most likely to warrant further attention by the operator 602. The video feeds 560a-560i may comprise timestamps allowing for the human operator 602 to judge a latency of the event, and respond accordingly. The arrangement rows 620a-620c may enable increasing levels of focus on a particular stream (e.g., taking up the entire screen space, allowing for all human attention to go into details of one event as it occurs).

In the example shown, the top arrangement row 620a of the video feeds 560a-560c may be intelligently selected based on events detected by the smart security devices 102a-102n and/or the AI model 132 (e.g., using computer vision analysis, motion detection, analysis of audio, etc.). For example, the video feeds 560a-560c in the arrangement row 620a may be displayed as larger than the video feeds 560g-560i in the bottom arrangement row 620c. The AI model 132 may perform the computer vision analysis on the video data VD_A-VD_N and determine that the video data VD_A-VD_N with the most urgent events (e.g., objects and/or behavior determined to be the most pressing issue) may be selected to be displayed as the video feeds 560a-560c in the top arrangement row 620a. In an example, the smart security devices 102a-102n and/or the cloud computing service 104 may present the video streams to the mobile device 106i and the priority classification performed by the AI model 132 may indicate to the companion app 160 to arrange a subset of the video streams as the video feeds 560a-560c in the top arrangement row 620a.

In the example shown, the middle arrangement row 620b of video feeds 560d-560f may be user selected video streams. For example, the companion app 160 may enable the operator 602 to manually select one or more video streams for display in the middle arrangement row 620b. In another example, the companion app 160 may display one or more of the video streams VS_A-VS_N based on previously provided user preferences (e.g., the data stored in the user preferences 216). The user selected video feeds 560d-560f may remain in view on the companion app 160 regardless of objects detected by the AI model 132 (e.g., not swapped out when new video streams are intelligently selected). For example, the user may 'pin' some video streams to be permanently displayed in the middle arrangement row 620b.

In the example shown, the bottom arrangement row 620c of video feeds 560g-560i may be regularly rotated in and out of view. Rotating the video feeds 560g-560i in and out of view may enable the operator 602 to see all the available video streams over time (e.g., even when no event is detected). A subset of the video streams may be rotated in and out at particular time intervals (e.g., every 30 seconds). In example, the video feeds 560g-560i may comprise the video streams for one time interval and then in the next time interval, the video streams may be swapped out (e.g., not displayed) and the video feeds 560g-560i may be replaced with other of the video streams. In another example, if the video feed 560g comprises the video stream (e.g., VS_A), and then the AI model 132 detects an event in the video stream VS_A, the video stream VS_A may be moved to the top arrangement row 620a (e.g., promoted to a more prominent location such as the video feed 560a) and the video feed 560g may be replaced with another one of the video streams to prevent the video feed 560g duplicating the same video stream that may be already displayed in the video feed 560a. Generally, the video streams that are being rotated in first may be the first of the currently displayed video streams that may be swapped out when the system intelligently selects one of the video streams due to an event detection (e.g., a first in first out arrangement).

The video feeds 560a-560c displayed may change over time. In one example, if the video feed 560a no longer displays an event that warrants the attention of the operator 602 (e.g., as determined by the AI model 132), the feed 560a may be swapped out for another one of the video streams. When one of the video stream that is not currently displayed by the companion app 160 comprises a detected event (e.g., the video streams that are not currently displayed may still be analyzed by the AI model 132), the companion app 160 may be updated to display the video stream with the newly detected event. The new video stream may replace one of the video feeds 560a-560i currently displayed (e.g., a video stream that does not currently display an event).

In the example shown, the companion app 160 may display nine of the video streams. In one example, the AI model 132 may perform the computer vision analysis on each of the video streams VS_A-VS_N stored in the video stream storage 120a-120n. The AI model 132 may determine which of the video streams comprise an event and/or determine which of the video streams should be displayed prominently on the companion app 160 based on user preferences and/or the priority classification. For example, the AI model 132 may detect events in the subset of the video streams. The AI model 132 may further determine the arrangement to display the subset of the video streams. To conserve bandwidth, the cloud computing service 104 may only transmit the subset of the video streams instead of all of the video streams. The cloud computer service 104 may further present the priority classification to indicate the arrangement of the communicated subset of video streams. For example, priority signals comprising the priority classification may provide data externally generated from the companion app 160 that may be readable by the companion app 160 to determine which of the subset of the video streams should be displayed at which video feed 560a-560i. For example, the priority classification may which of the video streams (e.g., data from which of the smart security devices 102a-102n) should be displayed in the top arrangement row 620a (e.g., the video streams with the most urgent events), which of the video streams should be displayed in the bottom arrangement row 620c (e.g., the video streams with the least urgent events detected).

Figure 10:
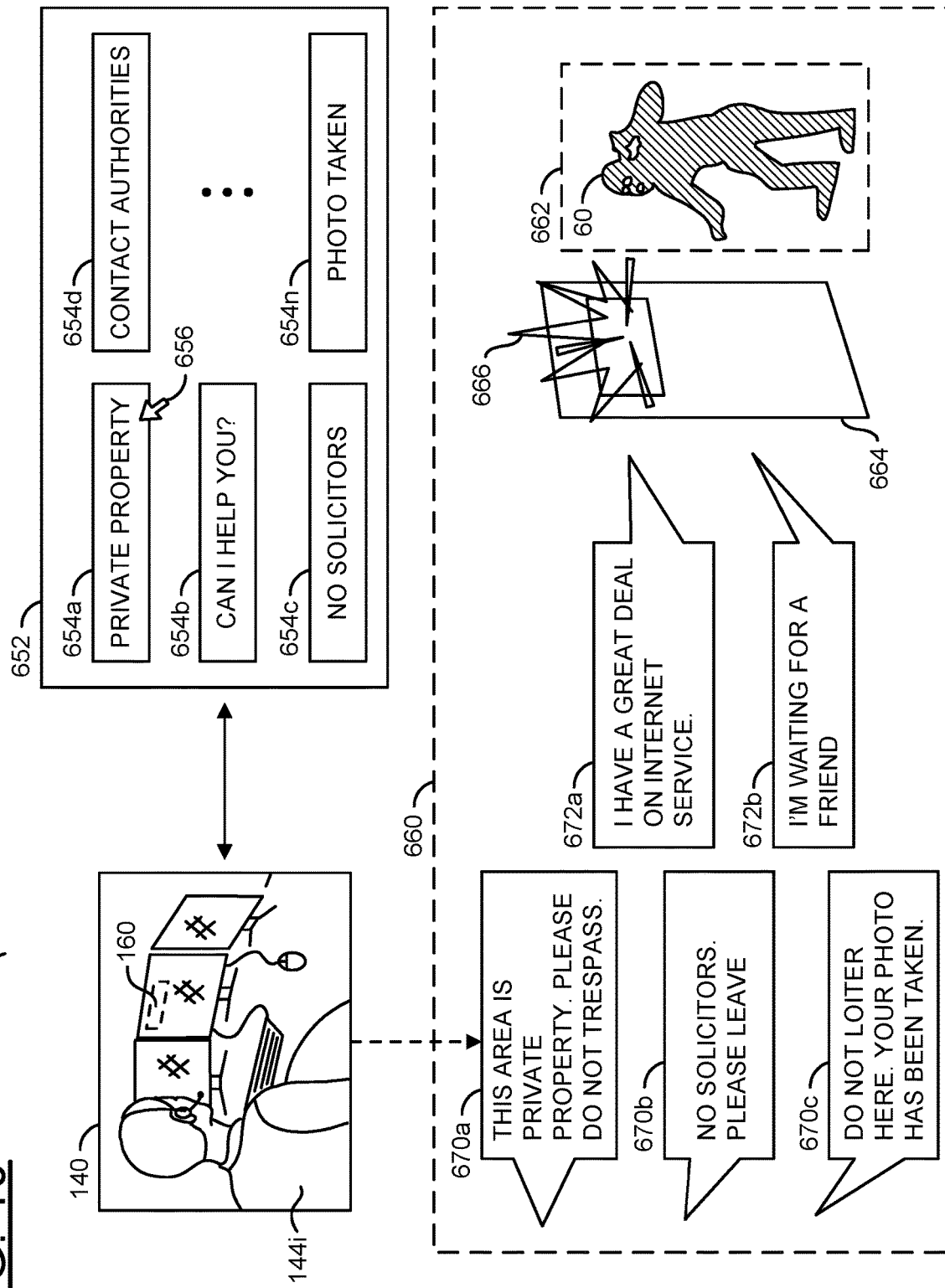
FIG. 10 is a diagram illustrating active engagement and third party service engagement of a visitor.

Referring to FIG. 10, a diagram illustrating active engagement and third party service engagement of a visitor is shown. An example scenario 650 is shown. The example scenario 650 may comprise a third party service provided by the remote monitoring service 140 selecting reactions and/or tagging metadata for the smart security devices 102a-102n.

The monitoring performed by the remote monitoring service 140 may be an example of automatic on demand backup services. For example, if a user does not respond to an emergency alert, the remote monitoring service 140 may be contacted. In another example, the user (e.g., property owner) may contract out all of the human-performed surveillance to the remote monitoring service 140. The employees 144a-144n employed by the remote monitoring service 140 may view live video feeds generated by one or more of the smart security devices 102a-102n to provide real-time monitoring of the properties 202a-202n. In one example, the remote monitoring service 140 may be provided as a subscription-based service (e.g., a premium service that provides the remote monitoring service 140 in addition to the manual DIY security monitoring). In another example, the remote monitoring service 140 may be provided as the automatic on demand backup service for the per-use and/or time-based fee.

The security guard or security personnel (or receptionist) 144i is shown at the remote monitoring service 140. The single employee 144i is shown as a representative example of the employees 144a-144n described in association with FIG. 1. The security personnel 144i may be a remote user. The security guard or security personnel 144i may use the companion app 160 to monitor the video feeds communicated by the smart security devices 102a-102n from a location remote from the location of the smart security devices 102a-102n (e.g., remote from the detected events). In the example shown, the security personnel 144i may be the user of the companion app 160. In one example, the security personnel 144i may be at a remote location from the smart security devices 102a-102n (e.g., in a different city, in a different country, on a different property, etc.). In another example, the security personnel 144i may be on the same property as the smart security devices 102a-102n (e.g., an attendant in a lobby of an apartment building that uses the smart security devices 102a-102n to monitor the property of the apartment building).

The employees 144a-144n provided by the remote monitoring service 140 may select reactions for the smart security devices 102a-102n using an interface 652. In an example, the interface 652 may enable the security personnel 144i to select reactions and communicate the selected reactions to the cloud computing service 104. The cloud computing service 104 may forward the reactions selected to the smart security devices 102a-102n. For example, the interface 652 may enable remote manual control of the reactions as an alternate option to the AI model 132 selecting the reactions.

The interface 652 may comprise a list of buttons 654a-654n. The list of buttons 654a-654n may enable the receptionist 144i to select one or more of available audio message reactions that may be played back by the smart security devices 102a-102n (e.g., via the speaker 304). For example, the interface 652 may implement a soundboard that enables the receptionist 144i to select the audio played back by the smart security devices 102a-102n.

A mouse pointer 656 is shown on the interface 652. For example, the receptionist 144i may use the mouse pointer 656 to interact with one of the buttons 654a-654n. The buttons 654a-654n are shown having basic descriptive messages. In an example, the button 654a may correspond to one of the audio message reactions that provides audio indicating that the area is private property. In another example, the button 654n may correspond to one of the audio message reactions that provides audio to indicate to the detected person that a photograph has been taken (e.g., to deter any criminal activity). In the example shown, the buttons 654a-654n may correspond to audio message that may be suitable for a residential property. In examples where the smart security devices 102a-102n are implemented at a business property, other audio messages may be available (e.g., to provide business hours, to provide roadside delivery, to provide deterrence messages after business hours, etc.).

The description of the buttons 654a-654n may be generic to provide a common interface for the remote monitoring service 140 regardless of the particular property where the smart security devices 102a-102n are located. The audio played by the particular one of the smart security devices 102a-102n may be customized. For example, the receptionist 144i may select one of the buttons 654a-654n for providing the business hours of a small business without having to know the detailed business schedule of a particular business. In response to the selection of the business hours button, the smart security devices 102a-102n may playback the audio message 146 associated with the business hours (e.g., one business may have business hours of 8 am-4 pm, while another business may have hours of 9 am-5 pm). The interface 652 may enable all, or most, of the employees 144a-144 of the remote monitoring service 140 to have a common interface for selecting context-appropriate reactions without needing to know the exact details of the reaction, in order to provide faster responses (e.g., without needing to look up details for a particular business such as the business hours).

An example video frame 660 is shown. The example video frame 660 may be an example video frame captured by one of the smart security devices 102a-102n. The example video frame 660 may comprise a view of the visitor 60. A dotted box 662 is shown around the visitor 60. The dotted box 662 may represent the computer vision analysis being performed by the processor 112 on the visitor 60. The computer vision analysis 662 may also be performed on inanimate objects (e.g., a door 664). For example, the AI model 132 and/or the video processor 112 (e.g., using the local AI model 118) may detect and/or classify the visitor 60 as a burglar (e.g., wearing a ski mask, attempting to hide in the shadows, attempting to break into a home, etc.). In another example, the AI model 132 and/or the video processor 112 may detect and/or classify the object 664 as a door. A shape 666 is shown to represent a sound. For example, the sound 666 may be the burglar 60 breaking the glass of the door 664 in order to gain entry to the home. The sound 666 may be one example of the audio input captured by the microphone 300. The audio processor 310 may analyze the sound 666 to determine the behavior and/or characteristics of the visitor 60. The analysis of the video and/or the audio may be used to determine the characteristics of the visitor 60 and/or determine a priority level of the event detected.

Audio messages 670a-670c are shown. The audio messages 670a-670c may represent the audio output 146 generated by one of the smart security devices 102a-102n. In one example, the audio messages 670a-670c may be generated automatically using the audio processor 310. In another example, the audio messages may be played in response to the selections 654a-654n performed by the remote monitoring service personnel 144i. In the example shown, the audio messages 670a-670c may represent a conversation with the visitor 60. Audio responses 672a-672b are shown. The audio responses 672a-672b may represent vocal responses by the visitor 60. For example, the visitor 60 may respond to the audio messages 670a-670c with the vocal responses 672a-672b. The vocal responses 672a-672b may be the audio input 148 that may be received by the smart security devices 102a-102n. The smart security devices 102a-102n may communicate the vocal responses 672a-672b to the remote monitoring service 140 to enable the personnel 144i to enable two-way communication.

The audio message 670a from the smart security device 102n is shown. The audio message 670a may be selected by the AI model 132 and/or the processor 112 (e.g., using the local AI model 118) in response to the video analysis and/or audio analysis used to classify the visitor 60 and/or in response to the reaction selected by the receptionist 144i. The smart security device 102n may play the audio message 670a to attempt to deter the visitor 60. In the example shown, the audio message 670a selected may be "This area is private property. Please do not trespass".

The smart security device 102n may detect the response 672a from the visitor 60. In the example shown, the response 672a may be "I have a great deal on internet services". The smart security device 102n may contact the remote monitoring service 140. The smart security device 102n may provide a recording of the response 672a to the employee 144i at the remote monitoring service 140. In some embodiments, if the remote monitoring service 140 is unavailable or takes a long time to connect to the smart security device 102n, the smart security device 102n may continue the active engagement with the visitor 60 (e.g., generate the reactions 670a-670n) based on decisions from the AI model 132 and/or the local AI model 118 until the remote monitoring service 140 connects.

Connecting to the remote monitoring service 140 may be optional and/or depend on settings of the user (e.g., in one example, the remote monitoring service 140 may not be used unless the user does not respond to an emergency alert when the automatic on demand backup service is active). Generally, switching between the processor 112 (or the cloud computing service 104) selecting the reactions 670a-670n and the remote monitoring service 140 selecting the reactions 670a-670n may be seamless and/or be unknown to the visitor 60. For example, the remote monitoring service 140 may be able to imitate the conversational AI of the AI model 132 and the conversational AI of the AI model 132 may imitate human responses that would be selected by the employee 144i of the remote monitoring service 140. For example, the smart security devices 102a-102n may perform the conversational AI to provide an automated doorman service. If the remote monitoring service 140 is contacted, then the smart security devices 102a-102n may operate in a different mode where the off-site agent 144i selects the reactions 670a-670n. The off-site agent 144i may enhance the capabilities of the automated doorman service. In one example, the off-site agent 144i may enhance the automated doorman service by enabling a person to speak to the visitor 60 remotely (e.g., provide more complex human interaction than the conversational AI is capable of providing). In another example, the off-site agent 144i may enhance the automated doorman service by receiving instructions uploaded by the user. The user may upload specific instructions for the off-site agent 144i via the companion app 160. For example, when a package is expected, the user may upload instructions to allow the off-site agent 144i to sign for the package remotely, and make sure that the delivery person hides the package from view.

When the remote monitoring service 140 connects to the smart security device 102n, the remote monitoring service 140 may receive the recording of the response 672a from the visitor 60. The employee 144i may use the interface 652 to select the response 670a. In the example shown, the receptionist 144i may select the button 654c to playback the no solicitors message (e.g., since the visitor 60 claims to be selling internet services). The response 670b is shown as "No solicitors. Please leave". The smart security device 102n may continue to stream the video and/or audio data to the remote monitoring service 140 and/or the cloud computing service 104.

The smart security device 102n may stream audio of the response 672b of the visitor 60 (e.g., "I'm waiting for a friend") to the remote monitoring service 140. For example, the receptionist 144i may decide that the visitor 60 looks suspicious (e.g., wearing a ski mask) and is providing inconsistent answers (e.g., wants to sell something and then says waiting for a friend). The receptionist 144i may select the button 654n that may cause the smart security device 102n to generate audio that states that the photo of the visitor 60 has been taken (e.g., "Do not loiter here. Your photo has been taken").

The reactions 670a-670n selected by the receptionist 144i may be uploaded to the cloud computing service 104. The cloud computing service 104 may use the reactions 670a-670n, and the audio and video captured by the smart security device 102n to train the artificial intelligence model 132. The artificial intelligence model 132 may be used to actively engage with the visitor 60 and/or update the local AI model 118 used by the smart security devices 102a-102n to actively engage with the visitor 60 (e.g., implement conversational AI).

In addition to raising alerts and/or manual reactions selected by the receptionist 144i, when the AI model 132 detects possible incidents, a reaction may be communicated to automatically play a series of customized warning messages of increasing severity. For example, the reactions may comprise security features such as increasing loudness of warning messages, sirens, flashing strobe lights, etc. Generally, automated responses may be selected first, before the receptionist 144i intervenes.

As the detected event continues (e.g., the visitor 60 does not leave the area in the video frame 660 in response to the automated responses), the AI model 132 may decide the next reaction should be real-time communication. The real-time communication may be between the receptionist 144i and the visitor 60. The real-time communication with the visitor 60 may stream audio from the receptionist 144i (or the audio selected using the buttons 654a-654n) via the speaker 304, and receiving the audio responses 672a-672b using the microphone 300. The real-time communication may enable continual engagement until a patrol reaches the site of the event.

Enabling the receptionist 144i to have manual control over various security features of the smart security device 102n may enable the remote monitoring service 140 to be located anywhere. For example, the live audio reactions 670a-670c may enable monitoring from patrol cars, from a centralized location (e.g., a call center, from a command center, etc.) and/or by a property owner from anywhere (e.g., from home, from a small office, while on vacation, etc.). The location of the receptionist 144i may be varied according to the design criteria of a particular implementation. Details of the reactions that may be performed and/or the live interventions that may be performed may be described in association with U.S. application Ser. No. 16/792,642, filed on Feb. 17, 2020, appropriate portions of which are hereby incorporated by reference.

In some embodiments, the companion app 160 may enable the monitoring personnel 144i to manually tag events, objects and/or characteristics of the video frame 660. The manual tagging of events, objects and/or characteristics may be implemented in addition to and/or instead of the metadata generated by the processor 112 and/or the AI model 132. The monitoring personnel 144i may flag the event (e.g., the detection of the visitor 60). The event may be included as part of the metadata of the video frames (e.g., the manual tagging may be communicated back to the storage servers 120a-120n and/or the smart security devices 102a-102n and stored with the video data by the storage device 114). In an example, the monitoring personnel 144i may provide a tag input that the visitor 60 has been detected. The monitoring personnel 144i may further provide tag inputs about the characteristics of the visitor 60 (e.g., wearing a ski mask, select the color of the clothes, indicate a male voice was heard in the audio responses 672a-672b, etc.). The monitoring personnel 144i may classify the event (e.g., a burglar was detected, a loiterer was detected, a false alarm was detected, etc.). The monitoring personnel 144i may manually tag the video frame 660 with a transcript of the audio messages 670a-670c, the audio responses 672a-672b and/or other audio heard. The types of tags that may be manually applied by the monitoring personnel 144i that may be included with the metadata may be varied according to the design criteria of a particular implementation.

The example scenario 650 is shown as an example of the remote monitoring service 140 intervening to interact with the visitor 60. In some embodiments, the audio messages 670a-670c may be selected using the processor 112 and/or the AI model 132. For example, computer vision operations and/or audio analysis may be implemented to extract information about objects in the video frame 660 (e.g., detect the visitor 60, determine the behavior that indicates that the visitor 60 is attempting to break in through the door 664, determine characteristics of the visitor 60, etc.) and/or parse the audio (e.g., determine that the sound 666 corresponds to glass breaking, interpreting the audio responses 672a-672b to understand what the visitor 60 is communicating) automatically (e.g., without involvement of a person). The processor 112, the audio processor 310 and/or the AI model 132 may be configured to select the audio messages 670a-670c in response to the scenario detecting using computer vision and/or audio analysis. The processor 112 and/or the AI model 132 may be configured to determine when the scenario 650 should be passed off to the remote monitoring service 140 based on various priority classifications (e.g., a potential false positive scenario, a scenario where the processor 112 is unable to determine the event, a potential emergency scenario, etc.).

Figure 11:
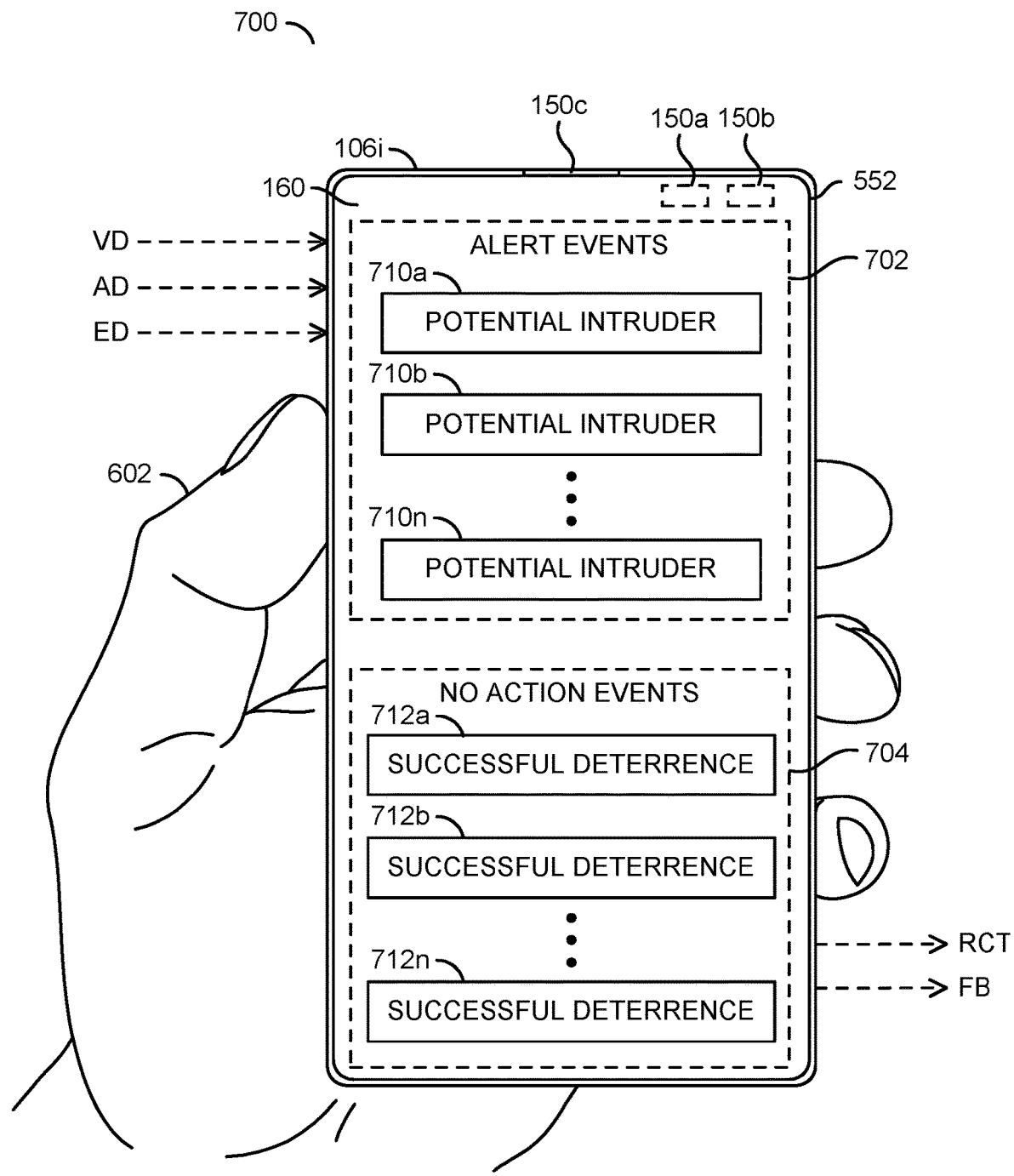
FIG. 11 is a diagram illustrating a user interface displaying a list of events.

Referring to FIG. 11, a diagram illustrating a user interface displaying a list of events is shown. An event grouping example 700 is shown. The event grouping example 700 may comprise the user device 106i displaying the companion app 160. The user 602 is shown holding the user device 106i and/or interacting with the companion app 160 displayed on the I/O interface 552. In one example, the user 602 may be a property owner. In another example, the user 602 may be one of the employees 144a-144n.

A display interface is shown for the companion app 160 executed by the user device 106i (e.g., a smartphone). In one example, the companion app 160 may implement a video feed monitoring app. The user device 106i may be a representative example of any type of the user devices 106a-106n. The smartphone interface may be implemented for a small business owner user and/or a residential user (e.g., with fewer video feeds to monitor compared to commercial users with multiple properties). The user device 106i may comprise the processor 150a, the memory 150b and/or the speaker 150c. In some embodiments, the processor 150a may execute the computer readable instructions stored by the memory 150b to enable the user device 106i to provide the companion app 160 with the event grouping. The computer readable instructions may be configured to execute steps that may receive video data, receive audio data, receive event notifications, perform a classification of the event notifications into various priority event levels, and/or display a list of the notifications (e.g., the event data) according to the classification. For example, the classification of the events may be performed locally on the user device 106i using the processor 150a and the memory 150b. In some embodiments, the processing performed by the distributed servers 122a-122n may execute the computer readable instructions to enable the user device 106i to provide the companion app 160 with the event grouping. For example, the classification of the events may be performed remotely (e.g., by the AI model 132) and presented to the user device 106i.

The user device 106i may receive a signal (e.g., VD), a signal (e.g., AD) and/or a signal (e.g., ED). The signal VD may comprise the video data and/or video streams generated by the smart security devices 102a-102n. The signal VD may represent the multiple video feeds 560a-560n that may be received. The signal AD may comprise audio data generated by the smart security devices 102a-102n. The signal AD may represent the audio input (e.g., the audio responses 672a-672b) captured by the smart security devices 102a-102n. The signal ED may comprise event notifications and/or event classifications generated by the smart security devices 102a-102n. In some embodiments, each of the smart security devices 102a-102n may stream the video data signals VD, the audio data signals AD and/or the event notifications ED to the user device 106i. In some embodiments, smart security devices 102a-102n may communicate the video data, the audio data and/or event data to the cloud computing service 104, the cloud computer service 104 may process, analyze and/or transcode the video data, the audio data and/or the events data and then communicate the video data signals VD, the audio data signals AD and/or the event classifications ED to the user device 106i. For example, in some embodiments, the cloud computing service (e.g., the AI model 132) may perform the classification and/or prioritization of the events and provide the event classifications ED to the user device 106i. The number, type and/or method of communicating the signals to the user device 106*i* may be varied according to the design criteria of a particular implementation.

The user device 106*i* may generate a signal (e.g., RCT) and/or a signal (e.g., FB). The signal RCT may comprise reaction data. The reaction signal RCT may comprise reactions selected by the user 602. For example, in response to the events, the user 602 may select reactions (e.g., manual reactions), and the reactions may be communicated to the smart security devices 106*a*-106*n* to perform the manual reactions. The signal FB may comprise user feedback and/or user settings. The feedback signal FB may enable the user to provide feedback about the events detected (e.g., labeled training data) to the cloud computing service 104 to enable the AI model 132 to improve the event classification. The feedback signal FB may enable the user 602 to store user preferences for the companion app 160 and/or each of the smart security devices 102*a*-102*n* in the cloud computing service 104. In some embodiments, the reaction signal RCT may be communicated from the user device 106*i* to the individual smart security devices 102*a*-102*n*. In some embodiments, the reaction signal RCT may be communicated to the cloud computing service 104, the cloud computer service 104 may process and/or analyze reactions selected (e.g., to train the AI model 132 for more realistic and/or natural automatic reaction selection) and then the cloud computing service 104 may send the reaction data RCT to the appropriate smart security devices 102*a*-102*n*. The number, type and/or method of communicating the signals from the user device 106*i* may be varied according to the design criteria of a particular implementation.

The companion app 160 may be configured to display a list of the event data (e.g., the notifications) and/or arrange various events detected by the smart security devices 102*a*-102*n*. The companion app 160 may display the list on the I/O interface 552 comprising at least an event group 702 and an event group 704. The event group 702 may comprise higher priority events and the event group 704 may comprise lower priority events. In some embodiments, when none of the events correspond to the higher priority event group 702, the companion app 160 may display only the lower priority event group 704. In some embodiments, when none of the events correspond to the lower priority event group 704, the companion app 160 may display only the higher priority event group 702. Generally, the companion app 160 may display at least two of the event groups 702-704. In some embodiments, additional event groups may be displayed. The number, type and/or arrangement of the event groups 702-704 may be varied according to the design criteria of a particular implementation.

The higher priority event group 702 may comprise a number of events 710*a*-710*n*. The lower priority event group 704 may comprise a number of events 712*a*-712*n*. The processor 150*a* and/or the AI model 132 may be configured to prioritize and/or classify the events received in the event data ED into the events 710*a*-710*n* in the higher priority event group 702 and/or into the events 712*a*-712*n* in the lower priority event group 704. Each of the events 710*a*-710*n* and/or the events 712*a*-712*n* may correspond to a video stream (e.g., the video data) from one of the smart security devices 102*a*-102*n*. For illustrative purposes, the events 710*a*-710*n* and the events 712*a*-712*n* are shown as text. However, the events 710*a*-710*n* and/or the events 712*a*-712*n* may comprise a live view and/or a thumbnail view of the video data VD. For example, the events 710*a*-710*n* and/or the events 712*a*-712*n* may comprise the video feeds 560*a*-560*n* as shown in association with FIG. 8 and FIG. 9. The number of the events 710*a*-710*n* and/or the events 712*a*-712*n* may depend on the number of the smart security devices 102*a*-102*n* in the system 100, the size of the screen (e.g., the viewport) of the user device 106*i* and/or the user preferences selected (e.g., by the signal FB). The number of the events 710*a*-710*n* and/or the events 712*a*-712*n* displayed may be varied according to the design criteria of a particular implementation.

The events 710*a*-710*n* and/or the events 712*a*-712*n* may be displayed on the companion app 160 with visual decorations. Generally, the events 710*a*-710*n* in the higher priority event group 702 may have the same visual decorations, which may be different than the visual decorations used for the events 712*a*-712*n* in the lower priority event group 704. In the example shown, the events 710*a*-710*n* may comprise alert events that indicate a potential intruder may have been detected. In the example shown, the events 712*a*-712*n* may comprise successful deterrence events (e.g., no event detected or a previously detected intruder may have been successfully deterred by the automatic reactions performed by the smart security devices 102*a*-102*n*.). In the example shown, alert (e.g., medium or yellow visual decorations) events 710*a*-710*n* and low priority (e.g., green visual decorations) events 712*a*-712*n* are shown. For example, the events 710*a*-710*n* may be displayed with a yellow border and the events 712*a*-712*n* may be displayed with a green border. In the example shown, none of the events 710*a*-710*n* and/or the events 712*a*-712*n* shown currently may suggest an emergency response. The visual decorations used for the events 710*a*-710*n* and/or the events 712*a*-712*n* may be varied according to the design criteria of a particular implementation.

The companion app 160 may arrange and/or group the events based on the classification. The arrangement and/or grouping of the events may enable the alert events (e.g., the events 710*a*-710*n* in the higher priority event group 702) to be shown in a more prominent location than the successful deterrence events 712*a*-712*n* (e.g., on the top of the list above the lower priority group events 704). In one example, the arrangement of the events with the higher priority event group 702 with more prominence may comprise displaying the events 710*a*-710*n* with a larger size than the events 712*a*-712*n*. In another example, the arrangement of the events with the higher priority event group 702 with more prominence may comprise displaying all of the events 710*a*-710*n* and displaying some of the events 712*a*-712*n*, with other of the events 712*a*-712*n* not actively displayed (e.g., hidden off-screen and/or available through a sub-menu). In another example, the arrangement of the events with the higher priority event group 702 with more prominence may comprise displaying the events 710*a*-710*n* and the events 712*a*-712*n* based on the user preferences (e.g., the user 602 may prefer to have the higher priority event group 702 on the bottom of the screen for easier thumb access when holding a smartphone embodiment of the user device 106*i*). The method of displaying the higher priority event group 702 with more prominence than the lower priority event group 704 may be varied according to the design criteria of a particular implementation.

The events 710*a*-710*n* and/or the events 712*a*-712*n* may be displayed as live video stream thumbnails and/or time-lapse video streams (e.g., updating a thumbnail image after a predetermined amount of time). Generally, the companion app 160 may enable the user 602 to interact with the events 710*a*-710*n* and/or the events 712*a*-712*n*. For example, the user 602 may click (or tap) on one of the events 710*a*-710*n* and/or the events 712*a*-712*n* to view a larger (e.g., fullscreen) view of the selected event. In another example, interacting with one of the events may enable the user 602 to select a reaction. In yet another example, interacting with one of the events may enable the user 602 to receive additional information about the smart security devices 102a-102n (e.g., location, operating temperature, uptime, number of event detections, etc.). The user 602 may interact with the successful deterrence events 712a-712n for auditing. For example, double-check that the successful deterrence events 712-712n were actually events (e.g., not a false positive) and/or that the intruder was actually successfully deterred). One example of a successful deterrence may comprise detecting an intruder every 10-20 seconds, and when no intruder is detected, then classifying the intruder event as successfully deterred.

An interface is shown for an app executed by a user device (e.g., a smartphone). The smartphone interface may be implemented for a small business owner user and/or a residential user (e.g., with fewer video feeds to monitor compared to commercial users with multiple properties). Alert (e.g., medium or yellow) events and low priority (e.g., green events) are shown. None of the events shown currently may suggest an emergency response. The alert events may be shown in a more prominent location (e.g., on the top of the list above the successful deterrence events). The user may interact with the successful deterrence events for auditing.

Figure 12:
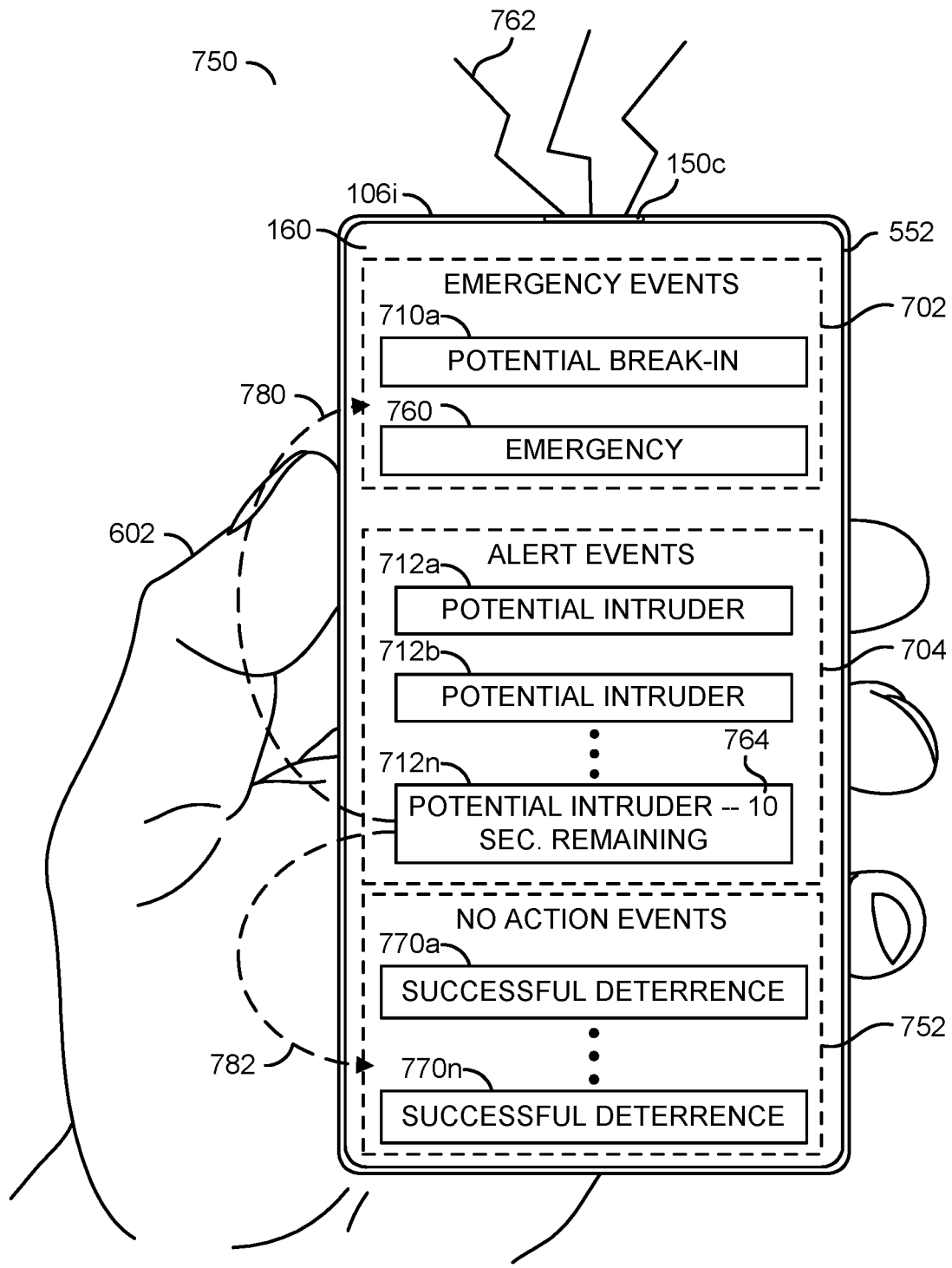
FIG. 12 is a diagram illustrating a user interface inserting a high priority event into a prominent location in a list of events.

Referring to FIG. 12, a diagram illustrating a user interface inserting a high priority event into a prominent location in a list of events is shown. A high priority event example 750 is shown. The high priority event example 750 may comprise the user device 106i, similar to the example shown in association with FIG. 11. The user 602 is shown holding and/or interacting with the I/O interface 552. The companion app 160 is displayed on the I/O interface 552. The smartphone user interface (UI) shown in the high priority event example 750 may be used by a property owner and/or home owner user 602 in a small business and/or residential embodiment.

In the high priority event example 750, the companion app 160 is shown displaying the higher priority event group 702, a lower priority event group 704, and an additional event group 752. The additional event group 752 may be the lowest priority event group. In one example, the higher priority event group 702 may correspond to a loiterer event and/or a potential break-in (e.g., events that may warrant attention from the employees 144a-144n and/or the user 602). For example, loiterer events may be classified as a red alert event. The processor 150a and/or the AI model 132 may be configured to classify the event data ED. In the high priority event example 750, three priority levels are shown (the Red/High priority event group 702, the Yellow/Medium priority event group 704, and the Green/Low priority event group 752). The number and/or classifications of the event groups may be varied according to the design criteria of a particular implementation.

In the example shown, the higher priority event group 702 may correspond to emergency events (e.g., events that should be focused on and/or handled immediately). The high priority event group 702 is shown displayed at the most prominent location (e.g., at the top of the I/O interface 552, in the example shown, but other locations may be considered to be the most prominent). The higher priority event group 702 may comprise the event 710a. The event 710a may be a potential break-in (e.g., the smart security devices 102a-102n and/or the AI model 132 may have performed computer vision and/or behavior analysis and detected an intruder breaking in). A button 760 is shown. The button 760 may enable the user 602 to respond manually to the event 710a. In some embodiments, each of the events 710a-710n displayed may each have a respective implementation of the button 760 to respond to each of the events 710a-710n. In some embodiments, the button 760 may be overlaid on top of the event 710a (e.g., the video stream of the event 710a may be clickable to respond to the event instead of implementing a separate button).

As new high priority events (e.g., events 710b-710n, not shown) are received, the high priority events may be inserted at the top of the list of classified events. For example, the event data ED may comprise new incoming events, which may be classified as belonging in the higher priority event group 702. In one example, facial recognition may be performed by the AI model 118 and/or the AI model 132, which may detect a known criminal and the detection of the known criminal may be one of the high priority events 710a-710n (e.g., without waiting for additional context). The high priority event 710a of a potential break-in is shown inserted at the top of the list of events above the yellow/medium events group 704 and the low priority events group 752. As more events 710a-710n are received and classified into the higher priority event group 702, the display of the medium priority event group 704 and/or the low priority event group 752 may be pushed down into a less prominent position (and potentially pushed off-screen) in order to display all of the high priority events 710a-710n in the location of high prominence.

An audio alert 762 is shown. The audio alert 762 may be generated for the high priority event 710a. The audio alert 762 may be one type of notification that may be received in response to a new event being added to the higher priority event group 702. The notification may be generated to draw the attention of the user 602. Other types of alerts may be generated (e.g., vibration, animations emails, push notifications, etc.). The user 602 may interact with the emergency button 760 to respond to the event 710a.

The medium priority event group 704 may be an example of one of the lower priority event groups. In the example shown, the medium priority event group 704 may comprise the events 712a-712n. The events 712a-712n may be alert events. The alert events 712a-712n may be shown in a location that may be more prominent than the low priority event group 752 but less prominent than the higher priority event group 702. In the example shown, the alert events 712a-712n may correspond to the detection of potential intruders. The alert events 712a-712n may be newly detected events. In an example, the smart security devices 102a-102n may detect a visitor and/or guest and provide the event data signal ED. Without additional context, the intent and/or behavior of the visitor 60 when initially detected may be unknown. The alert events 712a-712n may be presented so that the user 602 may be aware of a new visitor to pay closer attention to. The alert events 712a-712n may be further analyzed (e.g., by the smart security devices 102a-102n and/or the AI model 132) and re-classified as the intent and/or behavior of the visitor 60 is learned.

The low priority event group 752 may comprise events 770a-770n. The events 770a-770n may be similar to the alert events 712a-712n and/or the emergency events 710a-710n, but with a different categorization. The events 770a-770n may be no action events. The no action events 770a-770n may correspond to scenarios that the user 602 has no particular reason to respond to (e.g., no visitor detected, nothing happening, mundane circumstances, etc.). In the example shown, the events 770a-770n may be successful deterrent events. Many of the no action events 770a-770n may not be displayed. For example, the no action events 770a-770n may not be displayed when there are a sufficient amount of the emergency events 710a-710n and/or the alert events 712a-712n to fill the I/O interface 552. In some embodiments, a subset of the no action events 770a-770n may be cycled and/or rotated into view on the I/O interface 552 to provide a general overview of what is captured by the smart security devices 102a-102n.

A timer 764 is shown. The timer 764 may comprise an adjustable countdown timer. For example, the length of the timer 764 may be adjusted according to the preferences of the user 602. The timer 764 may provide a threshold amount of time for classifying a newly received event. The timer 764 may correspond to the alert event 712n. While one timer 764 is shown for illustrative purposes, each of the alert events 712a-712n may have a respective independent implementation of the timer 764. The timer 764 may be an adjustable timer (e.g., a 20 second timer, a 60 second timer, a 5 minute timer, etc.). In the example shown, the timer 764 may have 10 seconds remaining. The system 100 may re-categorize the intruder alert event 712n (e.g., a yellow/medium priority event) into one of the successful deterrence events 770a-770n (e.g., green/low priority event) after the timer 764 elapses. For example, after about 60 seconds the yellow event 712n may automatically change to one of the green events 770a-770n to indicate a successful deterrence (e.g., if the intruder 60 is no longer detected after the timer 764 elapses). The timer 764 may be implemented to determine a progression from one priority event level to another priority event level automatically.

Arrows 780-782 are shown. The arrows 780-782 may illustrate a re-classification of the alert event 712n. In one example, before the timer 764 elapses, the AI model 118 and/or the AI model 132 may determine the behavior of the intruder 60 to be that of a burglar and/or a guest in need of assistance. In response to determining the visitor 60 is a burglar and/or a guest in need of assistance, the re-classification 780 may be performed to move the alert event 712n into the higher priority event group 702 as one of the emergency events 710a-710n. In another example, after the timer 764 elapses, the AI model 118 and/or the AI model 132 may determine that the visitor 60 is still present. In response to determining the visitor 60 is still present after the end of the timer 764, the system 100 may re-classify the visitor 60 as a loiterer and the re-classification 780 may be performed to move the alert event 712n into the higher priority event group 702. In yet another example, after the timer 764 elapses, the AI model 118 and/or the AI model 132 may determine that the visitor 60 is no longer detected. In response to determining the visitor 60 is no longer present after the end of the timer 764, the system 100 may perform the re-classification 782 to move the alert event 712n to the low priority event group 752 as one of the successful deterrence events 770a-770n. For example, the re-classification 782 may indicate that the event levels 770a-770n having the lower priority may not need a manual response from the user 602.

The personnel 602 may perform voluntary auditing to check the AI automation technology (e.g., determine if the intruder was actually successfully deterred). Viewing the successful deterrence events 770a-770n may enable the auditing to be performed. Generally, the monitoring personnel 602 may have to select a manual response (e.g., the emergency button 760) when a rare event (e.g., a high priority event such as a "Break-In" is detected). Generally, 1 out of 8000 yellow events 712a-712m are likely to be re-classified as the red events 710a-710n (e.g., the intruder does not leave after the timer 764 elapses), which may be less than one per day. Otherwise there may not be a response required of the personnel 602.

Generally, the AI model 118 and/or the AI model 132 may perform the prioritization and/or the classification of the events data ED. In some embodiments, the processor 150a may re-classify events (e.g., after the timer 764 elapses). The prioritization and/or classification of the event data may be determined in response to the analysis of the video data VD and/or the audio data AD. For example, computer vision may be performed to detect people and/or animals. The computer vision may be used to determine the behavior of the visitor 60. Audio analysis may determine the behavior of the visitor 60 (e.g., detecting broken glass, a request for help, a knock at a door, etc.). The AI model 118 and/or the AI model 132 may be configured to perform sensor fusion analysis by analyzing all the data collected from all the sensors of each of the smart security devices 102a-102n. The sensor fusion analysis may enable the AI model 118 and/or the AI model 132 to make inferences about the scenario, the context of the scenario, an identity of the visitor 60 and/or the behavior of the visitor 60 in order to perform the prioritization and/or classification of the event data ED.

Generally, the emergency events 710a-710n may be classified based on an urgency for responding by the user 602. For example, a detected burglar should be responded to immediately. Similarly, a customer waiting for a curbside pickup after scanning a receipt should be responded to as quickly as possible. The emergency events 710a-710n may be re-classified (moved to a lower priority group) after an immediate issue has been addressed. For example, after a burglar has been deterred, the emergency events 710a-710n may be re-classified as an alert event for a few minutes to ensure the burglar does not return. The alert events 712a-712n may be a selected classification based on newly detected visitors. The alert events 712a-712n may be classified in order to draw some attention from the user 602, without necessarily benefiting from immediate attention. Some video feeds may be classified as an alert event 712a-712n if a nearby smart security device 102a-102n has detected an emergency event (e.g., to check that an intruder does not try to access multiple entrances, or a nearby property). Alert events 712a-712n may be re-classified after learning more information about the event. The no action events 770a-770n may be classified based on either nothing being detected, or an event being detected that does not benefit from any action (e.g., an animal being detected). The no action events 770a-770n may be displayed to enable the user 602 to provide a secondary opinion and/or auditing the automatic classifications (which may be communicated as the signal FB).

Figure 13:
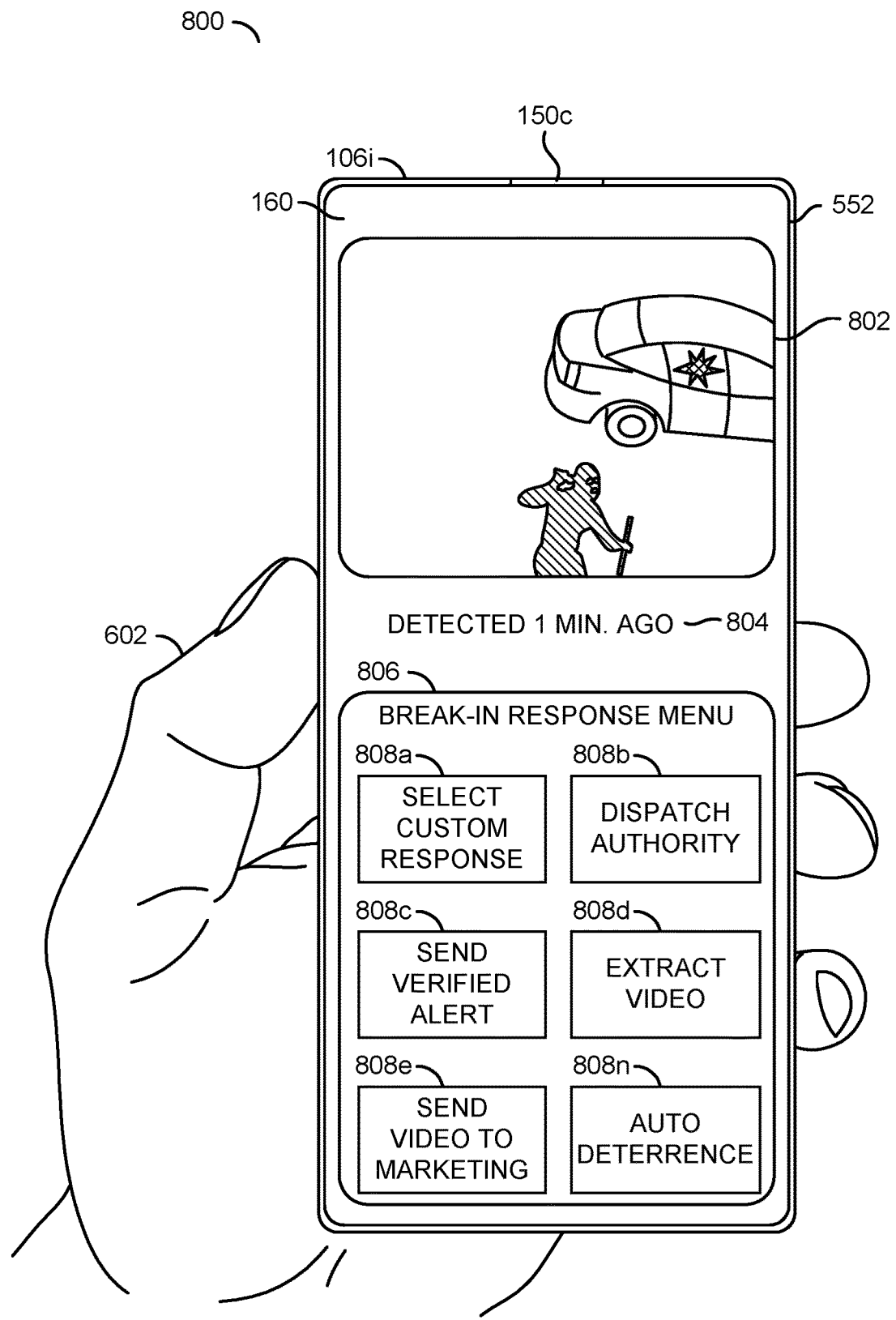
FIG. 13 is a diagram illustrating a user interface for selecting a manual response to a high priority event.

Referring to FIG. 13, a diagram illustrating a user interface for selecting a manual response to a high priority event is shown. An example reaction scenario 800 is shown. The example reaction scenario 800 may comprise the user 602 holding the user device 106i. The user device 106i is shown as a smartphone with the I/O interface 552 displaying the companion app 160.

The interface of the companion app 160 may show a live video feed 802 in response to the user 602 selecting the high priority event 710a shown in FIG. 12. The break-in of a vehicle is shown in the live video feed 802. The break-in of the vehicle may be the detected event 710a. A time stamp 804 for the video feed 802 is shown. In some embodiments, the events and/or video feeds may be organized in the UI/UX by the longest intrusion video (e.g., live or recorded)

from the moment of first Detection+N min:NN seconds. A response menu 806 is shown. The response menu 806 may provide a custom camera behavior menu.

The user 602 may select one or more manual responses 808a-808n in the response menu 806 to react to the emergency event 710a. The smart security devices 102a-102n that correspond to the event detected may perform the reaction selected by the user 602. The manual responses 808a-808n may comprise the custom response 808a and/or a number of common responses 808b-808e. The custom response 808a may enable the user 602 to select additional responses (e.g., responses that may be less common). In one example, the custom responses 808a may provide the interface 652 with the automatic talk down reaction buttons 654a-654n shown in association with FIG. 10. The common response 808b may comprise selecting authorities (e.g., police, private security service, etc.) to be dispatched. The common response 808c may comprise sending an alert to a verified and/or designated person (e.g., one of the verified neighbors as described in association with FIG. 3). One of the common responses 808d may comprise extracting the video feed 802. The video feed 802 may be extracted from the microSD local storage 114 of the smart security cameras 102a-102n (e.g., to be stored as an archive in the storage servers 120a-120n). One of the common responses 808e may comprise sending the video feed 802 to marketing (e.g., to show what types of events are being detected, which events detections have failed, which events were successfully deterred, to enable training the AI model 132, etc.). The reaction 808n may comprise auto deterrence. The reaction 808n may hand off deterrence to the automatic deterrence performed by the smart security devices 102a-102n (e.g., automatic deterrences that may be selected by the AI model 118 and/or based on rules in calendar data). The selection of the manual responses 808a-808n may be communicated via the reaction signal RCT. Generally, the verified alerts reaction 808c may be available for the yellow/medium priority events 712a-712n, while the dispatching authority reaction 808b and/or the extract video for the authorities event 808d may be available for red/high priority events 710a-710n. Generally, the sending video to marketing event 808e may be selected for the green/low priority events 770a-770n.

In some embodiments, the manual responses 808a-808n may be available as an on-demand backup performed by a professional service (e.g., the remote monitoring service 140) in addition to self-monitoring (e.g., performed by the property owner) and/or the automatic deterrence performed by the smart security devices 102a-102n. The on-demand backup by the professional service may be available for a fee (e.g., a fee per response, a flat monthly fee, a daily fee, etc.).

Figure 14:
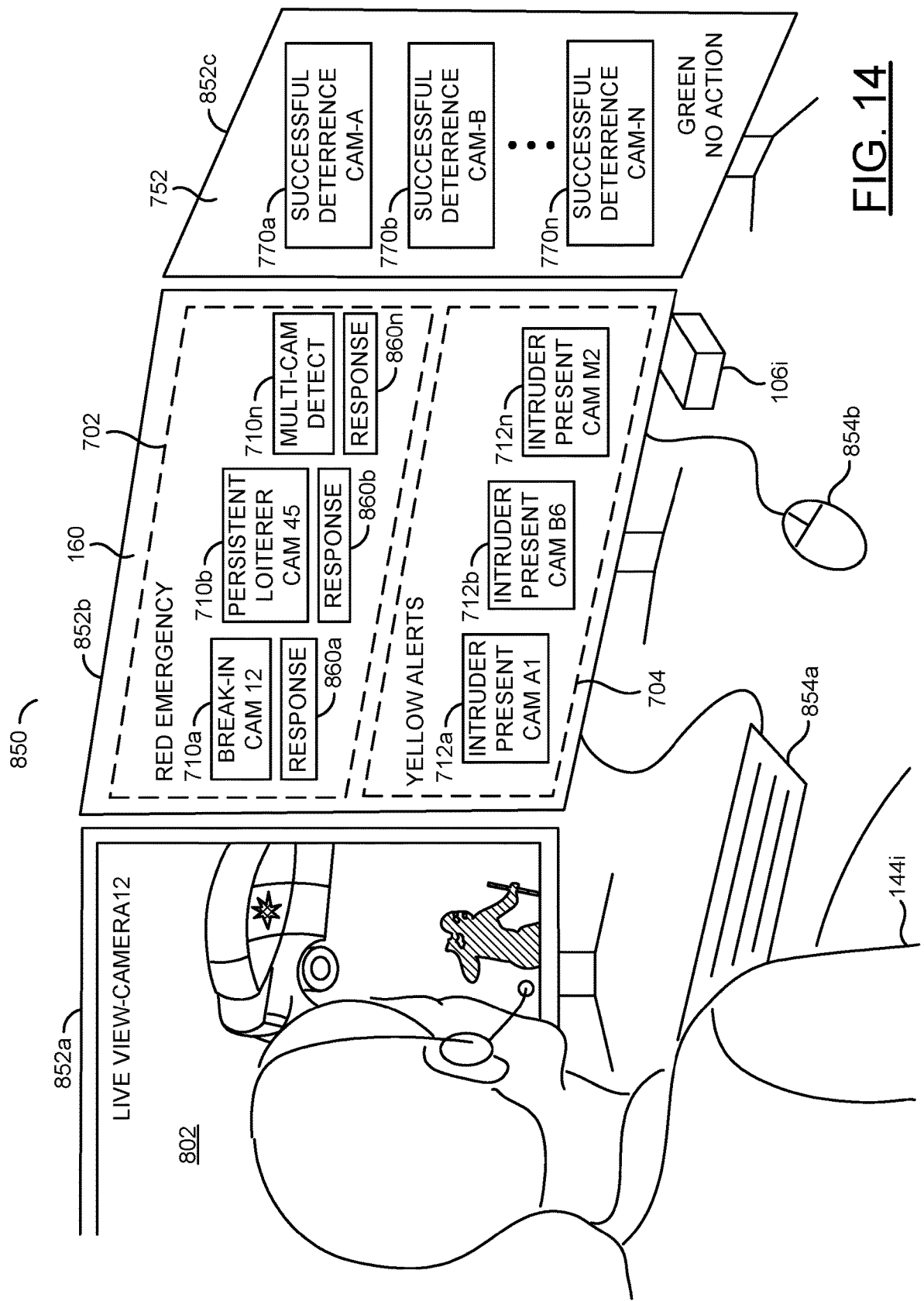
FIG. 14 is a diagram illustrating a user interface displaying a list of events to a third party security service.

Referring to FIG. 14, a diagram illustrating a user interface displaying a list of events to a third party security service is shown. An example user interface 850 is shown. The example user interface 850 may comprise the single security agent 144i monitoring the UI/UX. In some embodiments, multiple security agents (e.g., one of the groups 142a-142n comprising a team of 2 or 3 of the employees 144a-144n) may be assigned to the same subset of the smart security devices 102a-102n.

The example user interface 850 may comprise the security agent 144i viewing multiple display monitors 852a-852c. The user device 106i may be a computing device connected to the three monitors 852a-852c. Input devices 854a-854b may enable the security agent 144i to interact with the companion app 160.

The system 100 may classify the events for display on the UI/UX of the companion app 160 in order to provide the high priority events in a prominent position. In the example shown, the live video feed 802 of one of the high priority events 710a-710n is shown on the left monitor 852n. Displaying the live video feed 802 separately on a single monitor may provide a high resolution view of the live video feed 802. The center monitor 852b may be the prominent position to display the events classified as the higher priority events group 702. The red/high priority events 710a-710n in the higher priority event groups 702 are shown at the top of the center monitor 852b in the most prominent position (e.g., break-ins, persistent loiters, orchestrated detections from multiple cameras, etc.). The emergency events 710a-710n are shown with respective response buttons 860a-860n (e.g., which may open the break-in response menu 806 and/or move the selected one of the emergency events 710a-710n to the live video feed 802). The potential intruders for the yellow/medium events 712a-712n may be displayed in the medium priority events group 704. The medium priority events group 704 may be displayed below (e.g., in a less prominent location than) the higher priority events group 702. The lowest/green priority events group 752 may be displayed on the right monitor 852c. For example, all of the no action events 770a-770n may be displayed separately on the right monitor 852c.

The example user interface 850 may provide an illustrative example of selecting prominent locations and/or less prominent locations for the various classifications of the events. In the example user interface 850, the center monitor 852b may be the most prominent location with respect to the employee 144i. For example, the employee 144i may look straight ahead at the center monitor 852b and turn his/her head to view the less prominent location of the right monitor 852c. Since the right monitor 852c may be the least prominent location available, the no action/green priority events 770a-770n in the lowest priority event group 752 may be displayed on the right monitor 852c (e.g., to be viewed quickly, at a glance). On the center monitor 852b, the highest priority event group 702 may be displayed generally at eye level for the employee 144i. Eye level may be the most common and/or comfortable position. Displaying the highest priority event group 702 at eye level may be the most prominent available location for displaying events. The medium priority event group 704 may be displayed less prominently on the center monitor 852b (e.g., at a location below eye level). For example, the high priority events 710a-710n may be added to a top of the list of the events displayed as high priority events are detected and the lower priority events (e.g., the alert events 712a-712n may be added to the event list below the high priority events 710a-710n as the lower priority events are detected. Similarly, the no action events 770a-770n may be added below (or off to the side of on the monitor 852c) the alert events 712a-712n.

In some embodiments, visual aids may be used to provide additional prominence in addition to location. For example, particular color highlights may be selected based on the priority classification. In the example shown, a red border may be applied to the high priority events 710a-710n, a yellow border may be applied to the medium priority events 712a-712n and a green border may be applied to the no action events 770a-770n. In some embodiments, animations may provide additional prominence. For example, new high priority events 710a-710n may be animated with a wobble effect, to draw the attention of the employee 144i. The type of visual aids used for the various classifications of events may be varied according to the design criteria of a particular implementation.

In an example, the security personnel 144*i* (or a small team of the security personnel 144*a*-144*n*) may monitor 1k to 2k of the smart security devices 102*a*-102*n*. The grouping and/or classification of the intruder video events from thousands of smart security devices 102*a*-102*n* into separate priority groups (e.g., the higher priority event group 702, the medium priority event group 704, the low priority event group 752 and/or other additional groups) for efficient video monitoring may enable the security personnel 144*a*-144*n* to monitor the 1k to 2k video stream from the smart security devices 102*a*-102*n*. The categorization of the intruder events by the system 100 may provide the security personnel 144*a*-144*n* with a continually updating list of events to monitor, on an as-needed basis. For example, the events may be provided similar to an assembly line, where the security personnel 144*a*-144*n* may be continuously/continually provided with the latest events to focus attention on. For example, when events are categorized as a successful deterrence of an intruder, then the security personnel 144*a*-144*n* may have an efficient workflow because no action is expected of the monitoring person. Emergency (e.g., the high priority events 710*a*-710*n*) may demand a quick manual response from the security personnel.

Generally, the automatic detection and/or deterrence by the smart security devices 102*a*-102*n* (e.g., using good AI technology and unpredictable reaction behavior such as unpredictable sequence of light strobes and/or procedurally generating the voice down messages) may have an over 98% success rate for deterring intruders. The manual actions (e.g., selecting the responses 860*a*-860*n*) of the employees 144*a*-144*n* may occur less than once per day. Auditing of the manual and/or automatic deterrence reactions may be performed. For example, a false positive may be flagged by the employees 144*a*-144*n* (e.g., frequent detection of an intruder (e.g., every 10 seconds), detecting movement of a tree, detecting an animal, etc.) and presented as part of the feedback signal FB. In another example, a successful deterrence may be flagged (e.g., if the intruder was detected and then is later no longer detected). Automatic detection of an undeterred loiterer may be performed. For example, if a guest does not leave after the automatic deterrence events, the event may be re-classified as a red alert (e.g., one of the emergency events 710*a*-710*n*) to request the monitoring personnel 144*a*-144*n* to act immediately.

Figure 15:
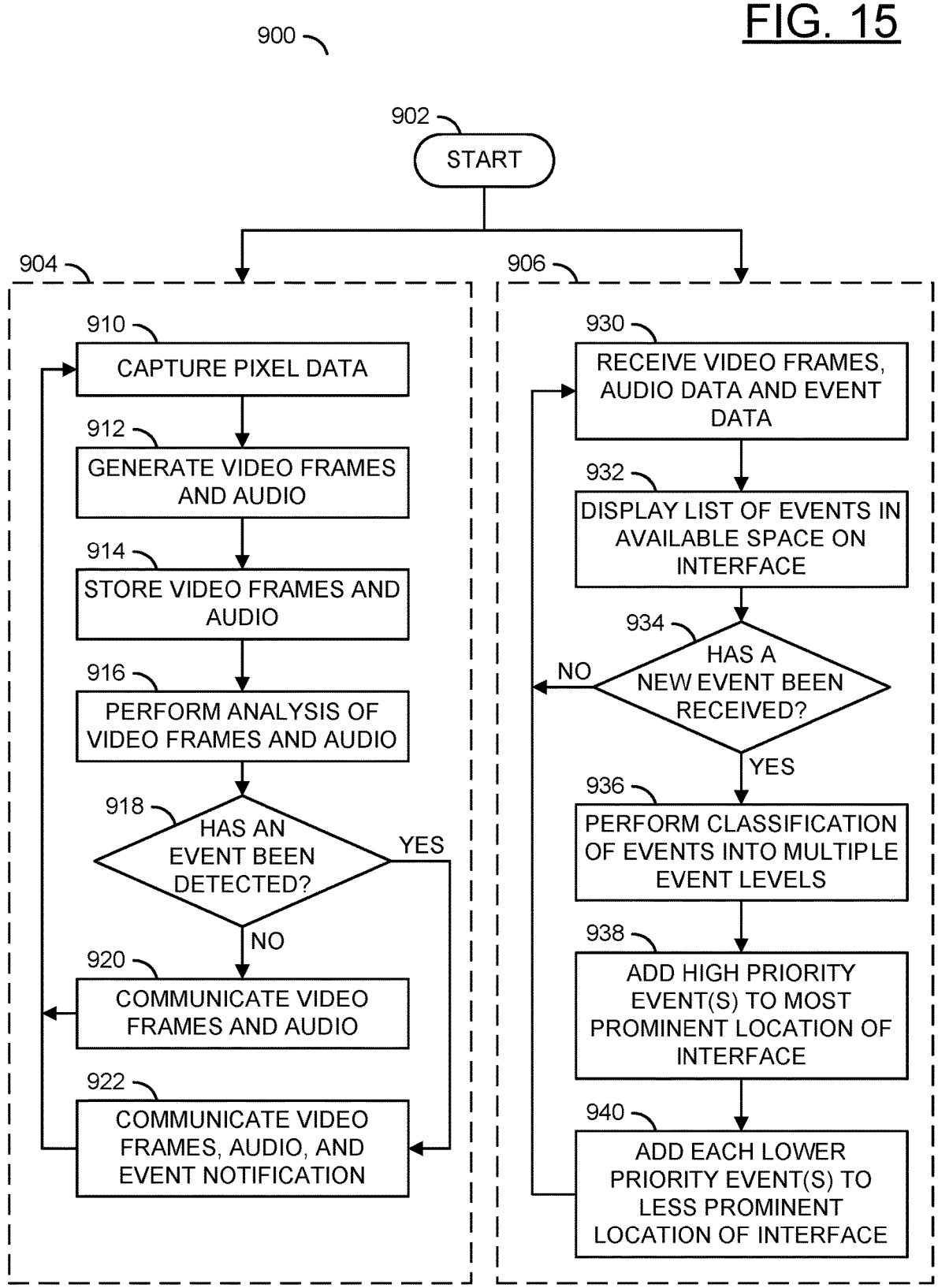
FIG. 15 is a flow diagram illustrating a method for grouping intruder video events from smart security cameras into priority groups for efficient video monitoring.

Referring to FIG. 15, a method (or process) 900 is shown. The method 900 may group intruder video events from smart security cameras into priority groups for efficient video monitoring. The method 900 generally comprises a step (or state) 902, a stage (or subprocess) 904, a stage (or subprocess) 906, a step (or state) 910, a step (or state) 912, a step (or state) 914, a step (or state) 916, a decision step (or state) 918, a step (or state) 920, a step (or state) 922, a step (or state) 930, a step (or state) 932, a decision step (or state) 934, a step (or state) 936, a decision step (or state) 938, and a step (or state) 940.

The step 902 may start the method 900. Next, the method 900 may move to the stage 904 and the stage 906. The stage 904 may comprise a smart security device event detection subprocess. The stage 906 may comprise an event grouping and video monitoring subprocess. The stage 904 may be performed by the smart security devices 102*a*-102*n*. The stage 906 may be performed by the cloud computing service 104 and/or the user devices 106*a*-106*n*. The stage 904 and the stage 906 may be performed in parallel and/or substantially in parallel.

The step 910 may start the stage 904. In the step 910, the smart security devices 102*a*-102*n* may capture pixel data.

Next, in the step 912, the video processor 112 and the audio processor 310 may generate video frames and/or audio data. In the step 914, the smart security devices 102*a*-102*n* may store the video frames and audio data locally (e.g., in the memory 302 and/or the removable storage 114). Next, in the step 916, the video processor 112 may perform an analysis of the video frames and/or the audio data. In some embodiments, the smart security devices 102*a*-102*n* may perform the analysis locally (e.g., using the video processor 112 and the local AI model 118). In some embodiments, the smart security devices 102*a*-102*n* may upload the video frames and/or audio data to the cloud computing service 104 and the AI model 132 may perform the video and/or audio analysis in the cloud. Next, the stage 904 may move to the decision step 918.

In the decision step 918, the smart security devices 102*a*-102*n* and/or the cloud computing service 104 may determine whether an event has been detected. If an event has not been detected, then the stage 904 may move to the step 920. In the step 920, the video frames VD and/or audio data AD may be communicated to the user devices 106*a*-106*n* (e.g., provide a live thumbnail view or a live video stream, which may be used for the no action events 770*a*-770*n*). Next, the stage 904 may return to the step 910. In the decision step 918, if an event has been detected, then the stage 904 may move to the step 922. In the step 922, the video frames VD, audio data AD and/or event notification ED may be communicated to the user devices 106*a*-106*n* (e.g., provide a live thumbnail view, live video stream and/or provide data for the classification of the events into the priority groups). Next, the stage 904 may return to the step 910.

The step 930 may start the stage 906. In the step 930, the user devices 106*a*-106*n* may receive the video frames VD, the audio data AD and/or the event data ED. Next, in the step 932, the companion app 160 may display the list of the various events on the available space on the I/O interface 552. Next, the stage 906 may move to the decision step 934.

In the decision step 934, the companion app 160 may determine whether a new event has been received. If a new event has not been received, then the stage 906 may return to the step 930. If a new event has been received, then the stage 906 may move to the step 936. In the step 936, the companion app 160 may perform the classification of the events into the multiple levels (e.g., the priority level 702, the priority level 704 and/or the priority level 752). Next, in the step 938, the companion app 160 may add any event(s) classified as high priority event(s) as the high priority events 710*a*-710*n* in the high priority event group 702 displayed in a most prominent location on the I/O interface 552. Next, in the step 940, the companion app 160 may add each lower priority event(s) (e.g., the medium events 712*a*-712*n* and/or the no action events 770*a*-770*n*) to the less prominent location of the I/O interface 552. Next, the stage 906 may return to the step 930.

Figure 16:
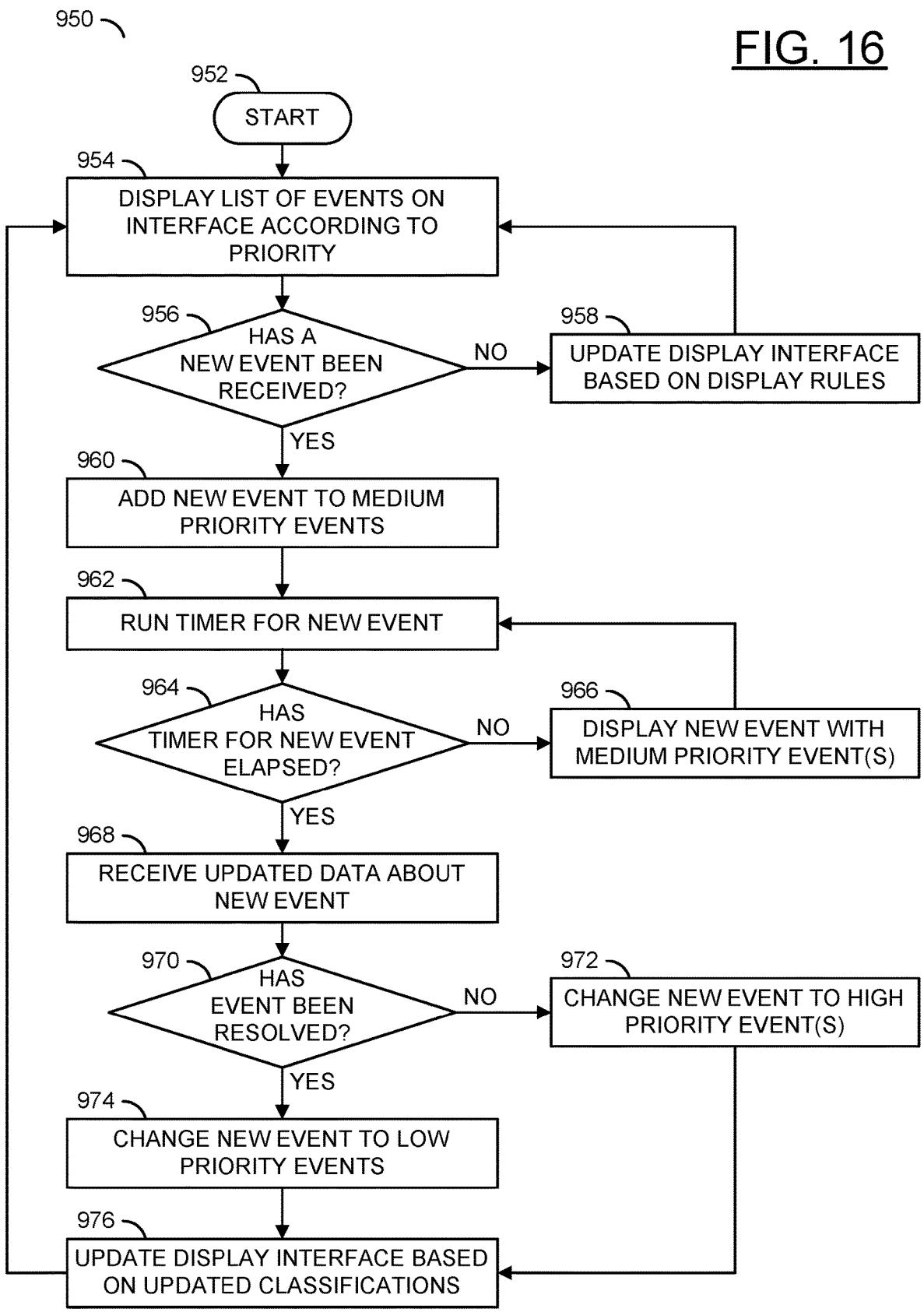
FIG. 16 is a flow diagram illustrating a method for classifying events into a priority level.

Referring to FIG. 16, a method (or process) 950 is shown. The method 950 may classify events into a priority level. The method 950 generally comprises a step (or state) 952, a step (or state) 954, a decision step (or state) 956, a step (or state) 958, a step (or state) 960, a step (or state) 962, a decision step (or state) 964, a step (or state) 966, a step (or state) 968, a decision step (or state) 970, a step (or state) 972, a step (or state) 974, and a step (or state) 976.

The step 952 may start the method 950. In the step 954, the companion app 160 may display the list of events on the I/O interface 552 according to the classified priority. Next, the method 950 may move to the decision step 956. In the decision step 956, the companion app 160 may determine whether a new event has been received. For example, the new event may be provided by the signal ED. If no new event has been received, then the method 950 may move to the step 958. In the step 958, the companion app 160 may update the I/O interface 552 based on display rules (e.g., default rules for changing which video streams and/or live thumbnails are shown such as rotating displayed video data periodically). Next, the method 950 may return to the step 954. In the decision step 956, if a new event has been received, then the method 950 may move to the step 960.

In the step 960, the new event may be added as one of the medium priority events 712a-712n in the medium priority event group 704. For example new events may be temporarily placed into the medium priority event group 704 (e.g., to draw the attention of the user 602) until more context is determined. Next, in the step 962 the timer 764 may be run for the new event. Next, the method 950 may move to the decision step 964. In the decision step 964, the companion app 160 may determine whether the timer 764 for the new event has elapsed. If the timer 764 has not elapsed, then the method 950 may move to the step 966. In the step 966, the event may remain with the medium priority event group 704. Next, the method 950 may return to the step 962 to continue the timer 764. In the decision step 964, if the timer 764 has elapsed, then the method 950 may move to the step 968. In the step 968, the companion app 160 may receive updated data about the new event. For example, the intruder may have left the property, attempted to break in, moved to another location on the property (e.g., detected by another of the smart security devices 102a-102n), etc. Next, the method 950 may move to the decision step 970.

In the decision step 970, the companion app 160 may determine whether the event has resolved. For example, the event may be resolved if the visitor is no longer detected. If the event has not been resolved, then the method 950 may move to the step 972. In the step 972, the companion app 160 may change the new event to one of the high priority events 710a-710n in the high priority event group 702. Next, the method 950 may move to the step 976. In the decision step 970, if the event has been resolved, then the method 950 may move to the step 974. In the step 974, the companion app 160 may change the new event to one of the no action events 770a-770n in the lowest priority event group 752. Next, the method 950 may move to the step 976. In the step 976, the companion app 160 may update the I/O interface 552 based on the updated classifications. Next, the method 950 may return to the step 954.

Figure 17:
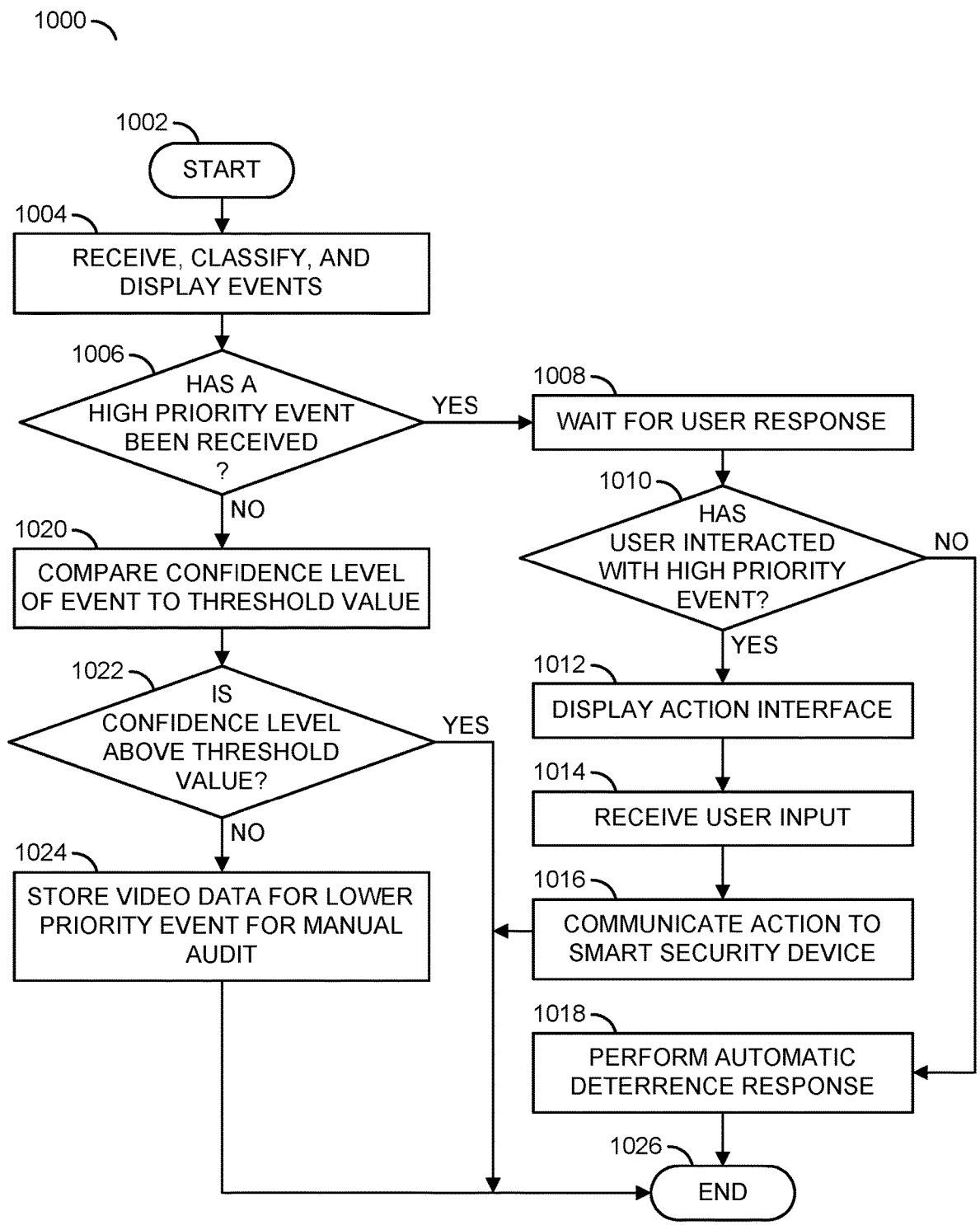
FIG. 17 is a flow diagram illustrating a method for selecting a manual response and selecting video data for a manual audit.

Referring to FIG. 17, a method (or process) 1000 is shown. The method 1000 may select a manual response and select video data for a manual audit. The method 1000 generally comprises a step (or state) 1002, a step (or state) 1004, a decision step (or state) 1006, a step (or state) 1008, a decision step (or state) 1010, a step (or state) 1012, a step (or state) 1014, a step (or state) 1016, a step (or state) 1018, a step (or state) 1020, a decision step (or state) 1022, a step (or state) 1024, and a step (or state) 1026.

The step 1002 may start the method 1000. In the step 1004, the companion app 160 may receive the event data ED, classify the events and display the events based on the event priority classification and/or the location prominence on the I/O interface 552. Next, the method 1000 may move to the decision step 1006. In the decision step 1006, the companion app 160 may determine whether one of the high priority events 770a-770n have been received. If the high priority event has been received, then the method 1000 may move to the step 1008.

In the step 1008, the companion app 160 may wait for a user response. For example, a timer may be implemented for the user to respond to the high priority event. Next, the method 1000 may move to the decision step 1010. In the decision step 1010, the companion app 160 may determine whether the user 602 has interacted with the high priority event. For example, the user 602 may tap or click on the event to interact with the event. If the user 602 has interacted with the event, then the method 1000 may move to the step 1012. In the step 1012, the companion app 160 may display the action interface 806. Next, in the step 1014, the action interface 806 may receive the user input (e.g., the particular response to perform in response to the selected high priority event). In the step 1016, the user device 106i may communicate the selected action to the smart security device 102i (e.g., via the signal RCT). Next, the method 1000 may move to the step 1026. In the decision step 1010, if the user has not interacted with the high priority event (e.g., the timer for reacting has elapsed), then the method 1000 may move to the step 1018. In the step 1018, the smart security device 102i may perform an automatic deterrence response (e.g., may be selected by the local AI model 118, may be selected based on calendar data, perform an automatic voice down, sound an alarm, etc.). Next, the method 1000 may move to the step 1026.

In the decision step 1006, if the high priority event has not been received, then the method 1000 may move to the step 1020. In the step 1020, the companion app 160 may compare a confidence level associated with the event data ED to a threshold value. For example, the event data ED may comprise a confidence value that indicates a level of certainty that the detected event has been successfully resolved and/or is a non-event. The confidence value may be determined by the local AI model 118 and/or the AI model 132 when analyzing the video frames and/or audio data. The threshold value may be a predefined value used for quality assurance. Next, the method 1000 may move to the decision step 1022.

In the decision step 1022, the companion app 160 may determine whether the confidence level is above the threshold. If the confidence level is above the threshold, then the method 1000 may move to the step 1026 (e.g., performing an audit may not be beneficial). If the confidence level is not above the threshold, then the method 1000 may move to the step 1024. In the step 1024, the video data for the lower priority event may be stored for a manual audit. In an example, the video data may be stored in the storage servers 120a-120n for a later audit by a person to manually check whether the detected non-event was actually a non-event (e.g., check that a visitor actually did leave the property, check that no break-in actually occurred, check whether an animal was misclassified, etc.). The result of the audit may be communicated to the cloud computing service 104 via the signal FB. Next, the method 1000 may move to the step 1026. The step 1026 may end the method 1000.

Figure 18:
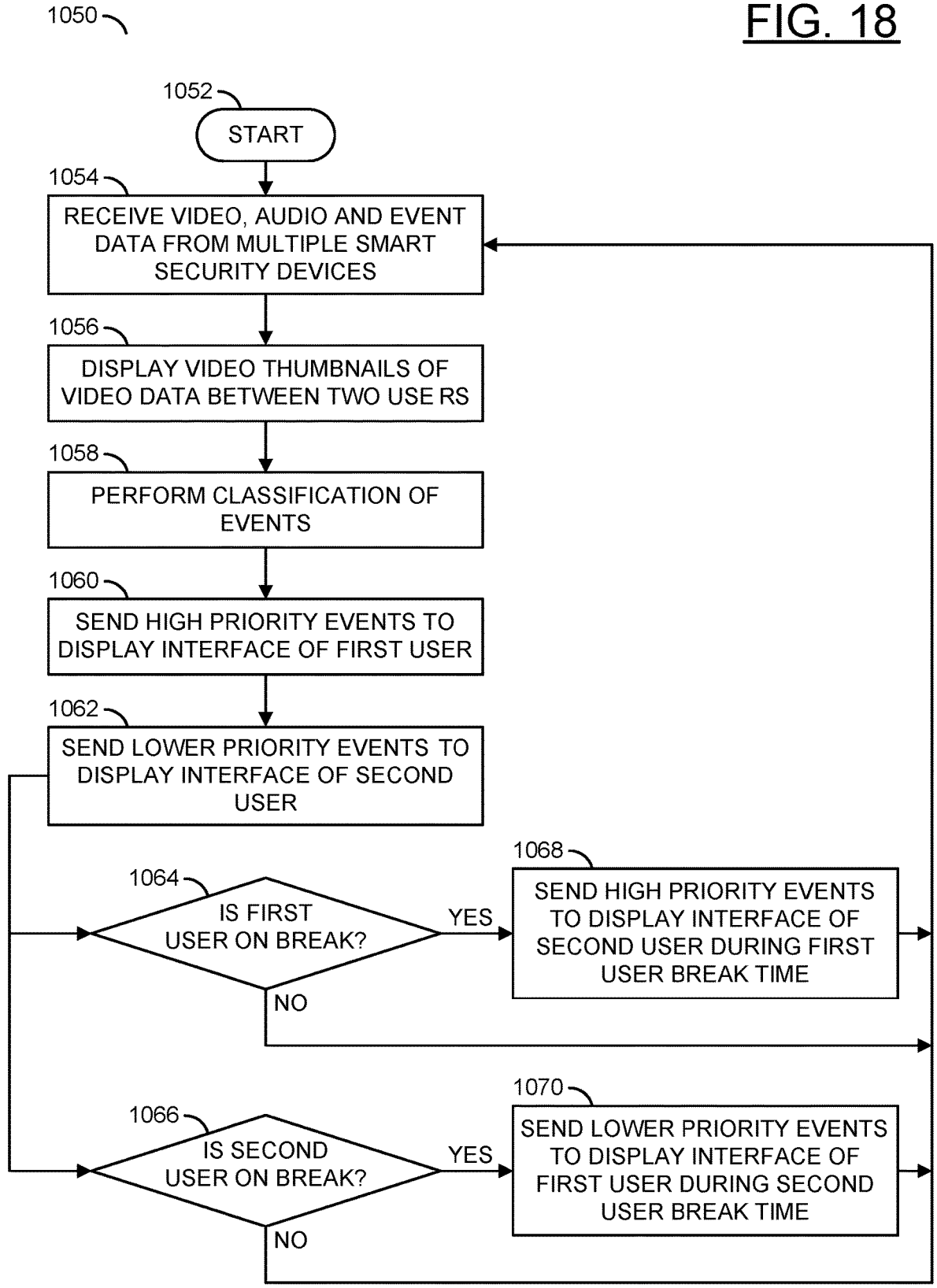
FIG. 18 is a flow diagram illustrating a method for distributing the display of events between multiple employees.

Referring to FIG. 18, a method (or process) 1050 is shown. The method 1050 may distribute the display of events between multiple employees. The method 1050 generally comprises a step (or state) 1052, a step (or state) 1054, a step (or state) 1056, a step (or state) 1058, a step (or state) 1060, a step (or state) 1062, a decision step (or state) 1064, a decision step (or state) 1066, a step (or state) 1068, and a step (or state) 1070.

The step 1052 may start the method 1050. In the step 1054, the companion app 160 may receive the video data VD, the audio data AD and/or the event data ED from multiple of the smart security devices 102a-102n. Next, in the step 1056, the companion app 160 may display the video thumbnails of the video data VD between two users. For example, the employees 144a-144b may be one of the groups 142a-142n assigned to a predefined group of the smart security devices 102a-102n and one of the employees 144a may be viewing the monitor 852b and another of the employees 144b may be viewing the monitor 852c. In the step 1058, the companion app 160 may perform a classification of the events received. Next, in the step 1060, the companion app 160 may send the high priority events 710a-710n to the monitor 852b (or the user device 106a) used by the first employee 144a. In the step 1062, the companion app 160 may send the lower priority events (e.g., the medium priority events 712a-712n and/or the lowest priority events 770a-770n) to the monitor 852c (or the user device 106b) used by the second employee 144b. For example, the first employee 144a may have fewer events to review (e.g., generally there may be a relatively low number of the high priority events 710a-710n compared to other types of events), but may have to make more decisions (e.g., determine which actions to take) and the second employee 144b may have more events to review (e.g., generally there may be more lower priority events than the number of the high priority events 710a-710n), but make fewer decisions (e.g., the lowest priority events 770a-770b may not involve performing actions, or may involve manual auditing). Next, the method 1050 may move to the decision step 1064 and the decision step 1066.

In the decision step 1064, the companion app 160 may determine whether the first employee 144a is on break. For example, calendar data may be used to determine break times and/or the employees 144a-144n may interact with the companion app 160 to start a break. If the employee 144a is not on a break, then the method 1050 may return to the step 1054. If the employee 144a is on a break, then the method 1050 may move to the step 1068. In the step 1068, the companion app 160 may send the high priority events 710a-710n to the monitor 852c (or the user device 106b) of the employee 144b during the break time. For example, the second employee 144b may temporarily cover for the first employee 144a during the break by monitoring all the events. Next, the method 1050 may return to the step 1054.

In the decision step 1066, the companion app 160 may determine whether the second employee 144b is on break. For example, the employees 144a-144n may have their breaks coordinated such that employees that are teamed up to monitor the events together do not take a break at the same time. If the employee 144b is not on a break, then the method 1050 may return to the step 1054. If the employee 144b is on a break, then the method 1050 may move to the step 1070. In the step 1070, the companion app 160 may send the lower priority events to the monitor 852b (or the user device 106a) of the employee 144a during the break time. For example, the first employee 144a may temporarily cover for the second employee 144b during the break by monitoring all the events. Next, the method 1050 may return to the step 1054.

Figure 19:
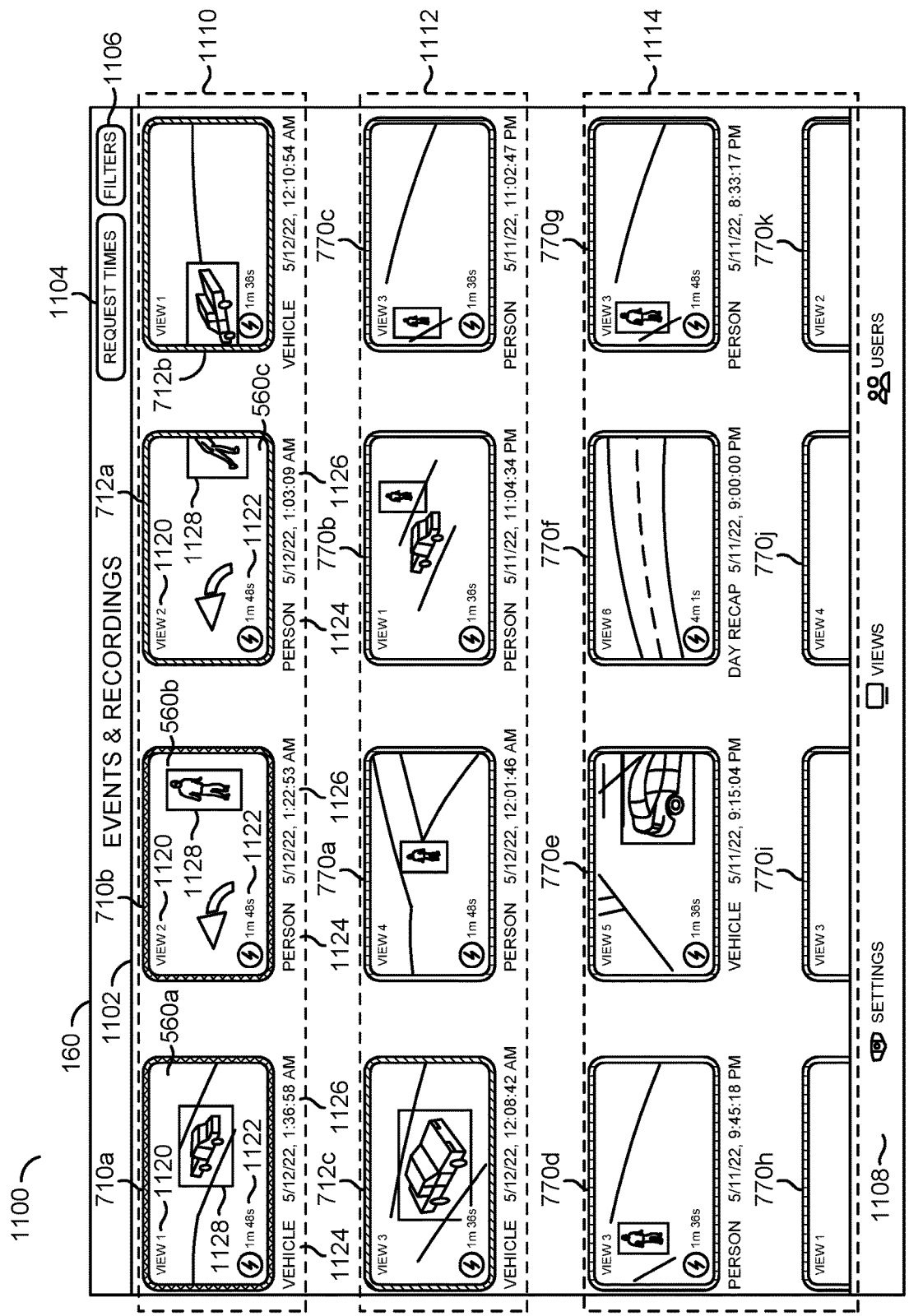
FIG. 19 is a diagram illustrating a list of events classified by priority level.

Referring to FIG. 19, a diagram illustrating a list of events classified by priority level is shown. An example classification interface 1100 is shown. The example classification interface 1100 may comprise the companion app 160. The companion app 160 may be executed and/or displayed on the I/O interface 552 of one of the user devices 106a-106n.

The companion app 160 may comprise the event list 1102, a button 1104, a button 1106 and/or options 1108. The button 1104 may implement a request times feature. The request times feature button 1104 may enable the user 602 to enter various times, dates and/or a range of times/dates of events to display on the event list 1102. For example, the event list 1102 may display the events within the selected range of times/dates in response to the input of the user 602. The button 1106 may implement a filter feature. The filter feature button 1106 may enable the user 602 to select filter options to limit the number and/or types of events displayed. For example, the event list 1102 may display the events that correspond to the filter options in response to the input of the user 602 (e.g., filter options may comprise a particular type of event and/or object detected). The options 1108 may enable the user 602 to select various settings for the smart security devices 102a-102n, select views (e.g., display the event list 1102) and/or set user preferences.

The event list 1102 may comprise a location 1110, a location 1112 and/or a location 1114. The locations 1110-1114 may comprise locations on the I/O interface 552 to display the various events and/or groups of events. For example, the various event priority levels may be displayed at the locations 1110-1114. In the example shown, the location 1110 may be the most prominent location available, the location 1112 may be the second most prominent location available and the location 1114 may be the least prominent location available. In the example shown, the most prominent location 1110 may be at the top of the event list 1102 and the second most prominent location 1112 may be below the most prominent location 1110 and the least prominent location 1114 may be below the second most prominent location 1112. The number, shape, location on the I/O interface 552 and/or the arrangement of the locations 1110-1114 may be varied according to the design criteria of a particular implementation.

The most prominent location 1110 may comprise the high priority events 710a-710b and the medium priority events 712a-712b. The second most prominent location 1112 may comprise the medium priority event 712c and the no action events 770a-770c. The least prominent location 1114 may comprise the no action events 770d-770k. Generally, the events in the high priority event group 702 may be in the most prominent location 1110. The events in the medium priority event group 704 may be in a less prominent location than the events in the high priority event group 702 (e.g., in the most prominent location 1110 if there is sufficient space after all of the high priority events 710a-710n and/or the second most prominent location 1112). The events in the no action event group 752 may be in the next available location (s) (e.g., in the second most prominent location 1112 if there is sufficient space after all of the medium priority events 712a-712n and/or the least prominent location 1114). The no action events 770h-770k are shown partially off-screen. Since the no action events 770a-770k may be classified as having the lowest priority for display on the event list 1102, the events 770a-770k may be displayed when there is sufficient space available after the high priority events 710a-710n and/or the medium priority events 712a-712n are displayed.

To enhance the prominence of display of the various events, each of the events may have a border. In the example shown, the high priority events 710a-710b may have a first distinct type of border, the medium priority events 712a-712b may have a second distinct type of border and the low priority events 770a-770k may have third distinct type of border. In one example, the border for the high priority events 710a-710b may be a red border, the border for the medium priority events 712a-712b may be a yellow border and the border for the low priority events 770a-770k may be a green border.

Each of the events displayed on the event list 1102 may comprise one of the video streams 560a-560n. In the example shown, the high priority event 710a may comprise the video stream 560a (or thumbnail preview image of the video stream 560a), the high priority event 710b may comprise the video stream 560b, the medium priority event 712a may comprise the video stream 560c, etc. For simplicity, only the video streams 560a-560c are labeled.

Each of the events displayed on the event list 1102 may comprise a view label 1120, a video length 1122, an event type 1124 and/or a timestamp 1126. In some of the events displayed, an object detection 1128 may be displayed (e.g., if the AI module 118 and/or the AI module 132 detected an object during the particular event). The view label 1120 may be a customizable name that may be used to identify one of the smart security devices 102a-102n. The video length 1122 may display a run time of the video streams 560a-560n. Generally, the video length 1122 may comprise the length of the event plus additional pre-padding and/or post-padding time to provide context. The event type 1124 may display a categorization of the event detected (e.g., a person, a vehicle, an animal, a loiterer, a burglar, etc.). For example, the filter button 1106 may enable filtering by the different available event types 1124. The timestamp 1126 may comprise a time and date of the event. The object detection 1128 may provide a visual highlight of the location of the object detected in the video streams 560a-560n.

In the high priority event 770a, the view label 1120 may be view 1 (e.g., a main entry of the premises). The video length 1122 may be 1 minute and 48 seconds long. The event type 1124 may be the detection of a vehicle. The timestamp may be May 12, 2022 at 1:36 am. The object detection 1128 may display the location of the vehicle detected. In one example, any vehicle approaching the premises after business hours may be considered suspicious activity and may be classified as the high priority event 710a to display in the most prominent location 1110. By comparison the view label 1120 of the no action event 770b may be the same view 1, but at a different timestamp 1126 (e.g., May 11, 2022 at 11:04 pm) with the event type 1124 being a person. A person walking by the main entry during business hours may not be considered suspicious activity and may be classified as the no action event 770b to display in the second most prominent location 1112 (or the least prominent location 1114).

In the high priority event 770b, the view label 1120 may be view2 (e.g., a drivethru of a restaurant). The video length 1122 may be 1 m and 48 s long (which may be a predefined length value selected by the user 602). The event type 1124 may be the detection of a person. The timestamp may be May 12, 2022 at 1:22 am. The object detection 1128 may display the location of the person detected. In one example, any detection of a person (e.g., not inside a vehicle) in the drivethru area may be considered suspicious and/or unsafe activity and may be classified as the high priority event 710a to display in the most prominent location 1110. In another example, a person and/or a vehicle in the drivethru after business hours may be detected as suspicious activity and may be classified as one of the high priority events 710a-710n.

In the medium priority event 712a, the view label 1120, the video length 1122 and/or the event type 1124 may be the same as the high priority event 710b. The timestamp 1126 (e.g., May 12, 2022 at 1:03 am) of the medium priority event 712a may be at an earlier time than the timestamp 1126 of the high priority event 710b. In the example shown, the medium priority event 712a may be the same one of the smart security devices 102a-102n detecting an event at the same location (e.g., the drivethru area). In the example shown, the medium priority event 712a may have the object detection 1128 showing the person entering the video frame at an earlier time than in the high priority event 710b. For example, when the object detection 1128 is first detected, the companion app 160 may classify the event as one of the medium priority events 712a-712n until additional context is determined. After the timer 764 elapses, the event may be re-classified. For example, the person may remain in the field of view of the camera 256, and the additional context may indicate that the detected object 1128 is a loiterer. After the timer 764 elapses (e.g., approximately 20 minutes, in the example shown), the medium priority event 712a may be re-classified as the high priority event 710b.

The various events displayed in the event list 1110 may comprise information similar to the examples described in the high priority event 710a-710b and/or the medium priority event 712a. For some of the no action events 770a-770k, there may be no object detection 1128. For example, the no action event 770f may not display an object detection 1128 and the event type 1124 may be a day recap (e.g., providing a timelapse review of the video captured throughout the day). The event list 1110 may provide a proactive and strategic tool that may actually deter and prevent crime and property loss instead by enabling the security personnel 144a-144n to react quickly to events in real-time. The system 100 may enable the events and/or alarms that matter to be reacted to automatically and/or highlighted to enable the security personnel 144a-144n to view and react to. Automating deterrence with randomized and/or unpredictable actions offers an immediate response and that may thwart unwanted intrusion. Deep-learning technology may provide automated video monitoring at a lower labor cost. Additional manual surveillance using the event list 1110 may enhance security.

The functions performed by the diagrams of FIGS. 1-19 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A system comprising:
a plurality of smart security devices each configured to (i) capture pixel data of an area, (ii) generate video frames from said pixel data, (iii) capture audio of said area, (iv) store said video frames and said audio, (v) perform an analysis of said video frames and said audio, (vi) detect an event in response to said analysis of said video frames and said audio, (vii) perform automatic deterrence actions in response to said event and (viii) communicate said video frames, said audio and a notification of said event; and
a computing device configured to execute computer readable instructions to perform one or more steps, said steps comprising (i) receiving said video frames, said audio and said notification of said event from each of said smart security devices, (ii) performing a classification of said notifications of said events into a plurality of event levels, (iii) displaying a list of said notifications of said events according to said classification and (iv) receiving input from a user in response to said notifications of said events, wherein
  (a) each of said events determined to have said event levels of a high priority event are added to a top of said list as said high priority event is detected,
  (b) each of said events determined to have said event levels of a new event and a passive event are added to said list below said high priority events as said events with said new event and said passive event are detected,
  (c) each of said high priority events are displayed with a response option configured to enable a person to provide said input for a manual response to said high priority event,
  (d) each of said new events are added to said list below all of said high priority events for a predetermined amount of time,
  (e) a reclassification of said new event is performed after said predetermined amount of time,
  (f) said reclassification moves said new event to said high priority events if said reclassification determines said new event is one of said high priority events,
  (g) said reclassification moves said new event to said passive events if said reclassification determines said automatic deterrence actions have resolved said new event, and
  (h) said list of said notifications displays a subset of said notifications based on a size of a screen configured to display said list of said notifications.

2. The system according to claim 1, wherein (i) said computer readable instructions are configured to group said notification of said events into said plurality of event levels and (ii) grouping said notification of said events into said plurality of event levels enables efficient video monitoring of said video frames and said audio from said plurality of smart security devices by one or more security personnel.

3. The system according to claim 2, wherein said efficient video monitoring is enabled by indicating that said event levels having said new events and said passive events do not need said manual response from said security personnel.

4. The system according to claim 1, wherein said automatic deterrence actions comprise (i) a voice down message provided to an intruder that triggered said event and said voice down message is selected using artificial intelligence and decisions based on calendar-based information and (ii) generating a pattern of flashing lights.

5. The system according to claim 1, wherein said response option enables said manual response to select an immediate action that comprises at least one of selecting a custom behavior for one of said smart security devices to perform, sending a verified alert to a designated person, dispatching authorities to a location of one of said smart security devices, saving said video and said audio and sending said video frames and said audio to a third party.

6. The system according to claim 1, wherein said reclassification determines that said automatic deterrence actions have resolved said new event in response to a successful deterrence if an intruder is no longer detected in said video frames after said predetermined amount of time.

7. The system according to claim 1, wherein said high priority events comprise a break-in by an intruder.

8. The system according to claim 1, wherein (i) said new event comprises a detection of a loiterer and (ii) said passive event comprises a successful deterrence of a detected person by said smart security devices.

9. The system according to claim 8, wherein said successful deterrence comprises (i) detecting an intruder at a first time, (ii) detecting that said intruder is no longer present at a second time and (iii) said second time is a threshold length of time after said first time.

10. The system according to claim 1, wherein (i) said video frames and said audio for one of said passive events are presented in response to selecting one of said events from said list to provide an audit of a successful deterrence of said one of said passive events by said automatic deterrence actions and (ii) said audit comprises said person checking said video frames and said audio for said one of said passive events to ensure that said successful deterrence was correctly classified.

11. The system according to claim 1, wherein (i) said automatic deterrence actions for said passive events comprise a confidence level and (ii) no audit is performed when said confidence level is above a threshold value.

12. The system according to claim 1, wherein (i) each of said high priority events are displayed in said list having a red color, (ii) each of said new events are displayed in said list having a yellow color, (iii) each of said passive events are displayed in said list having a green color, (iv) one of said events with said yellow color comprises a detection of an intruder, (v) said list is updated to change said one of said events with said yellow color to said red color in response to said reclassification of said intruder as a loiterer after said predetermined amount of time and (vi) said list is updated to change said one of said events with said yellow color to said green color in response to a successful deterrence of said intruder.

13. The system according to claim 1, wherein said list enables filtering said events by (i) a time of said events and (ii) a type of said events.

14. The system according to claim 1, wherein each of said events is displayed as a thumbnail preview of said video frames.

15. The system according to claim 1, wherein one or more of said passive events comprise said video frames displayed as a timelapse review of said video frames captured by one of said smart security devices corresponding to a range of time.

16. A video feed monitoring app configured to be implemented with:

a user interface configured to enable interaction with an operator, said interaction comprises (i) receiving input from said operator and (ii) presenting a list of visual content to a display; and a processor configured to process said input received from said user interface and update said display, where said video feed monitoring app is configured to:
  (i) receive a plurality of video streams from one or more smart security devices,
  (ii) receive a notification of events detected in response to said video streams,
  (iii) perform a classification of said events in response to video analysis performed on said video streams into a plurality of priority levels,
  (iv) generate said list of visual content for said display in response to said classification, and
  (v) generate a communication signal in response to said input, wherein
(a) each of said notifications of said events that correspond to a highest priority level of said plurality of priority levels are added to a top of said list as said events that correspond to said highest priority level are detected,
(b) each of said notifications of said events that correspond to a new event and a passive event are added to said list below said events that correspond to said highest priority level as said new events and said passive events are detected,
(c) said events with said highest priority level are each displayed with a response option configured to enable a person to provide said input for a manual response to said events that correspond to said highest priority level,
(d) each of said new events are added to said list below said events with said highest priority level for a predetermined amount of time,
(e) a reclassification of said new event is performed after said predetermined amount of time,
(f) said reclassification moves said new event to said events with said highest priority level if said reclassification determines said new event is one of said events with said highest priority level,
(g) said reclassification moves said new event to said passive events if said reclassification determines that an automatic deterrence action performed by said smart security devices has resolved said new event, and
(h) said list of said notifications displays a subset of said notifications based on a size of said user interface.

17. A system comprising:

a plurality of smart security devices each configured to (i) capture pixel data of an area, (ii) generate video frames from said pixel data, (iii) capture audio of said area, (iv) store said video frames and said audio, (v) perform an analysis of said video frames and said audio, (vi) detect an event in response to said analysis of said video frames and said audio, (vii) perform automatic deterrence actions in response to said event and (viii) communicate said video frames, said audio and a notification of said event; and a computing device configured to execute computer readable instructions to perform one or more steps, said steps comprising (i) receiving said video frames, said audio and said notification of said event from each of said smart security devices, (ii) performing a classification of said notifications of said events into a plurality of event levels and (iii) displaying a list of said notifications of said events according to said classification for a subset of said plurality of said smart security devices, wherein
(a) said notifications for said subset of said plurality of smart security devices are presented to (i) a first user and (ii) a second user,
(b) said first user and said second user are assigned to monitor said subset of said plurality of smart security devices,
(c) said notifications for said subset of said plurality of smart security devices are distributed between said first user and said second user according to said list,
(d) each of said events determined to have said event levels of a high priority event and a new event are added to said list for said first user as said high priority events and said new events are detected,
(e) each of said events determined to have said event levels of a passive event are added to said list for said second user as said events with said passive events are detected,
(f) each of said high priority events are displayed with a response option configured to enable said first user to select a manual response to said high priority event,
(g) each of said new events are added to said list below said high priority events for a predetermined amount of time,
(h) a reclassification of said new event is performed after said predetermined amount of time,
(i) said reclassification moves said new event to said high priority event if said reclassification determines said new event is one of said high priority events, and
(j) said reclassification moves said new event to said passive events if said reclassification determines said automatic deterrence actions has resolved said new event.

18. The system according to claim 17, wherein all of said notifications are presented to said first user when said second user is on a break.

19. The system according to claim 5, wherein said subset of said plurality of smart security devices comprises at least 1000 of said smart security devices.

20. The system according to claim 17, wherein (i) said first user and said second user are professional security personnel that work at a property remote from said plurality of smart security devices, (ii) said first user selects said manual response for said high priority events, (iii) said second user performs an audit of said passive events and (iv) said audit comprises determining that said automatic deterrence actions resolved said passive events.

* * * * *